United States Patent
Ge et al.

(10) Patent No.: US 9,948,550 B2
(45) Date of Patent: Apr. 17, 2018

(54) METHOD, APPARATUS, AND SYSTEM FOR ROUTING AND FORWARDING

(71) Applicant: Huawei Technologies Co., Ltd., Shenzhen, Guangdong (CN)

(72) Inventors: Wenmin Ge, Shenzhen (CN); Zhefeng Yan, Shenzhen (CN); Rong Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 309 days.

(21) Appl. No.: 14/961,337

(22) Filed: Dec. 7, 2015

(65) Prior Publication Data

US 2016/0087881 A1 Mar. 24, 2016

Related U.S. Application Data

(63) Continuation of application No. PCT/CN2013/076981, filed on Jun. 8, 2013.

(51) Int. Cl.
*G06F 15/173* (2006.01)
*H04L 12/717* (2013.01)
(Continued)

(52) U.S. Cl.
CPC ............ *H04L 45/42* (2013.01); *H04L 45/306* (2013.01); *H04L 45/745* (2013.01); *H04L 67/10* (2013.01);
(Continued)

(58) Field of Classification Search
USPC ....... 709/203, 206, 217, 219, 223, 224, 226, 709/228, 231, 232, 238; 370/254, 401;
(Continued)

(56) References Cited

U.S. PATENT DOCUMENTS 9,621,457 B2 * 4/2017 Veillette ............. H04W 40/246
2007/0061488 A1 3/2007 Alagappan et al.
(Continued)

FOREIGN PATENT DOCUMENTS

CN 102004751 A 4/2011
CN 103109511 A 5/2013
(Continued)

OTHER PUBLICATIONS

Abhishek Chanda, et al., "ContentFlow: Mapping Content to Flows in Software Defined Networks", Feb. 7, 2013, 9 pages, XP-002756496.
(Continued)

*Primary Examiner* — Quang N Nguyen

(57) ABSTRACT

Embodiments of the present invention provide a method for routing and forwarding. The method includes: receiving, by a network controller, a routing request message sent by a requesting routing node, where the routing request message carries a content name of requested content; determining, by the network controller according to a network topology diagram and registration information of the requested content, a proper forwarding path; and delivering, by the network controller, routing information to each routing node on the forwarding path. In the embodiments of the present invention, a network controller is introduced, and registration information and a network topology diagram are stored in the network controller, so that the network controller may be used to determine a forwarding path of a content request packet, which reduces blindness of routing and forwarding of the content request packet in an ICN network and improves efficiency of routing and forwarding.

17 Claims, 27 Drawing Sheets

(51) Int. Cl.
*H04L 12/741* (2013.01)
*H04L 12/725* (2013.01)
*H04L 29/08* (2006.01)
*H04L 29/06* (2006.01)
*H04L 29/14* (2006.01)

(52) U.S. Cl.
CPC ........ *H04L 67/2814* (2013.01); *H04L 67/327* (2013.01); *H04L 69/22* (2013.01); *H04L 69/40* (2013.01)

(58) Field of Classification Search
USPC .......................................................... 715/747
See application file for complete search history.

(56) References Cited

U.S. PATENT DOCUMENTS

| | | | |
|---|---|---|---|
| 2010/0061272 A1* | 3/2010 | Veillette | H04L 45/34 370/254 |
| 2010/0195653 A1 | 8/2010 | Jacobson et al. | |
| 2011/0055218 A1 | 3/2011 | Capuozzo et al. | |
| 2013/0111063 A1 | 5/2013 | Lee | |
| 2013/0294453 A1* | 11/2013 | Han | H04L 45/66 370/401 |
| 2015/0019991 A1* | 1/2015 | Kristjnsson | H04L 41/22 715/747 |

FOREIGN PATENT DOCUMENTS

| | | |
|---|---|---|
| JP | 2009278624 A | 11/2009 |
| WO | 2011/037105 A1 | 3/2011 |
| WO | WO 2011/126481 A1 | 10/2011 |
| WO | WO 2012/103176 A1 | 8/2012 |

OTHER PUBLICATIONS

"Software-Defined Networking: The New Norm for Networks", Open Networking Foundation, Apr. 13, 2012, 12 pages.

* cited by examiner

METHOD, APPARATUS, AND SYSTEM FOR ROUTING AND FORWARDING

CROSS-REFERENCE TO RELATED APPLICATION

This application is a continuation of International Application No. PCT/CN2013/076981, filed on Jun. 8, 2013, which is hereby incorporated by reference in its entirety.

TECHNICAL FIELD

The present invention relates to the field of communications, and in particular, to a method, an apparatus, and a system for routing and forwarding.

BACKGROUND

Although the Internet Protocol (Internet Protocol, IP) has achieved huge success and made the Internet ubiquitous, "terminals" have been placed in a core position since birth of IP, where IP packets identified by a destination IP address and a source IP address carry a session between two terminals. Therefore, IP is a terminal centric network protocol. However, nowadays the session between terminals is not a main purpose of using the Internet. Instead, people use the Internet mainly for acquiring information. For example, applications such as network news, search engines, network music, network videos, blogs, microblogs, social networking sites, and network forums actually all focus on production, propagation, and sharing of information. Moreover, when acquiring the information, people usually do not care about where the information is acquired. This is a completely new information or content centric mode. To solve a problem of mismatch between the information centric mode of Internet applications and the terminal centric mode of IP, the research community is trying to redefine a waist of an Internet hourglass model and studying a new future-Internet architecture directly oriented to information and content.

Among all information centric network (Information Centric Network, ICN) architectures, a named data network (Named Data Network, NDN) has greatest impact. The NDN is studied and developed from content centric networking (Content Centric Networking, CCN) led by Van Jacobson. The NDN and CCN consider that a future network should use content-based naming and routing as a basis, use URL-like structured content naming, implement a buffer function in an NDN router by using a content store (Content Store, CS), and search for and determine a next hop by longest matching between a content name of requested content and a content name prefix in a forwarding information base (Forwarding Information Base, FIB). The NDN is also dedicated to implementation of content-name-based forwarding based on a current IP router and an Ethernet forwarding engine.

In the ICN network, a content request packet sent by a requester is routed in a manner of hop-by-hop query to acquire requested content, that is, each routing node depends on its collected local routing information to perform forwarding. Therefore, certain blindness exists and routing and forwarding efficiency is low.

SUMMARY

Embodiments of the present invention provide a method for routing and forwarding, a content registration method, and a corresponding router, network controller, and system to improve efficiency of routing and forwarding in an ICN network.

According to a first aspect, a method for routing and forwarding is provided, including: receiving, by a network controller, a routing request message sent by a requesting routing node, where the routing request message carries a content name of requested content; determining, by the network controller according to the content name and first registration information stored or acquired by the network controller, a network name of a target routing node corresponding to the content name and a port of the target routing node, where a content request packet corresponding to the requested content can be routed to the requested content through the port of the target routing node, and the first registration information is used to indicate a correspondence between the content name, the network name of the target routing node, and the port of the target routing node; determining, by the network controller according to the network name of the target routing node and an acquired network name of the requesting routing node, a forwarding path in network topology information of a network controlled by the network controller, where the forwarding path starts from the requesting routing node and ends at the target routing node, and the network topology information is used to indicate a topological structure of the network by using network names of routing nodes in the network; determining, by the network controller according to the forwarding path, routing information corresponding to the requesting routing node, where the routing information is used to indicate a first port through which the requesting routing node forwards the content request packet, where the first port points to a next-hop routing node corresponding to the requesting routing node on the forwarding path; and sending, by the network controller, the routing information corresponding to the requesting routing node to the requesting routing node, so that the requesting routing node forwards the content request packet according to the routing information.

With reference to the first aspect, in an implementation manner of the first aspect, the method further includes: determining, by the network controller according to the forwarding path and the port of the target routing node, routing information corresponding to each routing node except the requesting routing node among routing nodes that the forwarding path passes through, where the routing information is used to indicate a port through which a routing node corresponding to the routing information forwards the content request packet; and delivering, by the network controller, the routing information corresponding to each routing node, to each routing node except the requesting routing node among the routing nodes that the forwarding path passes through, so that each routing node forwards the content request packet according to the routing information corresponding to each routing node.

With reference to the first aspect, in an implementation manner of the first aspect, the first registration information is registration information of the requested content, where the registration information of the requested content includes the correspondence between the content name, the network name of the target routing node, and the port of the target routing node, and the target routing node is an edge routing node of the requested content; and the determining, by the network controller according to the content name and first registration information stored or acquired by the network controller, a network name of a target routing node corresponding to the content name and a port of the target routing node, includes: acquiring, by the network controller, the network name of the target routing node and the port of the target routing node, from the registration information of the requested content.

With reference to the first aspect or any one of the foregoing implementation manners thereof, in another implementation manner of the first aspect, the first registration information includes registration information of the requested content and registration information of a home container of the requested content, where the registration information of the requested content is used to indicate a correspondence between the content name and a container name of the home container, and the registration information of the home container is used to indicate a correspondence between the container name of the home container, the network name of the target routing node, and the port of the target routing node; and the determining, by the network controller according to the content name and first registration information stored or acquired by the network controller, a network name of a target routing node corresponding to the content name and a port of the target routing node, includes: acquiring, by the network controller, the container name of the home container from the registration information of the requested content according to the content name; and acquiring, by the network controller, the network name of the target routing node and the port of the target routing node from the registration information of the home container according to the container name of the home container, where the target routing node is an edge routing node of the home container.

With reference to the first aspect or any one of the foregoing implementation manners thereof, in another implementation manner of the first aspect, the determining, by the network controller according to the forwarding path and the port of the target routing node, routing information corresponding to each routing node except the requesting routing node among routing nodes that the forwarding path passes through, includes: determining, by the network controller, a next-hop routing node, on the forwarding path, of each routing node except the requesting routing node and the target routing node among the routing nodes that the forwarding path passes through; and determining, by the network controller, the content name and a port that points to the next-hop routing node, on each routing node, as the routing information corresponding to each routing node, and determining the content name and the port of the target routing node as routing information corresponding to the target routing node.

With reference to the first aspect or any one of the foregoing implementation manners thereof, in another implementation manner of the first aspect, the method further includes: resolving, by the network controller through a container resolution system, the home container to acquire container tree set information of the requested content, where the container tree set information includes a container name of at least one container including the home container, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; determining, by the network controller according to registration information of each container in the at least one container stored or acquired by the network controller, an edge routing node of each container, where the registration information of each container is used to indicate a correspondence between a container name of each container and the edge routing node of each container; determining, by the network controller, a topological range of each container according to the edge routing node of each container and the network topology information, where the topological range is used to indicate an inclusion relationship between containers and routing nodes; and delivering, by the network controller, the container tree set information to the requesting routing node, so that the requesting routing node stores the container tree set information to the content request packet, so that the content request packet can be routed to the target routing node according to the container tree set information; and the determining, by the network controller according to the forwarding path, routing information corresponding to the requesting routing node, includes: determining, by the network controller, a first topological range corresponding to the requesting routing node, in the topological range of the at least one container included in the container tree set information, where the first topological range is a maximum topological range in a remaining topological range after a topological range including the requesting routing node is excluded from the topological range of the at least one container; and determining, by the network controller, container names of containers corresponding to the first topological range and a port that points to the next-hop routing node, on the requesting routing node, as the routing information corresponding to the requesting routing node.

With reference to the first aspect or any one of the foregoing implementation manners thereof, in another implementation manner of the first aspect, the sending, by the network controller, the routing information corresponding to the requesting routing node to the requesting routing node, includes: sending, by the network controller, a routing response message to the requesting routing node, where the routing response message includes the routing information corresponding to the requesting routing node and the routing response message is carried by a data packet.

With reference to the first aspect or any one of the foregoing implementation manners thereof, in another implementation manner of the first aspect, the delivering, by the network controller, the routing information corresponding to each routing node, to each routing node except the requesting routing node among the routing nodes that the forwarding path passes through, includes: sending, by the network controller, an active routing delivery message to each routing node except the requesting routing node among the routing nodes that the forwarding path passes through, where the active routing delivery message includes the routing information corresponding to each routing node, and the active routing delivery message is carried by an interest packet.

With reference to the first aspect or any one of the foregoing implementation manners thereof, in another implementation manner of the first aspect, the content request packet is an interest packet, and the routing request message is carried by an interest packet.

According to a second aspect, a method for routing and forwarding is provided, including: receiving, by a requesting routing node, a content request packet, where the content request packet carries a content name of requested content; when no forwarding entry that matches the content name exists in a forwarding information base FIB, sending, by the requesting routing node, a routing request message to a network controller, where the routing request message carries the content name; receiving, by the requesting routing node, a routing request response message delivered by the network controller, where the routing request response message carries first routing information, where the first routing information is used to indicate a forwarding port of the content request packet to the requesting routing node, and the first routing information is determined by the network controller according to an acquired network name of the requesting routing node, the content name, first registration information, and network topology information of a network controlled by the network controller, where the first registration information is used to indicate a correspondence between the content name, a network name of a target routing node, and a port of the target routing node, and the network topology information is used to indicate a topological structure of the network by using network names of routing nodes in the network; and forwarding, by the requesting routing node, the content request packet according to the first routing information.

With reference to the second aspect, in an implementation manner of the second aspect, the first registration information is registration information of the requested content, where the registration information of the requested content includes the correspondence between the content name, the network name of the target routing node, and the port of the target routing node, and the target routing node is an edge routing node of the requested content; or the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container.

With reference to the second aspect or any one of the foregoing implementation manners thereof, in another implementation manner of the second aspect, the first routing information includes the content name and the forwarding port of the content request packet; and the forwarding, by the requesting routing node, the content request packet according to the first routing information, includes: matching, by the requesting routing node according to the content name, the forwarding port in the first routing information, in routing information stored by the requesting routing node; and forwarding, by the requesting routing node, the content request packet through the forwarding port in the first routing information.

With reference to the second aspect or any one of the foregoing implementation manners thereof, in another implementation manner of the second aspect, the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container; and before the forwarding, by the requesting routing node, the content request packet according to the first routing information, the method further includes: receiving, by the requesting routing node, container tree set information of the requested content, which is sent by the network controller, where the container tree set information is acquired by the network controller by resolving the home container through a container resolution system, and the container tree set information includes a container name of at least one container including the home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; and adding, by the requesting routing node, the container tree set information to the content request packet.

With reference to the second aspect or any one of the foregoing implementation manners thereof, in another implementation manner of the second aspect, the first routing information includes a first container name and a first port corresponding to the first container name, where the first container name is one of container names included in the container tree set information; and the forwarding, by the requesting routing node, the content request packet according to the first routing information, includes: determining, by the requesting routing node according to the first container name included in the container tree set information carried in the content request packet, the first routing information that matches the first container name, in routing information stored by the requesting routing node; and forwarding, by the requesting routing node, the content request packet through the first port included in the first routing information.

With reference to the second aspect or any one of the foregoing implementation manners thereof, in another implementation manner of the second aspect, before the sending, by the requesting routing node, a routing request message to a network controller, the method further includes: determining, by the requesting routing node, whether any content that matches the content name exists in a content store CS; when content that matches the content name exists in the CS, sending, by the requesting routing node, the matched content to a sender of the content request packet; when no content that matches the content name of the requested content exists in the CS, determining, by the requesting routing node, whether any PIT entry that matches the content name of the requested content exists in a pending information table PIT; when a PIT entry that matches the content name exists in the PIT, adding, by the requesting routing node, a port receiving the content request packet to the matched PIT entry; when no PIT entry that matches the content name exists in the PIT, determining, by the requesting routing node, whether any forwarding entry that matches the content name exists in the FIB; and when a forwarding entry that matches the content name exists in the FIB, sending, by the requesting routing node, the content request packet according to the matched forwarding entry.

With reference to the second aspect or any one of the foregoing implementation manners thereof, in another implementation manner of the second aspect, the method further includes: receiving, by the requesting routing node, an active routing delivery message sent by the network controller, where the active routing delivery message carries another piece of routing information, where the another piece of routing information is used to indicate a forwarding port of another content request packet; receiving, by the requesting routing node, the another content request packet;

and forwarding, by the requesting routing node, the another content request packet according to the another piece of routing information.

With reference to the second aspect or any one of the foregoing implementation manners thereof, in another implementation manner of the second aspect, the active routing delivery message is carried by an interest packet.

With reference to the second aspect or any one of the foregoing implementation manners thereof, in another implementation manner of the second aspect, the content request packet is an interest packet, the routing request message is carried by an interest packet, and the routing request response message is carried by a data packet.

According to a third aspect, a method for routing and forwarding is provided, including: receiving, by a network controller, a routing request message sent by a requesting routing node, where the routing request message carries container tree set information of a requested content, where the container tree set information includes a container name of at least one container including a home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; determining, by the network controller according to registration information of each container in the at least one container stored or acquired by the network controller, an edge routing node of each container, where the registration information of each container is used to indicate a correspondence between a container name of each container and the edge routing node of each container; determining, by the network controller, a topological range of each container according to the edge routing node of each container and network topology information of a network controlled by the network controller, where the network topology information is used to indicate a topological structure of the network by using network names of routing nodes in the network, and the topological range is used to indicate an inclusion relationship between containers and routing nodes; determining, by the network controller according to a network name of an edge routing node of the home container, an acquired network name of the requesting routing node, and the network topology information, a forwarding path that starts from the requesting routing node and ends at the edge routing node of the home container; determining, by the network controller according to the topological range of the at least one container and the forwarding path, routing information corresponding to the requesting routing node, where the routing information includes a container name and a port corresponding to the container name, where the container name is a container name of a container in the at least one container included in the container tree set information; and delivering, by the network controller, the routing information corresponding to the requesting routing node to the requesting routing node, so that the requesting routing node forwards, according to the routing information corresponding to the requesting routing node, a content request packet corresponding to the requested content.

With reference to the third aspect, in an implementation manner of the third aspect, the method further includes: determining, by the network controller according to the topological range of the at least one container and the forwarding path, routing information corresponding to each routing node except the requesting routing node among routing nodes that the forwarding path passes through, where the routing information includes a container name and a port corresponding to the container name, where the container name in the routing information corresponding to each routing node is a container name of a container in the at least one container included in the container tree set information; and delivering, by the network controller, the routing information corresponding to each routing node to each routing node except the requesting routing node, so that each routing node forwards, according to the routing information corresponding to each routing node, the content request packet corresponding to the requested content.

With reference to the third aspect or any one of the foregoing implementation manners thereof, in another implementation manner of the third aspect, the determining, by the network controller according to the topological range of the at least one container and the forwarding path, routing information corresponding to the requesting routing node, includes: determining, by the network controller, a first topological range corresponding to the requesting routing node, in the topological range of the at least one container, and determining a next-hop routing node, on the forwarding path, of the requesting routing node, where the first topological range is a maximum topological range in a remaining topological range after a topological range including each routing node is excluded from the topological range of the at least one container; and determining, by the network controller, container names of containers corresponding to the first topological range and a port that points to the next-hop routing node, on the requesting routing node, as routing information corresponding to the requesting routing node.

With reference to the third aspect or any one of the foregoing implementation manners thereof, in another implementation manner of the third aspect, the delivering, by the network controller, the routing information corresponding to the requesting routing node to the requesting routing node, includes: sending, by the network controller, a routing response message to the requesting routing node, where the routing response message includes the routing information corresponding to the requesting routing node and the routing response message is carried by a data packet.

With reference to the third aspect or any one of the foregoing implementation manners thereof, in another implementation manner of the third aspect, the delivering, by the network controller, the routing information corresponding to each routing node to each routing node except the requesting routing node, includes: sending, by the network controller, an active routing delivery message to each routing node except the requesting routing node among the routing nodes that the forwarding path passes through, where the active routing delivery message includes the routing information corresponding to each routing node, and the active routing delivery message is carried by an interest packet.

With reference to the third aspect or any one of the foregoing implementation manners thereof, in another implementation manner of the third aspect, the content request packet is an interest packet, and the routing request message is carried by an interest packet.

According to a fourth aspect, a method for routing and forwarding is provided, including: receiving, by a requesting routing node, a content request packet, where the content request packet carries a content name of requested content; determining, by the requesting routing node, whether any forwarding entry that matches the content name of the requested content exists in a forwarding information base FIB; when no forwarding entry that matches the content name of the requested content exists in the FIB, sending, by the requesting routing node, a routing request message to a network controller, where the routing request message carries container tree set information, where the container tree set information includes a container name of at least one container including a home container of the requested content, and the container tree set information is used to indicate an access relationship between the at least one container; receiving, by the requesting routing node, a routing request response message sent by the network controller, where the routing request response message carries first routing information, where the first routing information includes a first container name and a port corresponding to the first container name, where the first container name is one of container names included in the container tree set information, and the first routing information is determined by the network controller according to an acquired network name of the requesting routing node, the container tree set information, registration information of each container in the at least one container included in the container tree set information, and network topology information of a network controlled by the network controller, where the registration information of each container is used to indicate a correspondence between a container name of each container and an edge routing node of each container, and the network topology information is used to indicate a topological structure of the network by using network names of routing nodes in the network; matching, by the requesting routing node according to the container name of the at least one container in the container tree set information, the first routing information in routing information stored by the requesting routing node; and forwarding, by the requesting routing node, the content request packet through the port corresponding to the first container name, in the first routing information.

With reference to the fourth aspect, in an implementation manner of the fourth aspect, the method further includes: receiving, by the requesting routing node, an active routing delivery message sent by the network controller, where the active routing delivery message carries another piece of routing information, where the another piece of routing information carries another container name and a port corresponding to the another container name; receiving, by the requesting routing node, another content request packet, where the another content request packet carries the another container name; matching, by the requesting routing node according to the another container name, the another piece of routing information in the routing information stored by the requesting routing node; and forwarding, by the requesting routing node, the another content request packet through the port corresponding to the another container name.

With reference to the fourth aspect or any one of the foregoing implementation manners thereof, in another implementation manner of the fourth aspect, the active routing delivery message is carried by an interest packet.

With reference to the fourth aspect or any one of the foregoing implementation manners thereof, in another implementation manner of the fourth aspect, before the sending, by the requesting routing node, a routing request message to a network controller, the method further includes: determining, by the requesting routing node, whether any content that matches the content name exists in a content store CS; when content that matches the content name exists in the CS, sending, by the requesting routing node, the matched content to a sender of the content request packet; when no content that matches the content name of the requested content exists in the CS, determining, by the requesting routing node, whether any PIT entry that matches the content name of the requested content exists in a pending information table PIT; when a PIT entry that matches the content name exists in the PIT, adding, by the requesting routing node, a port receiving the content request packet to the matched PIT entry; when no PIT entry that matches the content name exists in the PIT, determining, by the requesting routing node, whether any forwarding entry that matches the content name exists in the FIB; and when a forwarding entry that matches the content name exists in the FIB, sending, by the requesting routing node, the content request packet according to the matched forwarding entry.

With reference to the fourth aspect or any one of the foregoing implementation manners thereof, in another implementation manner of the fourth aspect, the content request packet is an interest packet, the routing request message is carried by an interest packet, and the routing request response message is carried by a data packet.

According to a fifth aspect, a content registration method is provided, including: receiving, by a network controller, a content registration message sent by a first routing node, where the content registration message carries content registration information used to indicate a correspondence between a content name, a network name of the first routing node, and a first port of the first routing node, where the first port is a port through which the first routing node receives a content registration request packet corresponding to a content to be registered; and storing, by the network controller, the content registration information.

With reference to the fifth aspect, in an implementation manner of the fifth aspect, the first routing node is an edge routing node of the content to be registered, and the content registration information includes a content name of the content to be registered and the first port.

With reference to the fifth aspect or any one of the foregoing implementation manners thereof, in another implementation manner of the fifth aspect, the storing, by the network controller, the content registration information, includes: determining, by the network controller, whether any content that matches the content name of the content to be registered exists in registered content; when the matched content does not exist, storing, by the network controller, the content name of the content to be registered, and storing a correspondence between the content name of the content to be registered, the acquired network name of the first routing node, and the first port; and when the matched content exists, adding, by the network controller, the correspondence between the content name of the content to be registered, the network name of the first routing node, and the first port to registration information of the matched content.

With reference to the fifth aspect or any one of the foregoing implementation manners thereof, in another implementation manner of the fifth aspect, the method further includes: receiving, by the network controller, a content deregistration message sent by a second routing node, where the content deregistration message carries a content name of content to be deregistered and a second port, where the second routing node is an edge routing node of the content to be deregistered, and the second port is a port through which the second routing node receives a content deregistration request packet corresponding to the content to be deregistered; determining, by the network controller, first registered content, where the first registered content is content that is in the registered content and matches the content name of the content to be deregistered; and deleting, by the network controller, a correspondence between the content name of the content to be deregistered, an acquired network name of the second routing node, and the second port from registration information of the first registered content.

With reference to the fifth aspect or any one of the foregoing implementation manners thereof, in another implementation manner of the fifth aspect, the content registration information includes a correspondence between a content name of the content to be registered and a container name of a home container of the content to be registered, and a correspondence between the container name of the home container of the content to be registered, the network name of the first routing node, and the first port of the first routing node, where the first routing node is an edge routing node of the home container of the content to be registered.

With reference to the fifth aspect or any one of the foregoing implementation manners thereof, in another implementation manner of the fifth aspect, the storing, by the network controller, the content registration information, includes: determining, by the network controller, whether any content that matches the content name of the content to be registered exists in registered content; when the matched content exists, adding, by the network controller, the correspondence between the content name of the content to be registered and the container name of the home container of the content to be registered, to registration information of the matched content; and when the matched registered content does not exist, storing, by the network controller, the content name of the content to be registered, and storing the correspondence between the content name of the content to be registered and the container name of the home container of the content to be registered.

With reference to the fifth aspect or any one of the foregoing implementation manners thereof, in another implementation manner of the fifth aspect, the method further includes: receiving, by the network controller, a content deregistration message sent by a third routing node, where the content deregistration message carries a content name of content to be deregistered and a container name of a home container of the content to be deregistered; determining, by the network controller, second registered content, where the second registered content is registered content that matches the content name of the content to be registered; and deleting, by the network controller, the correspondence between the content name of the content to be deregistered and the container name of the home container of the content to be deregistered from registration information of the second registered content.

With reference to the fifth aspect or any one of the foregoing implementation manners thereof, in another implementation manner of the fifth aspect, the content deregistration message is carried by an interest packet.

With reference to the fifth aspect or any one of the foregoing implementation manners thereof, in another implementation manner of the fifth aspect, the method further includes: receiving, by the network controller, a container registration message sent by a fourth routing node, where the fourth routing node is an edge routing node of a container to be registered, and the container registration message carries a container name of the container to be registered and a fourth port, where the fourth port is a port through which the fourth routing node receives a container registration request packet corresponding to the container to be registered; determining, by the network controller, whether any container that matches the container name of the container to be registered exists in registered containers; when the matched container exists, adding, by the network controller, a correspondence between the container name of the container to be registered, an acquired network name of the fourth routing node, and the fourth port to registration information of the matched container; and when the matched container does not exist, storing, by the network controller, the container name of the container to be registered, and storing the correspondence between the container name of the container to be registered, the network name of the fourth routing node, and the fourth port.

With reference to the fifth aspect or any one of the foregoing implementation manners thereof, in another implementation manner of the fifth aspect, the method further includes: receiving, by the network controller, a container deregistration message sent by a fifth routing node, where the fifth routing node is an edge routing node of a container to be deregistered, and the container deregistration message carries a container name of the container to be deregistered and a fifth port, where the fifth port is a port through which the fifth routing node receives a container deregistration request packet corresponding to the container to be deregistered; determining, by the network controller, a third registered container, where a container name of the third registered container matches the container name of the container to be deregistered; and deleting, by the network controller, a correspondence between the container name of the container to be deregistered, an acquired network name of the fifth routing node, and the fifth port from registration information of the third registered container.

With reference to the fifth aspect or any one of the foregoing implementation manners thereof, in another implementation manner of the fifth aspect, the container deregistration message is carried by an interest packet.

With reference to the fifth aspect or any one of the foregoing implementation manners thereof, in another implementation manner of the fifth aspect, the content registration message is carried by an interest packet.

According to a sixth aspect, a content registration method is provided, including: receiving, by a first routing node, a content registration request packet, where the content registration request packet carries a content name of content to be registered; determining, by the first routing node, content registration information according to the content registration request packet, where the content registration information is used to indicate a correspondence between the content name, a network name of the first routing node, and a first port of the first routing node, where the first port is a port through which the first routing node receives the content registration request packet; and sending, by the first routing node, a content registration message to a network controller, where the content registration message carries the content registration information, so that the network controller stores the content registration information.

With reference to the sixth aspect, in an implementation manner of the sixth aspect, the determining, by the first routing node, content registration information according to the content registration request packet, includes: determining, by the first routing node, the content name of the content to be registered and the first port as the content registration information.

With reference to the sixth aspect or any one of the foregoing implementation manners thereof, in another implementation manner of the sixth aspect, the method further includes: receiving, by the first routing node, a content deregistration request packet, where the content deregistration request packet carries a content name of content to be deregistered; determining, by the first routing node, content deregistration information according to the content deregistration request packet, where the content deregistration information includes the content name of the content to be deregistered and a second port, where the second port is a port through which the first routing node receives the content deregistration request packet; and sending, by the first routing node, a content deregistration message to the network controller, where the content deregistration message carries the content deregistration information.

With reference to the sixth aspect or any one of the foregoing implementation manners thereof, in another implementation manner of the sixth aspect, the content registration request packet further carries a container name of a home container of the content to be registered, and the content registration information includes a correspondence between the content name of the content to be registered and the container name of the home container of the content to be registered, and a correspondence between the container name of the home container of the content to be registered, the network name of the first routing node, and the first port of the first routing node, where the first routing node is an edge routing node of the home container of the content to be registered.

With reference to the sixth aspect or any one of the foregoing implementation manners thereof, in another implementation manner of the sixth aspect, the method further includes: receiving, by the first routing node, a content deregistration request packet, where the content deregistration request packet carries a content name of content to be deregistered and a container name of a home container of the content to be deregistered; and sending, by the first routing node, a content deregistration message to the network controller, where the content deregistration message carries the content name of the content to be deregistered and the container name of the home container of the content to be deregistered.

With reference to the sixth aspect or any one of the foregoing implementation manners thereof, in another implementation manner of the sixth aspect, the content deregistration request packet is an interest packet, and the content deregistration message is carried by an interest packet.

With reference to the sixth aspect or any one of the foregoing implementation manners thereof, in another implementation manner of the sixth aspect, the method further includes: receiving, by the first routing node, a container registration request packet, where the container registration request packet carries a container name of a container to be registered; determining, by the first routing node, a fourth port, where the fourth port is a port through which the first routing node receives the container registration request packet; and sending, by the first routing node, a container registration message to the network controller, where the container registration message carries the container name of the container to be registered and the fourth port.

With reference to the sixth aspect or any one of the foregoing implementation manners thereof, in another implementation manner of the sixth aspect, the container registration request packet is an interest packet, and the container registration message is carried by an interest packet.

With reference to the sixth aspect or any one of the foregoing implementation manners thereof, in another implementation manner of the sixth aspect, the method further includes: receiving, by the first routing node, a container deregistration request packet, where the container deregistration request packet carries a container name of a container to be deregistered; determining, by the first routing node, a fifth port, where the fifth port is a port through which the first routing node receives the container deregistration request packet; and sending, by the first routing node, a container deregistration message to the network controller, where the container deregistration message carries the container name of the container to be deregistered and the fifth port.

With reference to the sixth aspect or any one of the foregoing implementation manners thereof, in another implementation manner of the sixth aspect, the content registration request packet is an interest packet, and the content registration message is carried by an interest packet.

According to a seventh aspect, a content registration method is provided, including: receiving, by a network controller, a content registration message sent by a first routing node, where the content registration message carries content registration information used to indicate a storage position of content to be registered; and storing, by the network controller, the content registration information.

With reference to the seventh aspect, in an implementation manner of the seventh aspect, the content registration information is used to indicate a correspondence between a content name, a network name of the first routing node, and a first port of the first routing node, where the first port is a port through which the first routing node receives a content registration request packet corresponding to a content to be registered.

With reference to the seventh aspect or any one of the foregoing implementation manners thereof, in another implementation manner of the seventh aspect, the content registration information includes a content name of the content to be registered and the first port of the first routing node.

With reference to the seventh aspect or any one of the foregoing implementation manners thereof, in another implementation manner of the seventh aspect, the content registration information includes a correspondence between a content name of the content to be registered and a container name of a home container of the content to be registered, and a correspondence between the container name of the home container of the content to be registered, the network name of the first routing node, and the first port of the first routing node, where the first routing node is an edge routing node of the home container of the content to be registered.

According to an eighth aspect, a method for routing and forwarding is provided, including: receiving, by a network controller, a routing request message sent by a requesting routing node, where the routing request message carries a first name; determining, by the network controller, a network name of a target routing node according to the first name; determining, by the network controller according to an acquired network name of the requesting routing node, the network name of the target routing node, and network topology information of a network controlled by the network controller, a forwarding path from the requesting routing node to the target routing node, where the network topology information is used to indicate a topological structure of the network by using network names of routing nodes in the network; determining, by the network controller, routing information corresponding to each routing node except the target routing node among routing nodes that the forwarding path passes through, where the routing information corresponding to each routing node includes the network name of the target routing node and a port that points to a next-hop routing node, on each routing node on the forwarding path; and delivering, by the network controller, the routing information corresponding to each routing node to each routing node.

With reference to the eighth aspect, in an implementation manner of the eighth aspect, the routing request message is used to request a forwarding path of a content response packet, the first name is the network name of the target routing node, the target routing node is a first one routing node that a content request packet corresponding to the content response packet passes through, the content response packet is a data packet, and the content request packet is an interest packet.

With reference to the eighth aspect or any one of the foregoing implementation manners thereof, in another implementation manner of the eighth aspect, the routing request message is used to request a forwarding path of a content request packet, where the content request packet is an interest packet; the first name is a content name of requested content carried in the content request packet; the network controller stores registration information of the requested content, where the registration information of the requested content is used to indicate a correspondence between the content name of the requested content and the network name of the target routing node; the target routing node is an edge routing node of the requested content; and the determining, by the network controller, a network name of a target routing node according to the first name, includes: acquiring, by the network controller, the network name of the target routing node from the registration information of the requested content according to the content name.

With reference to the eighth aspect or any one of the foregoing implementation manners thereof, in another implementation manner of the eighth aspect, the routing request message is carried by an interest packet; and the delivering, by the network controller, the routing information corresponding to each routing node to each routing node, includes: sending, by the network controller, a routing response message to the requesting routing node, where the routing response message includes the routing information corresponding to the requesting routing node and the routing response message is carried by a data packet; and sending, by the network controller, an active routing delivery message to each routing node except the requesting routing node and the target routing node among the routing nodes that the forwarding path passes through, where the active routing delivery message includes the routing information corresponding to each routing node, and the active routing delivery message is carried by an interest packet.

According to a ninth aspect, a method for routing and forwarding is provided, including: receiving, by a requesting routing node, a message packet, where the message packet carries a first name; when no forwarding entry that matches the first name exists in a forwarding information base FIB, sending, by the requesting routing node, a routing request message to a network controller, where the routing request message carries the first name; and receiving, by the requesting routing node, a routing request response message delivered by the network controller, where the routing request response message carries first routing information, where the first routing information includes a network name of a target routing node and a forwarding port of the message packet, and the first routing information is determined by the network controller according to the first name, an acquired network name of the requesting routing node, and network topology information of a network controlled by the network controller, where the network topology information is used to indicate a topological structure of the network by using network names of routing nodes in the network.

With reference to the ninth aspect, in an implementation manner of the ninth aspect, the message packet is a content response packet, the message packet is a data packet, the first name is the network name of the target routing node, the target routing node is a first one routing node that a content request packet corresponding to the content response packet passes through, and the content request packet is an interest packet.

With reference to the ninth aspect or any one of the foregoing implementation manners thereof, in another implementation manner of the ninth aspect, before the sending, by the requesting routing node, a routing request message to a network controller when no forwarding entry that matches the first name exists in a forwarding information base FIB, the method further includes: determining, by the requesting routing node, whether any forwarding entry that matches the network name of the target routing node exists in the FIB; and when a forwarding entry that matches the network name of the target routing node exists in the FIB, sending, by the requesting routing node, the content response packet according to the matched forwarding entry.

With reference to the ninth aspect or any one of the foregoing implementation manners thereof, in another implementation manner of the ninth aspect, the message packet is a content request packet, the content request packet is an interest packet, the first name is a content name of requested content carried in the content request packet, and the target routing node is an edge routing node of the requested content.

With reference to the ninth aspect or any one of the foregoing implementation manners thereof, in another implementation manner of the ninth aspect, before the sending, by the requesting routing node, a routing request message to a network controller when no forwarding entry that matches the first name exists in a forwarding information base FIB, the method further includes: determining, by the requesting routing node, whether any content that matches the content name exists in a content store CS; when content that matches the content name exists in the CS, sending, by the requesting routing node, the matched content to a sender of the content request packet; when no content that matches the content name of the requested content exists in the CS, determining, by the requesting routing node, whether any forwarding entry that matches the content name of the requested content exists in the FIB; and when a forwarding entry that matches the content name exists in the FIB, sending, by the requesting routing node, the content request packet according to the matched forwarding entry.

With reference to the ninth aspect or any one of the foregoing implementation manners thereof, in another implementation manner of the ninth aspect, the method further includes: receiving, by the requesting routing node, an active routing delivery message sent by the network controller, where the active routing delivery message carries another piece of routing information, where the another piece of routing information includes a network name of another target routing node and a forwarding port corresponding to the another target routing node; receiving, by the requesting routing node, another content request packet, where the another content request packet includes the network name of the another target routing node; and forwarding, by the requesting routing node, the another content request packet through the forwarding port in the another piece of routing information.

With reference to the ninth aspect or any one of the foregoing implementation manners thereof, in another implementation manner of the ninth aspect, the active routing delivery message is carried by an interest packet.

With reference to the ninth aspect or any one of the foregoing implementation manners thereof, in another implementation manner of the ninth aspect, the routing request message is carried by an interest packet, and the routing request response message is carried by a data packet.

According to a tenth aspect, a network controller is provided, including: a first receiving unit, configured to receive a routing request message sent by a requesting routing node, where the routing request message carries a content name of requested content; a first determining unit, configured to determine, according to the content name received by the first receiving unit and first registration information stored or acquired by the network controller, a network name of a target routing node corresponding to the content name and a port of the target routing node, where a content request packet corresponding to the requested content can be routed to the requested content through the port of the target routing node, and the first registration information is used to indicate a correspondence between the content name, the network name of the target routing node, and the port of the target routing node; a second determining unit, configured to determine, according to the network name of the target routing node determined by the first determining unit and an acquired network name of the requesting routing node, a forwarding path in network topology information of a network controlled by the network controller, where the forwarding path starts from the requesting routing node and ends at the target routing node, and the network topology information is used to indicate a topological structure of the network by using network names of routing nodes in the network; a third determining unit, configured to determine, according to the forwarding path determined by the second determining unit, routing information corresponding to the requesting routing node, where the routing information is used to indicate a first port through which the requesting routing node forwards the content request packet, where the first port points to a next-hop routing node corresponding to the requesting routing node on the forwarding path; and a first sending unit, configured to send the routing information corresponding to the requesting routing node and determined by the third determining unit to the requesting routing node, so that the requesting routing node forwards the content request packet according to the routing information.

With reference to the tenth aspect, in an implementation manner of the tenth aspect, the method further includes: a sixth determining unit, configured to determine, according to the forwarding path determined by the second determining unit and the port of the target routing node, routing information corresponding to each routing node except the requesting routing node among routing nodes that the forwarding path passes through, where the routing information is used to indicate a port through which a routing node corresponding to the routing information forwards the content request packet; and a third sending unit, configured to deliver the routing information corresponding to each routing node and determined by the sixth determining unit, to each routing node except the requesting routing node among the routing nodes that the forwarding path passes through, so that each routing node forwards the content request packet according to the routing information corresponding to each routing node.

With reference to the tenth aspect or any one of the foregoing implementation manners thereof, in another implementation manner of the tenth aspect, the first registration information is registration information of the requested content, where the registration information of the requested content includes the correspondence between the content name, the network name of the target routing node, and the port of the target routing node, and the target routing node is an edge routing node of the requested content; and the first determining unit is specifically configured to acquire the network name of the target routing node and the port of the target routing node from the registration information of the requested content.

With reference to the tenth aspect or any one of the foregoing implementation manners thereof, in another implementation manner of the tenth aspect, the first registration information includes registration information of the requested content and registration information of a home container of the requested content, where the registration information of the requested content is used to indicate a correspondence between the content name and a container name of the home container, and the registration information of the home container is used to indicate a correspondence between the container name of the home container, the network name of the target routing node, and the port of the target routing node; and the first determining unit is specifically configured to acquire the container name of the home container from the registration information of the requested content according to the content name, and acquire the network name of the target routing node and the port of the target routing node from the registration information of the home container according to the container name of the home container, where the target routing node is an edge routing node of the home container.

With reference to the tenth aspect or any one of the foregoing implementation manners thereof, in another implementation manner of the tenth aspect, the third determining unit is specifically configured to determine a next-hop routing node, on the forwarding path, of each routing node except the requesting routing node and the target routing node among the routing nodes that the forwarding path passes through; and determine the content name and a port that points to the next-hop routing node, on each routing node, as the routing information corresponding to each routing node, and determine the content name and the port of the target routing node as routing information corresponding to the target routing node.

With reference to the tenth aspect or any one of the foregoing implementation manners thereof, in another implementation manner of the tenth aspect, the network controller further includes: a resolving unit, configured to resolve, through a container resolution system, the home container to acquire container tree set information of the requested content, where the container tree set information includes a container name of at least one container including the home container, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; a fourth determining unit, configured to determine, according to registration information of each container in the at least one container stored or acquired by the network controller, an edge routing node of each container, where the registration information of each container is used to indicate a correspondence between a container name of each container and the edge routing node of each container; a fifth determining unit, configured to determine a topological range of each container according to the edge routing node of each container and the network topology information, where the topological range is used to indicate an inclusion relationship between containers and routing nodes; and a second sending unit, configured to deliver the container tree set information to the requesting routing node, so that the requesting routing node stores the container tree set information to the content request packet, so that the content request packet can be routed to the target routing node according to the container tree set information; where the third determining unit is specifically configured to determine a first topological range corresponding to the requesting routing node, in the topological range of the at least one container included in the container tree set information, where the first topological range is a maximum topological range in a remaining topological range after a topological range including the requesting routing node is excluded from the topological range of the at least one container; and the network controller determines container names of containers corresponding to the first topological range and a port that points to the next-hop routing node, on the requesting routing node, as the routing information corresponding to the requesting routing node.

With reference to the tenth aspect or any one of the foregoing implementation manners thereof, in another implementation manner of the tenth aspect, the first sending unit is specifically configured to send a routing response message to the requesting routing node, where the routing response message includes the routing information corresponding to the requesting routing node and the routing response message is carried by a data packet.

With reference to the tenth aspect or any one of the foregoing implementation manners thereof, in another implementation manner of the tenth aspect, the third sending unit is specifically configured to send an active routing delivery message to each routing node except the requesting routing node among the routing nodes that the forwarding path passes through, where the active routing delivery message includes the routing information corresponding to each routing node, and the active routing delivery message is carried by an interest packet.

With reference to the tenth aspect or any one of the foregoing implementation manners thereof, in another implementation manner of the tenth aspect, the content request packet is an interest packet, and the routing request message is carried by an interest packet.

According to an eleventh aspect, a router is provided, including: a first receiving unit, configured to receive a content request packet, where the content request packet carries a content name of requested content; a first sending unit, configured to send a routing request message to a network controller when no forwarding entry that matches the content name received by the first receiving unit exists in a forwarding information base FIB, where the routing request message carries the content name; a second receiving unit, configured to receive a routing request response message delivered by the network controller, where the routing request response message carries first routing information, where the first routing information is used to indicate a forwarding port of the content request packet to the router, and the first routing information is determined by the network controller according to an acquired network name of the router, the content name, first registration information, and network topology information of a network controlled by the network controller, where the first registration information is used to indicate a correspondence between the content name, a network name of a target routing node, and a port of the target routing node, and the network topology information is used to indicate a topological structure of the network by using network names of routing nodes in the network; and a second sending unit, configured to forward the content request packet according to the first routing information received by the second receiving unit.

With reference to the eleventh aspect, in an implementation manner of the eleventh aspect, the first registration information is registration information of the requested content, where the registration information of the requested content includes the correspondence between the content name, the network name of the target routing node, and the port of the target routing node, and the target routing node is an edge routing node of the requested content; or the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container.

With reference to the eleventh aspect or any one of the foregoing implementation manners thereof, in another implementation manner of the eleventh aspect, the first routing information includes the content name and the forwarding port of the content request packet; and the second sending unit is specifically configured to match, according to the content name, the forwarding port in the first routing information, in routing information stored by the router; and forward the content request packet through the forwarding port in the first routing information.

With reference to the eleventh aspect or any one of the foregoing implementation manners thereof, in another implementation manner of the eleventh aspect, the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container; and the router further includes: a third receiving unit, configured to receive container tree set information of the requested content, which is sent by the network controller, where the container tree set information is acquired by the network controller by resolving the home container through a container resolution system, and the container tree set information includes a container name of at least one container including the home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; and a first adding unit, configured to add the container tree set information to the content request packet.

With reference to the eleventh aspect or any one of the foregoing implementation manners thereof, in another implementation manner of the eleventh aspect, the first routing information includes a first container name and a first port corresponding to the first container name, where the first container name is one of container names included in the container tree set information; and the second sending unit is specifically configured to match, according to the first container name included in the container tree set information carried in the content request packet, the first routing information in routing information stored by the router; and forward the content request packet through the first port.

With reference to the eleventh aspect or any one of the foregoing implementation manners thereof, in another implementation manner of the eleventh aspect, the router further includes: a first determining unit, configured to determine whether any content that matches the content name exists in a content store CS; a third sending unit, configured to send, when content that matches the content name exists in the CS, the matched content to a sender of the content request packet; a second determining unit, configured to determine, when no content that matches the content name of the requested content exists in the CS, whether any PIT entry that matches the content name of the requested content exists in a pending information table PIT; a fourth receiving unit, configured to add, when a PIT entry that matches the content name exists in the PIT, a port receiving the content request packet to the matched PIT entry; a third determining unit, configured to determine, when no PIT entry that matches the content name exists in the PIT, whether any forwarding entry that matches the content name exists in the FIB; and a fourth sending unit, configured to send, when a forwarding entry that matches the content name exists in the FIB, the content request packet according to the matched forwarding entry.

With reference to the eleventh aspect or any one of the foregoing implementation manners thereof, in another implementation manner of the eleventh aspect, the router further includes: a fifth receiving unit, configured to receive an active routing delivery message sent by the network controller, where the active routing delivery message carries another piece of routing information, where the another piece of routing information is used to indicate a forwarding port of another content request packet; a sixth receiving unit, configured to receive the another content request packet; and a fifth sending unit, configured to forward the another content request packet according to the another piece of routing information.

With reference to the eleventh aspect or any one of the foregoing implementation manners thereof, in another implementation manner of the eleventh aspect, the active routing delivery message is carried by an interest packet.

With reference to the eleventh aspect or any one of the foregoing implementation manners thereof, in another implementation manner of the eleventh aspect, the content request packet is an interest packet, the routing request message is carried by an interest packet, and the routing request response message is carried by a data packet.

According to a twelfth aspect, a network controller is provided, including: a first receiving unit, configured to receive a routing request message sent by a requesting routing node, where the routing request message carries container tree set information of a requested content, where the container tree set information includes a container name of at least one container including a home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; a first determining unit, configured to determine, according to registration information of each container in the at least one container stored or acquired by the network controller, an edge routing node of each container, where the registration information of each container is used to indicate a correspondence between a container name of each container and the edge routing node of each container; a second determining unit, configured to determine a topological range of each container according to the edge routing node of each container determined by the first determining unit and network topology information of a network controlled by the network controller, where the network topology information is used to indicate a topological structure of the network by using network names of routing nodes in the network, and the topological range is used to indicate an inclusion relationship between containers and routing nodes; a third determining unit, configured to determine, according to a network name of an edge routing node, determined by the first determining unit, of the home container, an acquired network name of the requesting routing node, and the network topology information, a forwarding path that starts from the requesting routing node and ends at the edge routing node of the home container; a fourth determining unit, configured to determine, according to the topological range of the at least one container determined by the second determining unit and the forwarding path determined by the third determining unit, routing information corresponding to the requesting routing node, where the routing information includes a container name and a port corresponding to the container name, where the container name is a container name of a container in the at least one container included in the container tree set information; and a first sending unit, configured to deliver the routing information corresponding to the requesting routing node and determined by the fourth determining unit to the requesting routing node, so that the requesting routing node forwards, according to the routing information, a content request packet corresponding to the requested content.

With reference to the twelfth aspect, in an implementation manner of the twelfth aspect, the network controller further includes: a fifth determining unit, configured to determine, according to the topological range of the at least one container determined by the second determining unit and the forwarding path determined by the third determining unit, routing information corresponding to each routing node except the requesting routing node among routing nodes that the forwarding path passes through, where the routing information includes a container name and a port corresponding to the container name, where the container name in the routing information corresponding to each routing node is a container name of a container in the at least one container included in the container tree set information; and a second sending unit, configured to deliver the routing information corresponding to each routing node to each routing node except the requesting routing node, so that each routing node forwards, according to the routing information corresponding to each routing node, the content request packet corresponding to the requested content.

With reference to the twelfth aspect or any one of the foregoing implementation manners thereof, in another implementation manner of the twelfth aspect, the fourth determining unit is specifically configured to determine a first topological range corresponding to the requesting routing node, in the topological range of the at least one container, and determine a next-hop routing node, on the forwarding path, of each routing node, where the first topological range is a maximum topological range in a remaining topological range after a topological range including the requesting routing node is excluded from the topological range of the at least one container; and use container names of containers corresponding to the first topological range and a port that points to the next-hop routing node, on the requesting routing node, as the routing information corresponding to each routing node.

With reference to the twelfth aspect or any one of the foregoing implementation manners thereof, in another implementation manner of the twelfth aspect, the first sending unit is specifically configured to send a routing response message to the requesting routing node, where the routing response message includes the routing information corresponding to the requesting routing node and the routing response message is carried by a data packet.

With reference to the twelfth aspect or any one of the foregoing implementation manners thereof, in another implementation manner of the twelfth aspect, the second sending unit is specifically configured to send an active routing delivery message to each routing node except the requesting routing node among the routing nodes that the forwarding path passes through, where the active routing delivery message includes the routing information corresponding to each routing node except the requesting routing node, and the active routing delivery message is carried by an interest packet.

With reference to the twelfth aspect or any one of the foregoing implementation manners thereof, in another implementation manner of the twelfth aspect, the content request packet is an interest packet, and the routing request message is carried by an interest packet.

According to a thirteenth aspect, a router is provided, including: a first receiving unit, configured to receive a content request packet, where the content request packet carries a content name of requested content; a first determining unit, configured to determine whether any forwarding entry that matches the content name of the requested content received by the first receiving unit exists in a forwarding information base FIB; a first sending unit, configured to send a routing request message to a network controller when the first determining unit determines that no forwarding entry that matches the content name of the requested content exists in the FIB, where the routing request message carries container tree set information, where the container tree set information includes a container name of at least one container including a home container of the requested content, and the container tree set information is used to indicate an access relationship between the at least one container; a second receiving unit, configured to receive a routing request response message sent by the network controller, where the routing request response message carries first routing information, where the first routing information includes a first container name and a port corresponding to the first container name, where the first container name is one of container names included in the container tree set information, and the first routing information is determined by the network controller according to an acquired network name of the router, the container tree set information, registration information of each container in the at least one container included in the container tree set information, and network topology information of a network controlled by the network controller, where the registration information of each container is used to indicate a correspondence between a container name of each container and an edge routing node of each container, and the network topology information is used to indicate a topological structure of the network by using network names of routing nodes in the network; a first matching unit, configured to match, according to the container name of the at least one container included in the container tree set information, the first routing information received by the second receiving unit, in routing information stored by the router; and a second sending unit, configured to forward the content request packet through the port corresponding to the first container name, in the first routing information matched by the first matching unit.

With reference to the thirteenth aspect, in an implementation manner of the thirteenth aspect, the router further includes: a third receiving unit, configured to receive an active routing delivery message sent by the network controller, where the active routing delivery message carries another piece of routing information, where the another piece of routing information carries another container name and a port corresponding to the another container name; a fourth receiving unit, configured to receive another content request packet, where the another content request packet carries the another container name; a second matching unit, configured to match, according to the another container name, the another piece of routing information in the routing information stored by the router; and a third sending unit, configured to forward the another content request packet through the port corresponding to the another container name.

With reference to the thirteenth aspect or any one of the foregoing implementation manners thereof, in another implementation manner of the thirteenth aspect, the active routing delivery message is carried by an interest packet.

With reference to the thirteenth aspect or any one of the foregoing implementation manners thereof, in another implementation manner of the thirteenth aspect, the router further includes: a third determining unit, configured to determine whether any content that matches the content name exists in a content store CS; a fourth sending unit, configured to send, when content that matches the content name exists in the CS, the matched content to a sender of the content request packet; a fourth determining unit, configured to determine, when no content that matches the content name of the requested content exists in the CS, whether any PIT entry that matches the content name of the requested content exists in a pending information table PIT; a first adding unit, configured to add, when a PIT entry that matches the content name exists in the PIT, a port receiving the content request packet to the matched PIT entry; a fifth determining unit, configured to determine, when no PIT entry that matches the content name exists in the PIT, whether any forwarding entry that matches the content name exists in the FIB; and a fifth sending unit, configured to send, when a forwarding entry that matches the content name exists in the FIB, the content request packet according to the matched forwarding entry.

With reference to the thirteenth aspect or any one of the foregoing implementation manners thereof, in another implementation manner of the thirteenth aspect, the content request packet is an interest packet, the routing request message is carried by an interest packet, and the routing request response message is carried by a data packet.

According to a fourteenth aspect, a network controller is provided, including: a first receiving unit, configured to receive a content registration message sent by a first routing node, where the content registration message carries content registration information used to indicate a correspondence between a content name, a network name of the first routing node, and a first port of the first routing node, where the first port is a port through which the first routing node receives a content registration request packet corresponding to a content to be registered; and a first storing unit, configured to store the content registration information received by the first receiving unit.

With reference to the fourteenth aspect, in an implementation manner of the fourteenth aspect, the first routing node is an edge routing node of the content to be registered, and the content registration information includes a content name of the content to be registered and the first port.

With reference to the fourteenth aspect or any one of the foregoing implementation manners thereof, in another implementation manner of the fourteenth aspect, the first storing unit is specifically configured to determine whether any content that matches the content name of the content to be registered exists in registered content; when the matched content does not exist, store the content name of the content to be registered, and store a correspondence between the content name of the content to be registered, the acquired network name of the first routing node, and the first port; and when the matched content exists, add the correspondence between the content name of the content to be registered, the network name of the first routing node, and the first port to registration information of the matched content.

With reference to the fourteenth aspect or any one of the foregoing implementation manners thereof, in another implementation manner of the fourteenth aspect, the network controller further includes: a second receiving unit, configured to receive a content deregistration message sent by a second routing node, where the content deregistration message carries a content name of content to be deregistered and a second port, where the second routing node is an edge routing node of the content to be deregistered, and the second port is a port through which the second routing node receives a content deregistration request packet corresponding to the content to be deregistered; a first determining unit, configured to determine first registered content, where the first registered content is content that is in the registered content and matches the content name of the content to be deregistered; and a first deleting unit, configured to delete a correspondence between the content name of the content to be deregistered, an acquired network name of the second routing node, and the second port from registration information of the first registered content.

With reference to the fourteenth aspect or any one of the foregoing implementation manners thereof, in another implementation manner of the fourteenth aspect, the content registration information includes a correspondence between a content name of the content to be registered and a container name of a home container of the content to be registered, and a correspondence between the container name of the home container of the content to be registered, the network name of the first routing node, and the first port of the first routing node, where the first routing node is an edge routing node of the home container of the content to be registered.

With reference to the fourteenth aspect or any one of the foregoing implementation manners thereof, in another implementation manner of the fourteenth aspect, the first storing unit is specifically configured to determine whether any content that matches the content name of the content to be registered exists in registered content; when the matched content exists, add the correspondence between the content name of the content to be registered and the container name of the home container of the content to be registered, to registration information of the matched content; and when the matched registered content does not exist, store the content name of the content to be registered, and store the correspondence between the content name of the content to be registered and the container name of the home container of the content to be registered.

With reference to the fourteenth aspect or any one of the foregoing implementation manners thereof, in another implementation manner of the fourteenth aspect, the network controller further includes: a third receiving unit, configured to receive a content deregistration message sent by a third routing node, where the content deregistration message carries a content name of content to be deregistered and a container name of a home container of the content to be deregistered; a second determining unit, configured to determine second registered content, where the second registered content is registered content that matches the content name of the content to be registered; and a second deleting unit, configured to delete the correspondence between the content name of the content to be deregistered and the container name of the home container of the content to be deregistered from registration information of the second registered content.

With reference to the fourteenth aspect or any one of the foregoing implementation manners thereof, in another implementation manner of the fourteenth aspect, the content deregistration message is carried by an interest packet.

With reference to the fourteenth aspect or any one of the foregoing implementation manners thereof, in another implementation manner of the fourteenth aspect, the network controller further includes: a fourth receiving unit, configured to receive a container registration message sent by a fourth routing node, where the fourth routing node is an edge routing node of a container to be registered, and the container registration message carries a container name of the container to be registered and a fourth port, where the fourth port is a port through which the fourth routing node receives a container registration request packet corresponding to the container to be registered; a third determining unit, configured to determine whether any container that matches the container name of the container to be registered exists in registered containers; a first adding unit, configured to add, when the matched container exists, a correspondence between the container name of the container to be registered, an acquired network name of the fourth routing node, and the fourth port to registration information of the matched container; and a second storing unit, configured to: when the matched container does not exist, store the container name of the container to be registered, and store the correspondence between the container name of the container to be registered, the network name of the fourth routing node, and the fourth port.

With reference to the fourteenth aspect or any one of the foregoing implementation manners thereof, in another implementation manner of the fourteenth aspect, the network controller further includes: a fifth receiving unit, configured to receive a container deregistration message sent by a fifth routing node, where the fifth routing node is an edge routing node of a container to be deregistered, and the container deregistration message carries a container name of the container to be deregistered and a fifth port, where the fifth port is a port through which the fifth routing node receives a container deregistration request packet corresponding to the container to be deregistered; a fourth determining unit, configured to determine a third registered container, where a container name of the third registered container matches the container name of the container to be deregistered; and a third deleting unit, configured to delete a correspondence between the container name of the container to be deregistered, an acquired network name of the fifth routing node, and the fifth port from registration information of the third registered container.

With reference to the fourteenth aspect or any one of the foregoing implementation manners thereof, in another implementation manner of the fourteenth aspect, the container deregistration message is carried by an interest packet.

With reference to the fourteenth aspect or any one of the foregoing implementation manners thereof, in another implementation manner of the fourteenth aspect, the content registration message is carried by an interest packet.

According to a fifteenth aspect, a router is provided, including: a first receiving unit, configured to receive a content registration request packet, where the content registration request packet carries a content name of content to be registered; a first determining unit, configured to determine content registration information according to the content registration request packet received by the first receiving unit, where the content registration information is used to indicate a correspondence between the content name, a network name of the router, and a first port of the router, where the first port is a port through which the router receives the content registration request packet; and a first sending unit, configured to send a content registration message to a network controller, where the content registration message carries the content registration information determined by the first determining unit, so that the network controller stores the content registration information.

With reference to the fifteenth aspect, in an implementation manner of the fifteenth aspect, the first determining unit is specifically configured to determine the content name of the content to be registered and the first port as the content registration information.

With reference to the fifteenth aspect or any one of the foregoing implementation manners thereof, in another implementation manner of the fifteenth aspect, the router further includes: a second receiving unit, configured to receive a content deregistration request packet, where the content deregistration request packet carries a content name of content to be deregistered; a second determining unit, configured to determine content deregistration information according to the content deregistration request packet, where the content deregistration information includes the content name of the content to be deregistered and a second port, where the second port is a port through which the router receives the content deregistration request packet; and a second sending unit, configured to send a content deregistration message to the network controller, where the content deregistration message carries the content deregistration information.

With reference to the fifteenth aspect or any one of the foregoing implementation manners thereof, in another implementation manner of the fifteenth aspect, the content registration request packet further carries a container name of a home container of the content to be registered, and the content registration information includes a correspondence between the content name of the content to be registered and the container name of the home container of the content to be registered, and a correspondence between the container name of the home container of the content to be registered, the network name of the router, and the first port of the router, where the router is an edge routing node of the home container of the content to be registered.

With reference to the fifteenth aspect or any one of the foregoing implementation manners thereof, in another implementation manner of the fifteenth aspect, the router further includes: a third receiving unit, configured to receive a content deregistration request packet, where the content deregistration request packet carries a content name of content to be deregistered and a container name of a home container of the content to be deregistered; and a third sending unit, configured to send a content deregistration message to the network controller, where the content deregistration message carries the content name of the content to be deregistered and the container name of the home container of the content to be deregistered.

With reference to the fifteenth aspect or any one of the foregoing implementation manners thereof, in another implementation manner of the fifteenth aspect, the content deregistration request packet is an interest packet, and the content deregistration message is carried by an interest packet.

With reference to the fifteenth aspect or any one of the foregoing implementation manners thereof, in another implementation manner of the fifteenth aspect, the router further includes: a fourth receiving unit, configured to receive a container registration request packet, where the container registration request packet carries a container name of a container to be registered; a third determining unit, configured to determine a fourth port, where the fourth port is a port through which the router receives the container registration request packet; and a fourth sending unit, configured to send a container registration message to the network controller, where the container registration message carries the container name of the container to be registered and the fourth port.

With reference to the fifteenth aspect or any one of the foregoing implementation manners thereof, in another implementation manner of the fifteenth aspect, the container registration request packet is an interest packet, and the container registration message is carried by an interest packet.

With reference to the fifteenth aspect or any one of the foregoing implementation manners thereof, in another implementation manner of the fifteenth aspect, the router further includes: a fifth receiving unit, configured to receive a container deregistration request packet, where the container deregistration request packet carries a container name of a container to be deregistered; a fourth determining unit, configured to determine a fifth port, where the fifth port is a port through which the router receives the container deregistration request packet; and a fifth sending unit, configured to send a container deregistration message to the network controller, where the container deregistration message carries the container name of the container to be deregistered and the fifth port.

With reference to the fifteenth aspect or any one of the foregoing implementation manners thereof, in another implementation manner of the fifteenth aspect, the content registration request packet is an interest packet, and the content registration message is carried by an interest packet.

According to a sixteenth aspect, a network controller is provided, including: a receiving unit, configured to receive a content registration message sent by a first routing node, where the content registration message carries content registration information used to indicate a storage position of content to be registered; and a storing unit, configured to store the content registration information.

With reference to the sixteenth aspect, in an implementation manner of the sixteenth aspect, the content registration information is used to indicate a correspondence between a content name, a network name of the first routing node, and a first port of the first routing node, where the first port is a port through which the first routing node receives a content registration request packet corresponding to a content to be registered.

With reference to the sixteenth aspect or any one of the foregoing implementation manners thereof, in another implementation manner of the sixteenth aspect, the content registration information includes a content name of the content to be registered and the first port of the first routing node.

With reference to the sixteenth aspect or any one of the foregoing implementation manners thereof, in another implementation manner of the sixteenth aspect, the content registration information includes a correspondence between a content name of the content to be registered and a container name of a home container of the content to be registered, and a correspondence between the container name of the home container of the content to be registered, the network name of the first routing node, and the first port of the first routing node, where the first routing node is an edge routing node of the home container of the content to be registered.

According to a seventeenth aspect, a network controller is provided, including: a first receiving unit, configured to receive a routing request message sent by a requesting routing node, where the routing request message carries a first name; a first determining unit, configured to determine a network name of a target routing node according to the first name received by the first receiving unit; a second determining unit, configured to determine, according to an acquired network name of the requesting routing node, the network name of the target routing node determined by the first determining unit, and network topology information of a network controlled by the network controller, a forwarding path from the requesting routing node to the target routing node, where the network topology information is used to indicate a topological structure of the network by using network names of routing nodes in the network; a third determining unit, configured to determine routing information corresponding to each routing node except the target routing node among routing nodes that the forwarding path determined by the second determining unit passes through, where the routing information corresponding to each routing node includes the network name of the target routing node and a port that points to a next-hop routing node, on each routing node on the forwarding path; and a first sending unit, configured to deliver the routing information corresponding to each routing node and determined by the third determining unit to each routing node.

With reference to the seventeenth aspect, in an implementation manner of the seventeenth aspect, the routing request message is used to request a forwarding path of a content response packet, the first name is the network name of the target routing node, the target routing node is a first one routing node that a content request packet corresponding to the content response packet passes through, the content response packet is a data packet, and the content request packet is an interest packet.

With reference to the seventeenth aspect or any one of the foregoing implementation manners thereof, in another implementation manner of the seventeenth aspect, the routing request message is used to request a forwarding path of a content request packet, where the content request packet is an interest packet; the first name is a content name of requested content carried in the content request packet; the network controller stores registration information of the requested content, where the registration information of the requested content is used to indicate a correspondence between the content name of the requested content and the network name of the target routing node; the target routing node is an edge routing node of the requested content; and the first determining unit is specifically configured to acquire the network name of the target routing node from the registration information of the requested content according to the content name.

With reference to the seventeenth aspect or any one of the foregoing implementation manners thereof, in another implementation manner of the seventeenth aspect, the routing request message is carried by an interest packet; and the first sending unit is specifically configured to send a routing response message to the requesting routing node, where the routing response message includes the routing information corresponding to the requesting routing node and the routing response message is carried by a data packet; and send an active routing delivery message to each routing node except the requesting routing node and the target routing node among the routing nodes that the forwarding path passes through, where the active routing delivery message includes the routing information corresponding to each routing node, and the active routing delivery message is carried by an interest packet.

According to an eighteenth aspect, a router is provided, including: a first receiving unit, configured to receive a message packet, where the message packet carries a first name; a first sending unit, configured to send a routing request message to a network controller when no forwarding entry that matches the first name received by the first receiving unit exists in a forwarding information base FIB, where the routing request message carries the first name; and a second receiving unit, configured to receive a routing request response message delivered by the network controller, where the routing request response message carries first routing information, where the first routing information includes a network name of a target routing node and a forwarding port of the message packet, and the first routing information is determined by the network controller according to the first name, an acquired network name of the router, and network topology information of a network controlled by the network controller, where the network topology information is used to indicate a topological structure of the network by using network names of routing nodes in the network.

With reference to the eighteenth aspect, in an implementation manner of the eighteenth aspect, the message packet is a content response packet, the message packet is a data packet, the first name is the network name of the target routing node, the target routing node is a first one routing node that a content request packet corresponding to the content response packet passes through, and the content request packet is an interest packet.

With reference to the eighteenth aspect or any one of the foregoing implementation manners thereof, in another implementation manner of the eighteenth aspect, the router further includes: a first determining unit, configured to determine whether any forwarding entry that matches the network name of the target routing node exists in the FIB; and a second sending unit, configured to send, when a forwarding entry that matches the network name of the target routing node exists in the FIB, the content response packet according to the matched forwarding entry.

With reference to the eighteenth aspect or any one of the foregoing implementation manners thereof, in another implementation manner of the eighteenth aspect, the message packet is a content request packet, the content request packet is an interest packet, the first name is a content name of requested content carried in the content request packet, and the target routing node is an edge routing node of the requested content.

With reference to the eighteenth aspect or any one of the foregoing implementation manners thereof, in another implementation manner of the eighteenth aspect, the router further includes: a second determining unit, configured to determine whether any content that matches the content name exists in a content store CS; a third sending unit, configured to send, when content that matches the content name exists in the CS, the matched content to a sender of the content request packet; a third determining unit, configured to determine, when no content that matches the content name of the requested content exists in the CS, whether any forwarding entry that matches the content name of the requested content exists in the FIB; and a fourth sending unit, configured to send, when a forwarding entry that matches the content name exists in the FIB, the content request packet according to the matched forwarding entry.

With reference to the eighteenth aspect or any one of the foregoing implementation manners thereof, in another implementation manner of the eighteenth aspect, the router further includes: a third receiving unit, configured to receive an active routing delivery message sent by the network controller, where the active routing delivery message carries another piece of routing information, where the another piece of routing information includes a network name of another target routing node and a forwarding port corresponding to the another target routing node; a fourth receiving unit, configured to receive another content request packet, where the another content request packet includes the network name of the another target routing node; and a fifth sending unit, configured to forward the another content request packet through the forwarding port in the another piece of routing information.

With reference to the eighteenth aspect or any one of the foregoing implementation manners thereof, in another implementation manner of the eighteenth aspect, the active routing delivery message is carried by an interest packet.

With reference to the eighteenth aspect or any one of the foregoing implementation manners thereof, in another implementation manner of the eighteenth aspect, the routing request message is carried by an interest packet, and the routing request response message is carried by a data packet.

According to a nineteenth aspect, a system for routing and forwarding is provided, including at least one network controller and two or more than two routing nodes communicatively connected with the network controller, where: the routing nodes include a requesting routing node and a target routing node; the requesting routing node is configured to receive a content request packet, where the content request packet carries a content name of requested content; when no forwarding entry that matches the content name exists in a forwarding information base FIB, send a routing request message to the network controller, where the routing request message carries the content name; receive routing information sent by the network controller, where the routing information is used to indicate a forwarding port of the content request packet to the requesting routing node; and forward the content request packet according to the routing information; and the network controller is configured to receive the routing request message sent by the requesting routing node; determine, according to the content name carried in the routing request message and first registration information stored or acquired by the network controller, a network name of the target routing node corresponding to the content name and a port of the target routing node, where the content request packet can be routed to the requested content through the port of the target routing node, and the first registration information is used to indicate a correspondence between the content name, the network name of the target routing node, and the port of the target routing node; determine, according to the network name of the target routing node and an acquired network name of the requesting routing node, a forwarding path in network topology information of a network controlled by the network controller, where the forwarding path starts from the requesting routing node and ends at the target routing node, and the network topology information is used to indicate a topological structure of the network by using network names of routing nodes in the network; determine, according to the forwarding path, routing information corresponding to the requesting routing node, where the routing information is used to indicate a first port through which the requesting routing node forwards the content request packet, where the first port points to a next-hop routing node corresponding to the requesting routing node on the forwarding path; and send the routing information corresponding to the requesting routing node to the requesting routing node.

With reference to the nineteenth aspect, in an implementation manner of the nineteenth aspect, the first registration information includes registration information of the requested content and registration information of a home container of the requested content, where the registration information of the requested content is used to indicate a correspondence between the content name and a container name of the home container, and the registration information of the home container is used to indicate a correspondence between the container name of the home container, the network name of the target routing node, and the port of the target routing node; and the network controller is specifically configured to acquire, according to the content name, the container name of the home container corresponding to the content name, from the registration information of the requested content; and acquire, according to the container name of the home container, the network name of the target routing node corresponding to the container name of the home container and the port of the target routing node, from the registration information of the home container, where the target routing node is an edge routing node of the home container.

According to a twentieth aspect, a content registration system is provided, including at least one network controller and at least one routing node connected to the network controller, where: the routing node is configured to receive a content registration request packet, where the content registration request packet carries a content name of content to be registered; determine content registration information according to the content registration request packet, where the content registration information is used to indicate a correspondence between the content name, a network name of the routing node, and a first port of the routing node, where the first port is a port through which the routing node receives the content registration request packet; and send a content registration message to the network controller, where the content registration message carries the content registration information; and the network controller is configured to receive the content registration message sent by the routing node, where the content registration message carries the content registration information; and store the content registration information.

With reference to the twentieth aspect, in an implementation manner of the twentieth aspect, the content registration information includes a correspondence between the content name of the content to be registered and a container name of a home container of the content to be registered, and a correspondence between the container name of the home container of the content to be registered, the network name of the routing node, and the first port of the routing node, where the routing node is an edge routing node of the home container of the content to be registered.

To conclude, by using the method for routing and forwarding, the content registration method, and the corresponding router, network controller, and system provided by the embodiments of the present invention, registration information and a network topology diagram are stored in the network controller, so that the network controller may be used to determine a forwarding path of a content request packet, which reduces blindness of routing and forwarding of the content request packet in an ICN network and improves efficiency of routing and forwarding.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
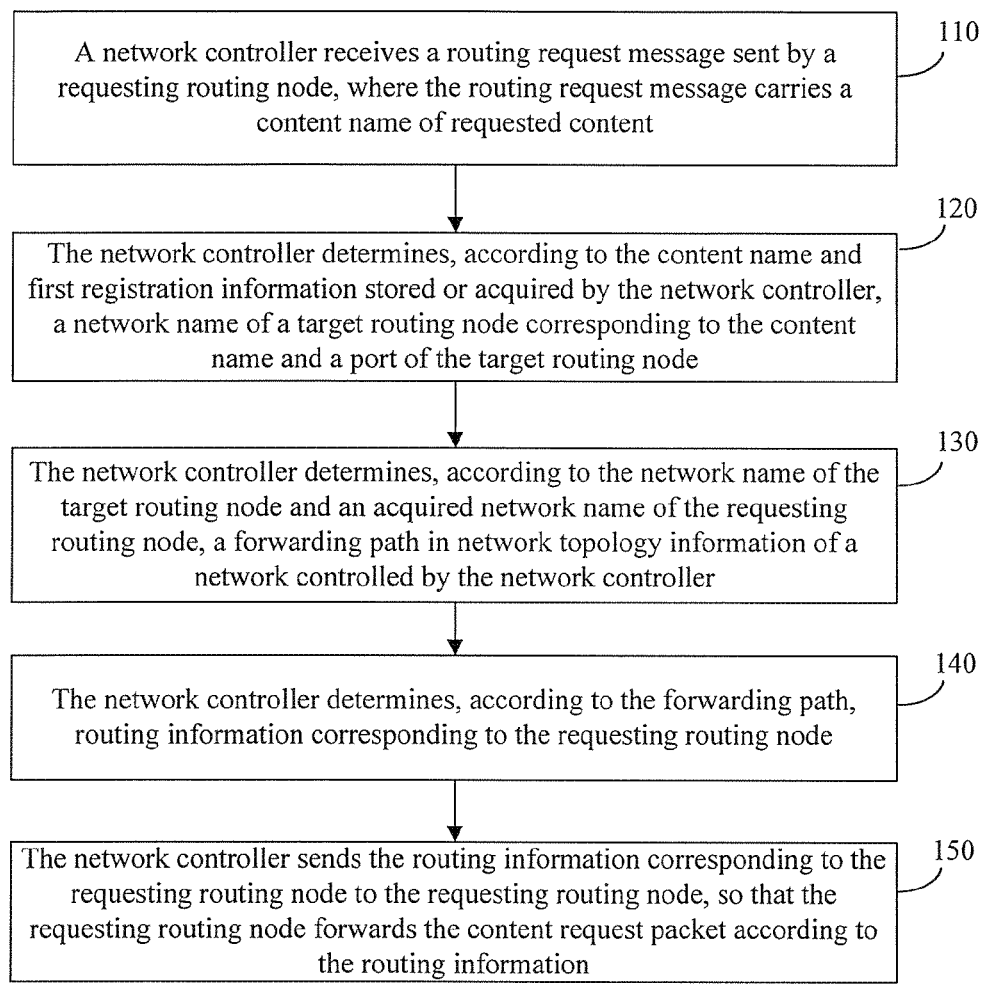
FIG. 1 is a schematic flowchart of a method for routing and forwarding according to an embodiment of the present invention.

FIG. 1 is a schematic flowchart of a method for routing and forwarding according to an embodiment of the present invention. The method in FIG. 1 is performed by a network controller. The method in FIG. 1 includes:

110. A network controller receives a routing request message sent by a requesting routing node, where the routing request message carries a content name of requested content.

120. The network controller determines, according to the content name and first registration information stored or acquired by the network controller, a network name of a target routing node corresponding to the content name and a port of the target routing node, where a content request packet corresponding to the requested content can be routed to the requested content through the port of the target routing node, and the first registration information is used to indicate a correspondence between the content name, the network name of the target routing node, and the port of the target routing node.

In an implementation manner, the first registration information is stored on the network controller. In some other implementation manners, the first registration information may be stored in a data storage center or other storage devices, and the network controller acquires the first registration information by accessing the data storage center or other storage devices. The embodiment of the present invention does not limit the type of the data storage center or other storage devices.

130. The network controller determines, according to a network name of the target routing node and an acquired network name of the requesting routing node, a forwarding path in network topology information of a network controlled by the network controller, where the forwarding path starts from the requesting routing node and ends at the target routing node, and the network topology information is used to indicate a topological structure of the network by using network names of routing nodes in the network.

140. The network controller determines, according to the forwarding path, routing information corresponding to the requesting routing node, where the routing information is used to indicate a first port through which the requesting routing node forwards the content request packet, where the first port points to a next-hop routing node corresponding to the requesting routing node on the forwarding path.

150. The network controller sends the routing information corresponding to the requesting routing node to the requesting routing node, so that the requesting routing node forwards the content request packet according to the routing information.

As can be seen, in the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

In an implementation manner, after step 130, the method further includes: determining, by the network controller according to the forwarding path and the port of the target routing node, routing information corresponding to each routing node except the requesting routing node among routing nodes that the forwarding path passes through, where the routing information is used to indicate a port through which a routing node corresponding to the routing information forwards the content request packet; and delivering, by the network controller, the routing information corresponding to each routing node, to each routing node except the requesting routing node among the routing nodes that the forwarding path passes through, so that each routing node forwards the content request packet according to the routing information corresponding to each routing node.

Specifically, the network controller determines a next-hop routing node, on the forwarding path, of each routing node except the requesting routing node and the target routing node among the routing nodes that the forwarding path passes through; and the network controller determines the content name and a port that points to the next-hop routing node, on each routing node, as the routing information corresponding to each routing node, and determines the content name and the port of the target routing node as routing information corresponding to the target routing node.

It should be noted that the sequence of performing this step and step 140 and step 150 is not limited, and that the steps may also be performed simultaneously.

As can be seen, the network controller may also calculate routing information of other routing nodes on the forwarding path except the requesting routing node, and actively deliver the routing information to each routing node to further improve efficiency of routing and forwarding.

In another implementation manner, other routing nodes except the requesting routing node may send a routing request message to the network controller when receiving a content request packet. The network controller delivers corresponding routing information according to the routing request message. In this case, the manner of acquiring the routing information of other routing nodes is similar to the manner of acquiring the routing information of the requesting routing node, and is not repeated herein.

It should be noted that the embodiment of the present invention does not limit the specific form of the first registration information.

Optionally, as an embodiment, the first registration information may be registration information of the requested content, and the target routing node is an edge routing node of the requested content; and the determining, by the network controller, according to the content name and first registration information stored or acquired by the network controller, a network name of a target routing node corresponding to the content name and a port of the target routing node, may include: acquiring, by the network controller, the network name of the target routing node and the port of the target routing node, from the registration information of the requested content.

Specifically, the network controller may store registration information (such as a content name and an edge routing node and a port corresponding to the content name) of registered content in the network to a content database. When the network controller receives the content name of the requested content, the network controller searches the content database for registration information of the requested content to determine an edge routing node of the requested content and a port of the edge routing node.

Specifically, the specific form of the registration information of the requested content may be shown in Table 1.

TABLE 1

Registration information of the requested content

| Content Name | Network Name of an Edge Routing Node | Forwarding Port |
|---|---|---|
| China\GD\Huawei | Ra, Re | 3, 1 |
| China\BJ\Cisco | Rf | 5 |

For example, when the content name is China\GD\Huawei, as can be known from Table 1, China\GD\Huawei has two edge routing nodes Ra and Re, and corresponding forwarding ports are 3 and 1 respectively. In this case, the network name of the target routing node and the port of the target routing node may be Ra and 3, or may be Re and 1. As can be known, the network name of the target routing node and the port of the target routing node may be a concept of a set, and the network name of the target routing node may include a network name of one or more edge routing nodes, but the network name of the target routing node is in a one-to-one correspondence with the port of the target routing node.

It should be noted that the edge routing node of the requested content is a routing node directly connected to the requested content, that is, a last-hop routing node corresponding to the requested content. For example, as shown in Table 1, routing to the requested content corresponding to the content name China\GD\Huawei may be directly performed through the forwarding port 3 of Ra or the forwarding port 1 of Re.

Optionally, as another embodiment, the first registration information may include registration information of the requested content and registration information of a home container of the requested content, where the registration information of the requested content is used to indicate a correspondence between the content name and a container name of the home container, the registration information of the home container is used to indicate a correspondence between the container name of the home container, the network name of the target routing node, and the port of the target routing node, and the target routing node is an edge routing node of the home container; and the determining, by the network controller according to the content name and first registration information stored or acquired by the network controller, a network name of a target routing node corresponding to the content name and a port of the target routing node, includes: acquiring, by the network controller, the container name of the home container from the registration information of the requested content according to the content name; and acquiring, by the network controller, the network name of the target routing node and the port of the target routing node from the registration information of the home container according to the container name of the home container.

Specifically, the network controller may include a content name database and a container database, where the content name database stores a correspondence between registered content in the network and a home container of the registered content, and the container database stores a correspondence between a registered container in the network, an edge routing node of the registered container, and a port of the edge routing node. When the network controller receives the content name of the requested content, the network controller first searches the content database for registration information of the requested content to acquire the container name of the home container of the requested content; and then searches the container database for the registration information of the home container according to the container name to acquire an edge routing node of the home container and a port of the edge routing node.

It should be noted that in the embodiment of the present invention, a container is a storage space used to store a group of content, where the group of content may be one or more pieces of content. For example, a whole network of a country may be considered as a country-level container, where the container is a storage space of all content within the network of the country. Similarly, a whole network of a province may be considered as a province-level container, where the province-level container is a storage space of all content within the network of the province. In addition, a whole network of a company or an organization may be considered as a storage space of all content within the network of the company or organization. A network formed by mobile devices, such as an airplane, a train, or a ship, may be considered as a storage space of all content within the network formed by the mobile devices. A network formed by a mobile phone, a host, or other electronic devices that store content may also be considered as a storage space of all content within the network. The embodiment of the present invention is not limited thereto. Correspondingly, a container identifier of a container may be any content identifier prefix, for example, fanlingyuan.com/blog, or may be a company or an organization, for example, huawei.com or tsinghua.edu, or may be a mobile network, for example, an airplane, a train, or a ship, such as airchina/cal314, or may be a mobile phone, a host, or other electronic devices storing content, for example, chinamobile/fanlingyuan, or may be a network domain, for example, cn, cn/gd, and cn/sd. A container may correspond to a container identifier, or may correspond to more than two container identifiers, which is not limited in the embodiment of the present invention. However, for ease of description, in the following description, it is assumed that containers correspond to container identifiers on a one-to-one basis, and that a container identifier is used to represent a container.

In addition, a container may include another container in a topological relationship. For example, a province-level network is a part of a country network, and therefore, it may be considered that the country container includes the province-level container in a topological relationship. A container may further include an access container, where the access container is a container including another container in a topological relationship and having a forwarding entry for routing the content request packet to the other container. That is, an access container of a container is a container including the container in a topological relationship and having a forwarding entry for routing the content request packet to the container. Specifically, when container B includes container A, and a forwarding entry for routing the content request packet to container A exists in container B, container B is defined as an access container of container A, and container B provides an access service for container A. A container may provide an access service for one or more other containers, and one or more other containers may provide an access service for a same container. In other words, a container may be an access container of one or more other containers, and one or more other containers may be access containers of a same container.

In a network architecture, a container includes at least one routing node, where one or more routing nodes in the at least one routing node are responsible for forwarding of a content request packet, and the container is referred to as a home container of the at least one routing node. The content request packet can be routed to the container through the one or more routing nodes in the at least one routing node included in the access container of the container. For example, if a country-level container "cn" includes province-level containers "cn/gd" and "cn/sd" in a topological relationship, and the content request packet can be routed to the province-level containers "cn/gd" and "cn/sd" and so on through one or more routing nodes included in the country-level container "cn", the country-level container "cn" provides an access service for the province-level containers "cn/gd" and "cn/sd" and so on; if containers "huawei.com/cn" and "huawei.com/us" include a container "huawei.com" in a topological relationship, and the content request packet can be routed to the container "huawei.com" through one or more routing nodes included in the containers "huawei.com/cn" and "huawei.com/us", the containers "huawei.com/cn" and "huawei.com/us" provide an access service for the container "huawei.com". However, the embodiment of the present invention is not limited thereto.

It should further be noted that the home container of the requested content is a container through which the requested content can be routed to directly; a forwarding entry corresponding to the content name of the requested content exists in the home container of the requested content, and the content name of the requested content corresponds to the home container of the requested content. The requested content may have one or more home containers. Correspondingly, the content name of the requested content may correspond to one or more home containers, where the requested content can be routed in the home container corresponding to the content name of the requested content.

Specifically, the specific form of the registration information of the requested content may be shown in Table 2.

TABLE 2

Registration information of the requested content

| Content Name | Container |
| --- | --- |
| China\GD\Huawei | E1 |
| China\BJ\Cisco | E2 |

For example, assuming that the content name in step 110 is China\GD\Huawei, as can be known from Table 2, the home container of China\GD\Huawei is E1. It should be noted that there may be a plurality of home containers of the content name, which is not limited in the embodiment of the present invention.

The specific form of the registration information of the container may be shown in Table 3.

TABLE 3

Registration information of the container

| Container Name | Network Name of an Edge Router | Forwarding Port |
| --- | --- | --- |
| E1 | Rc | 3 |
| E2 | Re | 5 |

As can be known from Table 3, the edge router of E1 is Rc, and the corresponding port is 3. Therefore, registration information of content whose content name is China\GD\Huawei in Table 2 and registration information of E1 (a home container of China\GD\Huawei) in Table 3 jointly form the first registration information in step 120. A correspondence between China\GD\Huawei, Rc, and port 3 of Rc is established by using the first registration information.

It should be noted that the edge routing node of the container may be a routing node directly connected to the container, that is, a last-hop routing node corresponding to the container. Routing to the container can be directly performed through the edge routing node. For example, as shown in Table 3, routing to container E1 may be directly performed through port 3 of the edge routing node Rc.

It should be understood that the present invention does not limit the specific manner of acquiring the network name of the requesting routing node by the network controller in step 130. Specifically, the routing request message in step 110 may directly carry the network name of the requesting routing node, or the network controller pre-establishes a correspondence between ports of the network controller and routing nodes in the network. When receiving a routing request message sent by the requesting routing node, the network controller acquires the network name of the requesting routing node by using a port receiving the routing request message and the pre-established correspondence.

It should be understood that the network topology information in step 130 reflects a topological structure of an ICN network managed by the network controller, that is, a topological relationship between network devices (such as routing nodes) in the ICN network. Different from an IP network using a position to identify a network device, the network topology information of the ICN network uses a network name of a network device to identify a topological relationship of the network device, and it is unnecessary to acquire a physical position of each network device. When an actual physical connection exists between two network devices, it is reflected in the network topology information that a neighboring relationship exists between the two network devices. Therefore, the network topology information may be established in a manner of determining a connection relationship between network devices by mutually broadcasting messages.

Figure 2:
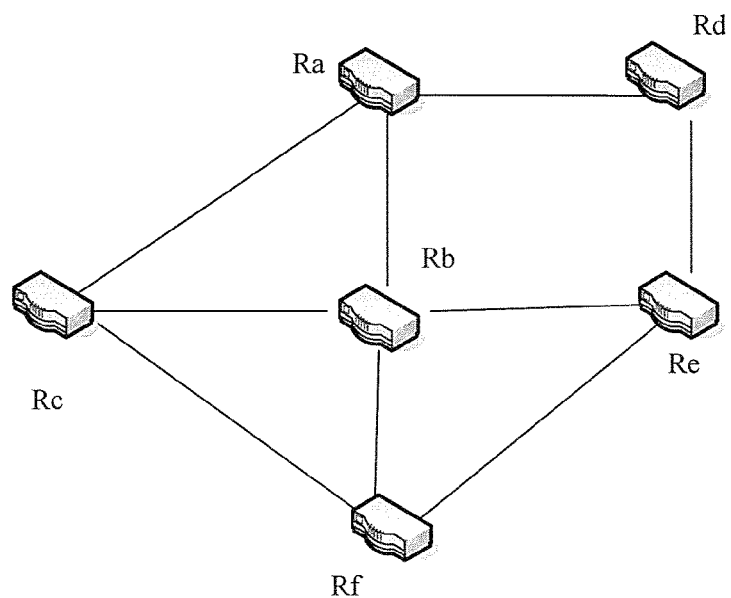
FIG. 2 is a schematic diagram of a network topology according to an embodiment of the present invention.

It should be noted that the embodiment of the present invention does not limit the specific form of the network topology information, which may be, for example, in the form of a network topology diagram or in other data structures that can indicate a topological relationship. For example, FIG. 2 is a schematic diagram in which network topology information is indicated in a form of a network topology diagram. In FIG. 2, the network controller controls 6 routing nodes whose network names are respectively Ra, Rb, Rc, Rd, Re, and Rf. Using Ra as an example, a physical connection exists between Ra and Rb, and a physical connection exists between Rc and Rd. Reflected in FIG. 2, a connection exists between Ra and Rb and a connection exists between Rc and Rd.

It should be understood that the embodiment of the present invention does not specifically limit the manner of determining a forwarding path in step 130. Specifically, the network controller first determines a reachable path from the requesting routing node to the target routing node according to the network topology information, and after calculating a first reachable path, determines the path as the forwarding path; or the network controller selects a shortest path (for example, by using an all pairs shortest paths algorithm (APSP, All Pairs Shortest Paths), that is, a Floyd algorithm) from all calculated reachable paths, as the forwarding path; the network controller may also select a securest path as the forwarding path.

It should be further understood that when the target routing node is a plurality of routing nodes (for example, the requested content has a plurality of edge routers or the home container of the requested content has a plurality of edge routers), the network controller may comprehensively consider a topological relationship between the plurality of routing nodes and the requesting routing node, and select an optimum forwarding path (for example, a shortest or securest one).

It should be understood that the embodiment of the present invention does not specifically limit the manner of determining routing information in step 140.

Optionally, as an embodiment, the determining, by the network controller according to the forwarding path and the port of the target routing node, routing information corresponding to each routing node except the requesting routing node among routing nodes that the forwarding path passes through, may include: determining, by the network controller, a next-hop routing node, on the forwarding path, of each routing node except the requesting routing node and the target routing node among the routing nodes that the forwarding path passes through; and using, by the network controller, the content name and a port that points to the next-hop routing node, on each routing node, as the routing information corresponding to each routing node, and using the content name and the port of the target routing node as routing information corresponding to the target routing node.

For example, the forwarding path of the content name China\GD\Huawei determined in step 130 is Ra-Rb-Rc, where Rc is an edge routing node of the requested content, Rc requested content corresponding to China\GD\Huawei may be routed to through port 3 of Rc, Ra is connected to Rb through port 1, and Rb is connected to Rc through port 2. Therefore, the network controller delivers routing information to Ra, Rb, and Rc separately, where routing information of Ra is China\GD\Huawei, 1; routing information of Rb is China\GD\Huawei, 2; and routing information of Rc is China\GD\Huawei, 3.

It should be understood that when the ICN network may perform routing based on a container, the method in FIG. 1 may further include: resolving, by the network controller through a container resolution system, the home container to acquire container tree set information of the requested content, where the container tree set information includes a container name of at least one container including the home container, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; determining, by the network controller according to registration information of each container in the at least one container stored or acquired by the network controller, an edge routing node of each container, where the registration information of each container is used to indicate a correspondence between a container name of each container and the edge routing node of each container; determining, by the network controller, a topological range of each container according to the edge routing node of each container and the network topology information, where the topological range is used to indicate an inclusion relationship between containers and routing nodes; and delivering, by the network controller, the container tree set information to the requesting routing node, so that the requesting routing node stores the container tree set information to the content request packet, so that the content request packet can be routed to the target routing node according to the container tree set information; and the determining, by the network controller according to the forwarding path, routing information corresponding to the requesting routing node, includes: determining, by the network controller, a first topological range corresponding to the requesting routing node, in the topological range of the at least one container included in the container tree set information, where the first topological range is a maximum topological range in a remaining topological range after a topological range including the requesting routing node is excluded from the topological range of the at least one container; and determining, by the network controller, container names of containers corresponding to the first topological range and a port that points to the next-hop routing node, on the requesting routing node, as the routing information corresponding to the requesting routing node. The registration information of the container may be stored on the network controller, or may be stored on the data storage center or other storage devices for the network controller to access the data storage center or the other storage devices to acquire the registration information.

The manner of acquiring routing information of other routing nodes except the requesting routing node on the forwarding path, except the target routing node, is similar to the manner of acquiring routing information of the requesting routing node. Specifically, the network controller determines a first topological range corresponding to each routing node except the requesting routing node and target routing node among the routing nodes that the forwarding path passes through, in the topological range of the at least one container included in the container tree set information, and determines a next-hop routing node, on the forwarding path, of each routing node, where the first topological range is a maximum topological range in a remaining topological range after a topological range including each routing node is excluded from the topological range of the at least one container; and the network controller uses container names of containers corresponding to the first topological range and a port that points to the next-hop routing node, on each routing node, as the routing information corresponding to each routing node, and uses the container name of the home container and the port of the target routing node, as the routing information corresponding to the target routing node.

Specifically, for the container tree set information, depth traversal of a tree may be used to arrange the content name of the requested content and the container tree set information of the requested content into a sequence, and any two nodes in the tree are separated by a separator, where an $n^{th}$-layer node of the tree and a node before the $n^{th}$-layer node are separated by an $(n-1)^{th}$ separator, $1<n\leq m$, and m is the depth of the tree. Specifically, depth traversal of the tree may be used to arrange the content name of the requested content and the container tree set information of the requested content into a sequence in { }, and "|" is used as a separator between nodes. The number of separators "|" between the root node and its subnodes is 1. The number of separators "|" increases level by level with the increase of the depth of the tree. For example, Name1={huawei.com/products/index.html|huawei.com/cn|huawei.com/us|cn/gd} indicates that home containers of content "huawei.com/products/index.html" are "huawei.com/cn", "huawei.com/us", and "cn/gd", where the three containers are all subnodes of the content name. For another example, Name2={fanlingyuan.com/blog/2012/June01/main.html-|hosting.com||cn/gd||cn/beijing||us/ca cloudsrv.com} indicates that home containers of content "fanlingyuan.com/blog/2012/June01/main.html" are "hosting.com" and "cloudsrv.com", where "hosting.com" has three data centers in the world, which are respectively located in containers "cn/gd", "cn/beijing", and "us/ca", that is, the three containers "cn/gd", "cn/beijing", and "us/ca" provide an access service for "hosting.com", and are subnodes of the container "hosting.com".

Optionally, when a directed acyclic graph is used to indicate the relationship between the content name of the requested content and the container tree set information of the requested content, in the content request packet, the content name represented by an entrance vertex of the directed acyclic graph and the container tree set information of the requested content represented by other vertexes in the directed acyclic graph except the entrance vertex are arranged into a sequence, where all vertexes of the directed acyclic graph are separated by separators. In addition, an access parameter is carried after all vertexes of the directed acyclic graph that are used as start points of directed edges, where the access parameter is used to indicate sequence numbers of endpoints of directed edges originated from the vertexes in the sequence.

Specifically, the content name of the requested content and the container tree set information of the requested content may be arranged into a sequence in { }, where the content name of the requested content is arranged in a first position of the sequence, and the container tree set information of the requested content is arranged after the content name. "|" is used as a separator between the content name of the requested content and the container information of each container, where the number of separators "|" is fixed to 1. In addition, a parameter pointing to other vertexes is added after the content name of the requested content and the container information of the requested content, for example, in=n1, n2, . . . , where n1 or n2 is a sequence number of a next vertex in the sequence, and the sequence number of the content name of the requested content in the sequence is 0. If an in parameter is not carried after the container tree set information, the container information is an exit vertex by default. For example, in Name1={fanlingyuan.com/blog/2012/June01/main.html; in=1, 2|hosting.com; in=3, 4|cloudsrv.com; in=4, 5 cn/gd|cn/beijing us/ca}, a parameter "in=1, 2" is carried after content "fanlingyuan.com/blog/2012/June01/main.html", where 1 and 2 are respectively sequence numbers of containers "hosting.com" and "cloudsrv.com" in the container sequence, which indicates that the two containers are home containers of the content; a parameter "in=3, 4" is carried after "hosting.com", which indicates that access containers of "hosting.com" are "cn/gd" and "cn/Beijing"; a parameter "in=4, 5" is carried after "cloudsrv.com", which indicates that access containers of "cloudsrv.com" are "cn/Beijing" and "us/ca", where "cn/Beijing" provides an access service for both "hosting.com" and "cloudsrv.com". However, the embodiment of the present invention is not limited thereto.

It should be understood that the embodiment of the present invention does not limit the specific manner of determining the topological range of each container. For example, edge routers of container A are Ra, Rb, Rc, and Rd. In this case, the 4 routing nodes may be connected to form an enclosed shape in the network topology diagram, where a range in the shape is a topological range of container A. A maximum arc-shaped range not including the 4 routing nodes may also be determined as the topological range of container A. Optionally, a geographical range may also be directly used to indicate the topological range of the container, for example, if a container is Guangdong, the topological range of the container includes the whole Guangdong area.

Figure 3:
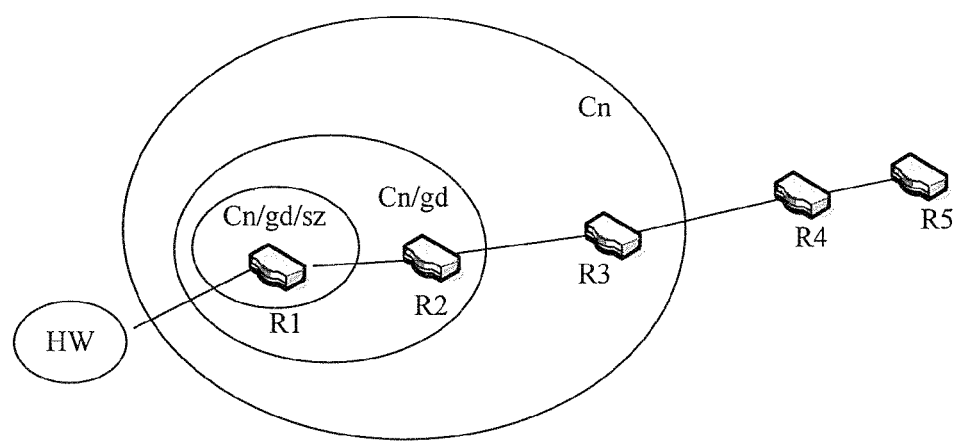
FIG. 3 is a schematic diagram of topological ranges of containers according to an embodiment of the present invention.

An example is used to describe a manner of determining the first topological range corresponding to each routing node. As shown in FIG. 3, container tree set information of requested content includes four containers: HW, Cn/gd/sz, Cn/gd, and Cn, where HW is a home container of the requested content, and among HW, Cn/gd/sz, Cn/gd, and Cn, each container is followed by an access container thereof. The range of each container is shown in an arc-shaped area in FIG. 3. Assuming that the forwarding path is R5-R4-R3-R2-R1, as can be seen from FIG. 3, none of the topological ranges of HW, Cn/gd/sz, Cn/gd, and Cn includes routing node R5. A maximum topological range (namely, the topological range of Cn) is selected from topological ranges of HW, Cn/gd/sz, Cn/gd, and Cn as the topological range of R5. Likewise, the first topological range corresponding to R4 is also the topological range of Cn, the first topological range corresponding to R3 is Cn/gd, and the topological range corresponding to R2 is Cn/gd/sz. The first topological range corresponding to R1 may be determined in the same manner. However, because R1 is an edge routing node of container HW (which is obtained according to registration information of the container), a correspondence between topological ranges of R1 and container HW may be directly established.

Next, assuming that: R5 is connected to R4 through port 5, R4 is connected to R3 through port 4, R3 is connected to R2 through port 3, R2 is connected to R1 through port 2, and the home container HW of the requested content may be routed to through port 1 of R1, routing information (a container name+a forwarding port) of R5 is Cn, 5, routing information of R4 is Cn, 4, routing information of R3 is Cn/gd, 3, routing information of R2 is Cn/gd/sz, 2, and routing information of R1 is HW, 1.

It should be understood that the container resolution system may be integrated on the network controller side, or may be a third-party system, and that the container resolution system may also be accessed by a routing node. The container resolution system stores a correspondence between a container and an access container of the container.

Optionally, the content request packet may be an interest packet.

Optionally, the routing request message is carried by an interest packet (Interest Packet).

Optionally, the sending, by the network controller, the routing information corresponding to the requesting routing node to the requesting routing node, includes: sending, by the network controller, a routing response message carried by a data packet to the requesting routing node, where the routing response message includes the routing information corresponding to the requesting routing node.

The delivering, by the network controller, the routing information corresponding to each routing node, to each routing node except the requesting routing node among the routing nodes that the forwarding path passes through, includes: sending, by the network controller, an active routing delivery message to each routing node except the requesting routing node among the routing nodes that the forwarding path passes through, where the active routing delivery message includes the routing information corresponding to each routing node except the requesting routing node, and the active routing delivery message is carried by an interest packet.

The network controller sends an active routing delivery message carried by an interest packet to a routing node except the requesting routing node among the routing nodes that the forwarding path passes through.

Optionally, the interest packet carrying the routing request message includes a first identifier for identifying that the routing request message is a control message, and a second identifier for identifying the routing request message.

Further, a content name entry (Content Name, a packet header of the interest packet) of the interest packet carrying the routing request message includes the first identifier, and a selector entry (Selector) of the interest packet includes the second identifier.

The first identifier is a CONTROL keyword, and the second identifier is an Inquiry operator.

Optionally, the data packet carrying the routing request response message includes a first identifier for identifying that the routing request response message is a control message, and a second identifier for identifying the routing request response message.

Further, a content name entry (Content Name, a packet header of the data packet) of the data packet carrying the routing request response message includes the first identifier, and a data entry (Data) of the data packet includes the second identifier.

The first identifier is a CONTROL keyword, and the second identifier is an Inquiry operator.

Optionally, the interest packet carrying the active routing delivery message includes a first identifier for identifying that the active routing delivery message is a control message, and a second identifier for identifying the active routing delivery message.

Further, a content name entry of the interest packet carrying the active routing delivery message includes the first identifier, and a selector entry of the interest packet includes the second identifier.

The first identifier is a CONTROL keyword, and the second identifier is a Force operator.

A method for routing and forwarding according to an embodiment of the present invention has been described above in detail from a perspective of a network controller with reference to FIG. 1 to FIG. 3. A method for routing and forwarding according to an embodiment of the present invention is hereinafter described in detail from a perspective of a routing node with reference to FIG. 4.

It should be understood that interaction between the routing node and the network controller, related features, functions, and so on described on the network controller side correspond to those described on the routing node side. For brevity, repeated descriptions are properly omitted.

Figure 4:
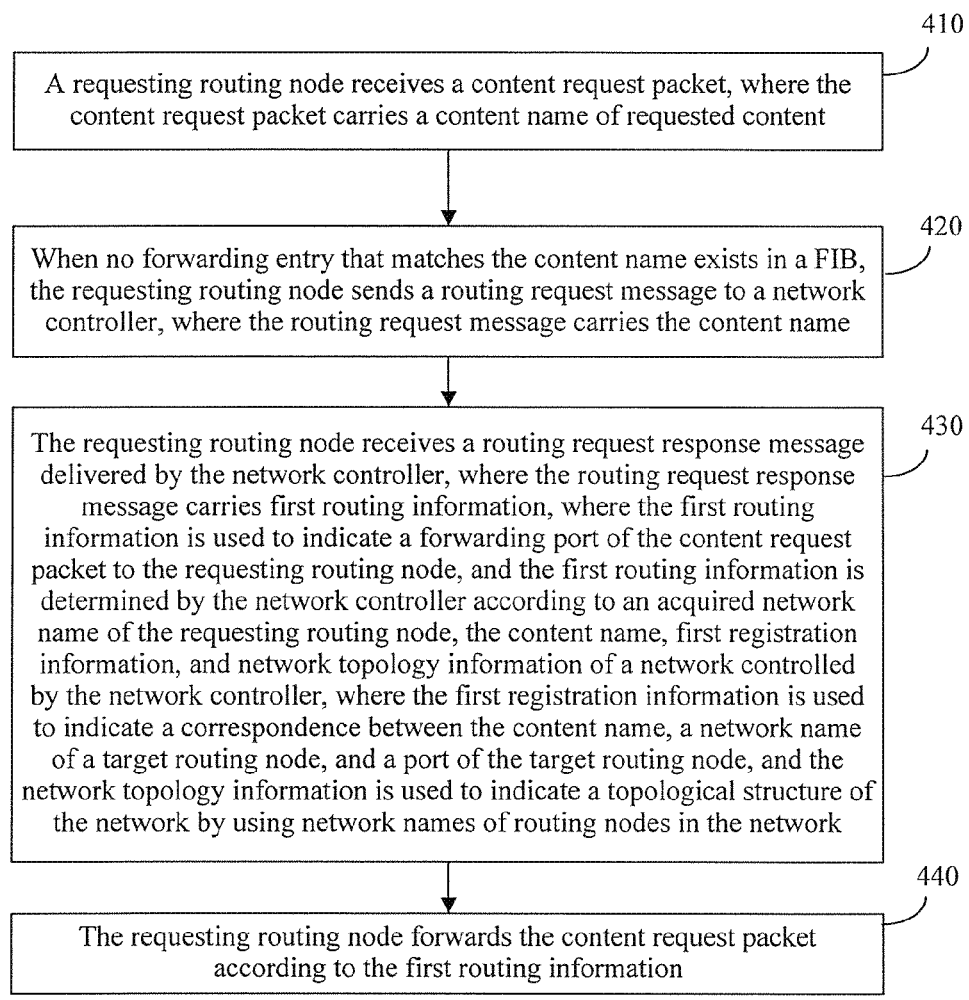
FIG. 4 is a schematic flowchart of a method for routing and forwarding according to another embodiment of the present invention.

FIG. 4 is a schematic flowchart of a method for routing and forwarding according to another embodiment of the present invention. The method in FIG. 4 is performed by a requesting routing node, where the requesting routing node may be any routing node in a network controlled by the foregoing network controller. The method in FIG. 4 includes:

410. A requesting routing node receives a content request packet, where the content request packet carries a content name of requested content.

420. When no forwarding entry that matches the content name exists in a FIB, the requesting routing node sends a routing request message to a network controller, where the routing request message carries the content name.

430. The requesting routing node receives a routing request response message delivered by the network controller, where the routing request response message carries first routing information, where the first routing information is used to indicate a forwarding port of the content request packet to the requesting routing node, and the first routing information is determined by the network controller according to an acquired network name of the requesting routing node, the content name, first registration information, and network topology information of a network controlled by the network controller, where the first registration information is used to indicate a correspondence between the content name, a network name of a target routing node, and a port of the target routing node, and the network topology information is used to indicate a topological structure of the network by using network names of routing nodes in the network.

440. The requesting routing node forwards the content request packet according to the first routing information.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

It should be noted that the routing request message in step 420 may further carry the network name of the requesting routing node.

The embodiment of the present invention does not limit the specific form of the first routing information in step 430, where the first routing information may be a content name+a forwarding port, or may be a container name+a forwarding port.

Optionally, the first registration information is registration information of the requested content, where the registration information of the requested content includes the correspondence between the content name, the network name of the target routing node, and the port of the target routing node, and the target routing node is an edge routing node of the requested content; or the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container. The first routing information includes the content name and the forwarding port of the content request packet; and the forwarding, by the requesting routing node, the content request packet according to the first routing information, may include: matching, by the requesting routing node according to the content name, the forwarding port in the first routing information, in routing information stored by the requesting routing node; and forwarding, by the requesting routing node, the content request packet through the forwarding port in the first routing information.

Optionally, the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container; and before the forwarding, by the requesting routing node, the content request packet according to the first routing information, the method in FIG. 4 may further include: receiving, by the requesting routing node, container tree set information of the requested content, which is sent by the network controller, where the container tree set information is acquired by the network controller by resolving the home container through a container resolution system, and the container tree set information includes a container name of at least one container including the home container of the requested content, and the container tree set information is used, to indicate an access relationship between the at least one container, where the home container is located at a root node of a container tree corresponding to a container tree set, and a container represented by a subnode of the container tree is an access container of a container represented by a parent node corresponding to the subnode; and adding, by the requesting routing node, the container tree set information to the content request packet.

In this case, the first routing information may include a first container name and a first port corresponding to the first container name, where the first container name is one of container names included in the container tree set information; and the forwarding, by the requesting routing node, the content request packet according to the first routing information, may include: determining, by the requesting routing node according to the first container name included in the container tree set information carried in the content request packet, the first routing information that matches the first container name, in the routing information stored by the requesting routing node; and forwarding, by the requesting routing node, the content request packet through the first port included in the first routing information.

For example, the container tree set information received by the requesting routing node is HW|Cn/gd/sz||Cn/gd|||Cn, where HW is a home container of the requested content, and among HW, Cn/gd/sz, Cn/gd, and Cn, each container is followed by an access container thereof. After receiving the container tree set information, the requesting routing node stores the container tree set information to a content request packet corresponding to the requested content. The requesting routing node further receives first routing information Cn, 3 (a forwarding port) sent by the network controller, and stores the first routing information to the FIB of the requesting routing node. Then, the requesting routing node performs matching according to the received container tree set information and an entry in the FIB and obtains the first routing information, and then forwards the content request packet through port 3.

Optionally, as an embodiment, before the sending, by the requesting routing node, a routing request message to a network controller, the method may further include: determining, by the requesting routing node, whether any content that matches the content name exists in a CS; when content that matches the content name exists in the CS, sending, by the requesting routing node, the matched content to a sender of the content request packet; when no content that matches the content name of the requested content exists in the CS, determining, by the requesting routing node, whether any PIT entry that matches the content name of the requested content exists in a PIT; when a PIT entry that matches the content name exists in the PIT, adding, by the requesting routing node, a port receiving the content request packet to the matched PIT entry; when no PIT entry that matches the content name exists in the PIT, determining, by the requesting routing node, whether any forwarding entry that matches the content name exists in the FIB; and when a forwarding entry that matches the content name exists in the FIB, sending, by the requesting routing node, the content request packet according to the matched forwarding entry.

Optionally, as another embodiment, the method in FIG. 4 may further include: receiving, by the requesting routing node, an active routing delivery message sent by the network controller, where the active routing delivery message carries another piece of routing information, where the another piece of routing information is used to indicate a forwarding port of another content request packet; receiving, by the requesting routing node, the another content request packet; and forwarding, by the requesting routing node, the another content request packet according to the another piece of routing information.

For example, it is assumed that the requesting routing node is described as routing node A, routing node B in the network requests a forwarding path of content request packet B from the network controller, and the forwarding path of content request packet B calculated by the network controller passes through routing node A. In this case, routing node A receives an active routing delivery message, where the active routing delivery message indicates a forwarding port of content request packet B. After receiving content request packet B, routing node A forwards content request packet B according to the indication of the active routing delivery message.

Figure 5:
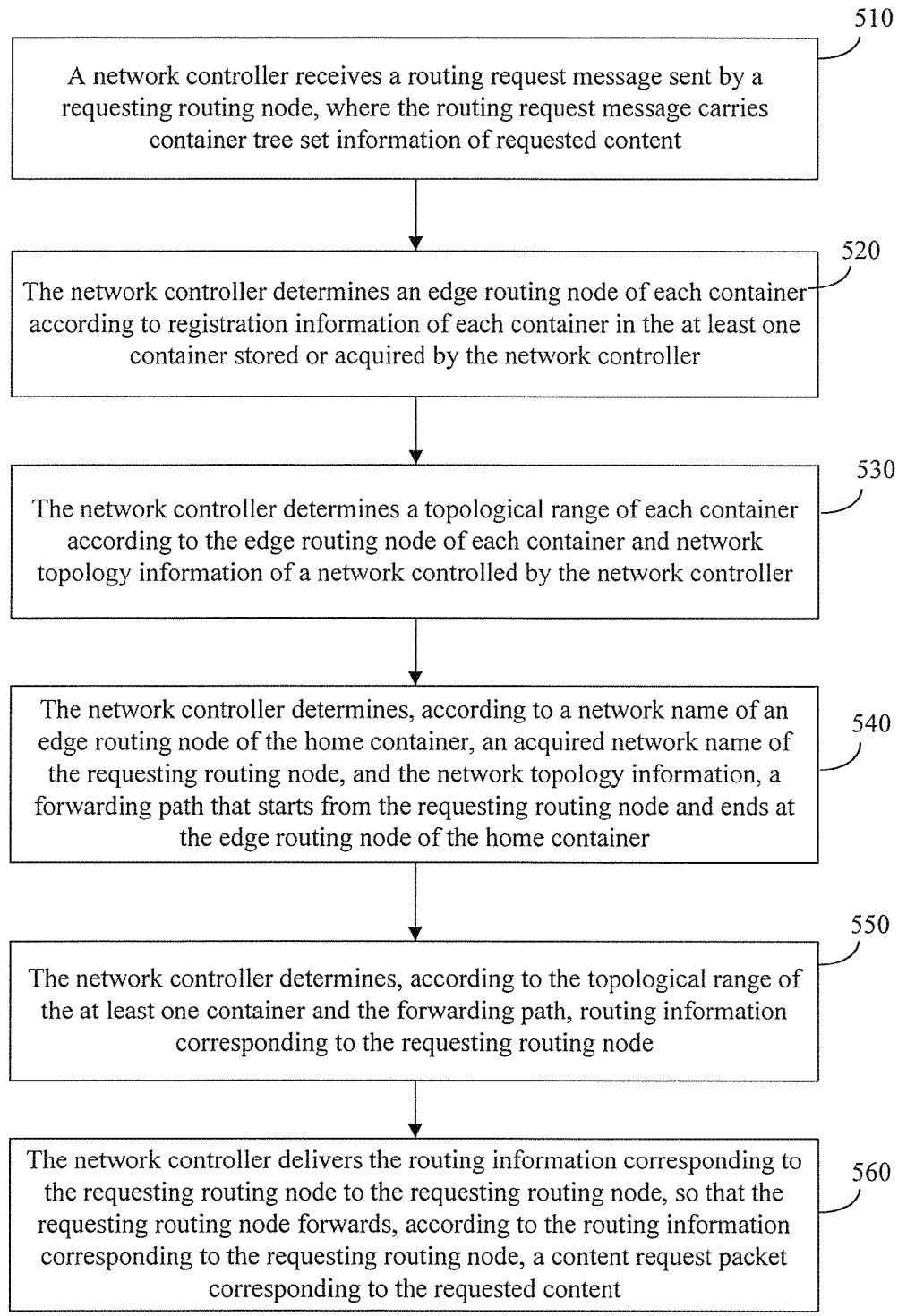
FIG. 5 is a schematic flowchart of a method for routing and forwarding according to another embodiment of the present invention.

FIG. 5 is a schematic flowchart of a method for routing and forwarding according to another embodiment of the present invention. The method in FIG. 5 is performed by a network controller.

It should be understood that a part of concepts and features related in the method in FIG. 5 are described in FIG. 1 to FIG. 4, and are not described herein for avoiding repetition. The method in FIG. 5 includes:

510. A network controller receives a routing request message sent by a requesting routing node, where the routing request message carries container tree set information of requested content, where the container tree set information includes a container name of at least one container including a home container of the requested content, and the container tree set information is used to indicate an access relationship between the at least one container.

The home container is located at a root node of a container tree corresponding to a container tree set, and a container represented by a subnode of the container tree is an access container of a container represented by a parent node corresponding to the subnode.

520. The network controller determines, according to registration information of each container in the at least one container stored or acquired by the network controller, an edge routing node of each container, where the registration information of each container is used to indicate a correspondence between a container name of each container and the edge routing node of each container.

530. The network controller determines a topological range of each container according to the edge routing node of each container and network topology information of a network controlled by the network controller, where the network topology information is used to indicate a topological structure of the network by using network names of routing nodes in the network, and the topological range is used to indicate an inclusion relationship between containers and routing nodes.

540. The network controller determines, according to a network name of an edge routing node of the home container, an acquired network name of the requesting routing node, and the network topology information, a forwarding path that starts from the requesting routing node and ends at the edge routing node of the home container.

550. The network controller determines, according to the topological range of the at least one container and the forwarding path, routing information corresponding to the requesting routing node, where the routing information includes a container name and a port corresponding to the container name, where the container name is a container name of a container in the at least one container included in the container tree set information.

560. The network controller delivers the routing information corresponding to the requesting routing node to the requesting routing node, so that the requesting routing node forwards, according to the routing information corresponding to the requesting routing node, a content request packet corresponding to the requested content.

In another embodiment, the network controller may also calculate routing information of both the requesting routing node and other routing nodes on the forwarding path, and deliver the routing information to each routing node. Specifically, the network controller determines, according to the topological range of the at least one container and the forwarding path, routing information corresponding to each routing node among the routing nodes that the forwarding path passes through, where the routing information includes a container name and a port corresponding to the container name, where the container name in the routing information corresponding to each routing node is a container name of a container in the at least one container included in the container tree set information; and the network controller delivers the routing information corresponding to each routing node to each routing node, so that each routing node forwards, according to the routing information corresponding to each routing node, the content request packet corresponding to the requested content.

The network controller may simultaneously acquire and actively deliver routing information of the other routing nodes except the requesting routing node on the forwarding path when acquiring the routing information of the requesting routing node; or may perform the acquisition and delivery when the other routing nodes except the requesting routing node sends a routing request message to the network controller. Specifically, the network controller determines, according to the topological range of the at least one container and the forwarding path, routing information corresponding to each routing node except the requesting routing node among the routing nodes that the forwarding path passes through, where the routing information includes a container name and a port corresponding to the container name, where the container name in the routing information corresponding to each routing node is a container name of a container in the at least one container included in the container tree set information; and the network controller delivers the routing information corresponding to each routing node to each routing node except the requesting routing node, so that each routing node forwards, according to the routing information corresponding to each routing node, the content request packet corresponding to the requested content.

As can be seen, in the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Further, when a requester requests different content of a same path, each routing node needs to store only one piece of routing information. Therefore, storage resources of routing nodes are saved.

Optionally, as an embodiment, the determining, by the network controller according to the topological range of the at least one container and the forwarding path, routing information corresponding to the requesting routing node, may include: determining, by the network controller, a first topological range corresponding to the requesting routing node, in the topological range of the at least one container, and determining a next-hop routing node, on the forwarding path, of the requesting routing node, where the first topological range is a maximum topological range in a remaining topological range after a topological range including each routing node is excluded from the topological range of the at least one container; and using, by the network controller, container names of containers corresponding to the first topological range and a port that points to the next-hop routing node, on the requesting routing node, as routing information corresponding to the requesting routing node.

Optionally, as another embodiment, the content request packet is an interest packet, and the routing request message is carried by an interest packet.

Optionally, the delivering, by the network controller, the routing information corresponding to the requesting routing node to the requesting routing node, includes: sending, by the network controller, a routing response message carried by a data packet to the requesting routing node.

Optionally, the delivering, by the network controller, the routing information corresponding to each routing node to each routing node except the requesting routing node, includes: sending, by the network controller, an active routing delivery message to each routing node except the requesting routing node among the routing nodes that the forwarding path passes through, where the active routing delivery message includes the routing information corresponding to each routing node, and the active routing delivery message is carried by an interest packet.

A method for routing and forwarding according to an embodiment of the present invention has been described above in detail from a perspective of a network controller with reference to FIG. 5. A method for routing and forwarding according to an embodiment of the present invention is hereinafter described in detail from a perspective of a routing node with reference to FIG. 6.

It should be understood that interaction between the routing node and the network controller, related features, functions, and so on described on the network controller side correspond to those described on the routing node side. For brevity, repeated descriptions are properly omitted.

Figure 6:
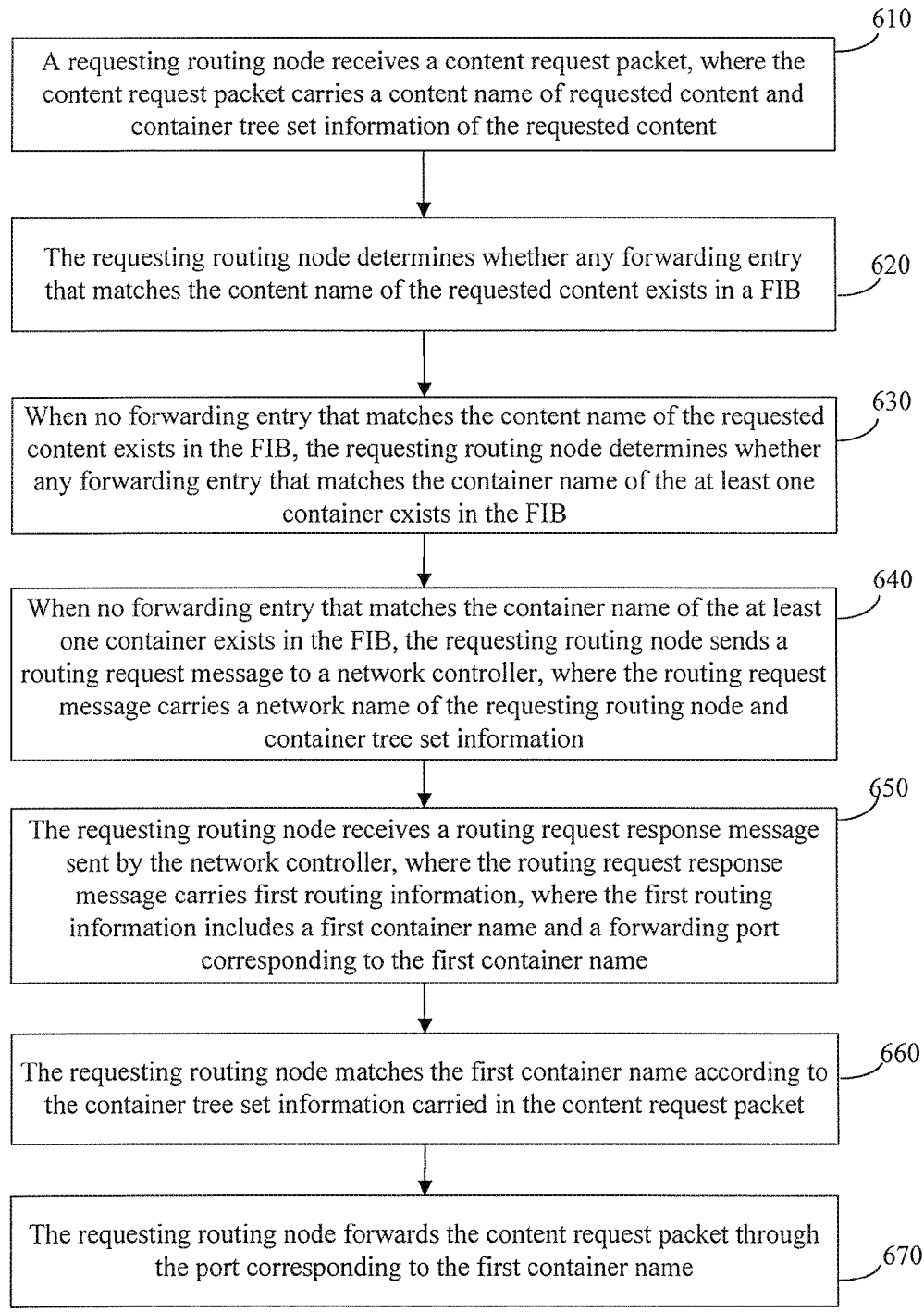
FIG. 6 is a schematic flowchart of a method for routing and forwarding according to another embodiment of the present invention.

FIG. 6 is a schematic flowchart of a method for routing and forwarding according to another embodiment of the present invention. The method in FIG. 6 is performed by a routing node, for example, a router in a network controlled by the network controller in FIG. 5.

610. A requesting routing node receives a content request packet, where the content request packet carries a content name of requested content.

Optionally, the content request packet may further carry container tree set information of the requested content. The container tree set information includes a container name of at least one container including a home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode.

620. The requesting routing node determines whether any forwarding entry that matches the content name of the requested content exists in a FIB.

630. When no forwarding entry that matches the content name of the requested content exists in the FIB, the requesting routing node determines whether any forwarding entry that matches the container name of the at least one container exists in the FIB.

640. When no forwarding entry that matches the container name of the at least one container exists in the FIB, the requesting routing node sends a routing request message to a network controller, where the routing request message carries a network name of the requesting routing node and container tree set information.

It should be noted that when the content request packet does not carry the container tree set information, step 630 may not be performed, that is, when the requesting routing node determines that no forwarding entry that matches the content name of the requested content exists in the FIB, the requesting routing node sends a routing request message to the network controller.

650. The requesting routing node receives a routing request response message sent by the network controller, where the routing request response message carries first routing information, where the first routing information includes a first container name and a forwarding port corresponding to the first container name, where the first container name is one of container names included in the container tree set information, and the first routing information is determined by the network controller according to the acquired network name of the requesting routing node, the container tree set information, registration information of each container in the at least one container included in the container tree set information, and network topology information of a network controlled by the network controller, where the registration information of each container is used to indicate a correspondence between a container name of each container and an edge routing node of each container, and the network topology information is used to indicate a topological structure of the network by using network names of routing nodes in the network.

660. The requesting routing node matches, according to the container name of the at least one container in the container tree set information, the first routing information in routing information stored by the requesting routing node.

670. The requesting routing node forwards the content request packet through the port corresponding to the first container name, in the first routing information.

In some other implementation manners, the container tree set information is stored on the requesting routing node, and the requesting routing node may perform query locally according to the content name to acquire container tree set information corresponding to the content name; or the requesting routing node may query a container resolution system to acquire container tree set information corresponding to the content name. Herein the container resolution system may be integrated on the requesting routing node or the network controller, or may be an independent third-party system, which is not limited in the embodiment of the present invention.

As can be seen, in the embodiment of the present invention, a network controller is introduced, and registration information and a network topology diagram are stored in the network controller, so that the network controller may be used to determine a forwarding path of a content request packet, which reduces blindness of routing and forwarding of the content request packet in an ICN network and improves efficiency of routing and forwarding.

Optionally, as an embodiment, the method in FIG. 6 may further include: receiving, by the requesting routing node, an active routing delivery message sent by the network controller, where the active routing delivery message carries another piece of routing information, where the another piece of routing information carries another container name and a port corresponding to the another container name; receiving, by the requesting routing node, another content request packet, where the another content request packet carries the another container name; matching, by the requesting routing node according to the another container name, the another piece of routing information in the routing information stored by the requesting routing node; and forwarding, by the requesting routing node, the another content request packet through the port corresponding to the another container name.

Optionally, as another embodiment, the active routing delivery message is carried by an interest packet.

Optionally, as another embodiment, before the sending, by the requesting routing node, a routing request message to a network controller, the method may further include: determining, by the requesting routing node, whether any content that matches the content name exists in a CS; when content that matches the content name exists in the CS, sending, by the requesting routing node, the matched content to a sender of the content request packet; when no content that matches the content name of the requested content exists in the CS, determining, by the requesting routing node, whether any PIT entry that matches the content name of the requested content exists in a PIT; when a PIT entry that matches the content name exists in the PIT, adding, by the requesting routing node, a port receiving the content request packet to the matched PIT entry; when no PIT entry that matches the content name exists in the PIT, determining, by the requesting routing node, whether any forwarding entry that matches the content name exists in the FIB; and when a forwarding entry that matches the content name exists in the FIB, sending, by the requesting routing node, the content request packet according to the matched forwarding entry.

In the prior art, a content registration process is as follows: A content provider publishes a content name of content to be registered, to an edge router of the content provider, where the edge router stores routing information of the content to be registered, where the routing information includes the content name and a port that receives the content name; next, the content provider broadcasts the routing information to neighboring routing nodes, and the routing nodes receiving the broadcast message store the routing information, and continue to broadcast the routing information to neighboring routing nodes of the routing nodes.

If content registration is performed in the foregoing manner, when an ICN network is large, it is inevitable for each routing node to store a large amount of routing information; when only a few routing nodes participate in forwarding of a content request packet when a request is routed, and routing information stored by other routing nodes and related to the requested content is redundant information. In addition, this content registration manner is inconvenient to perform uniform management of content registration information.

Optionally, as another embodiment, the content request packet is an interest packet, the routing request message is carried by an interest packet, and the routing response message is carried by a data packet.

Figure 7:
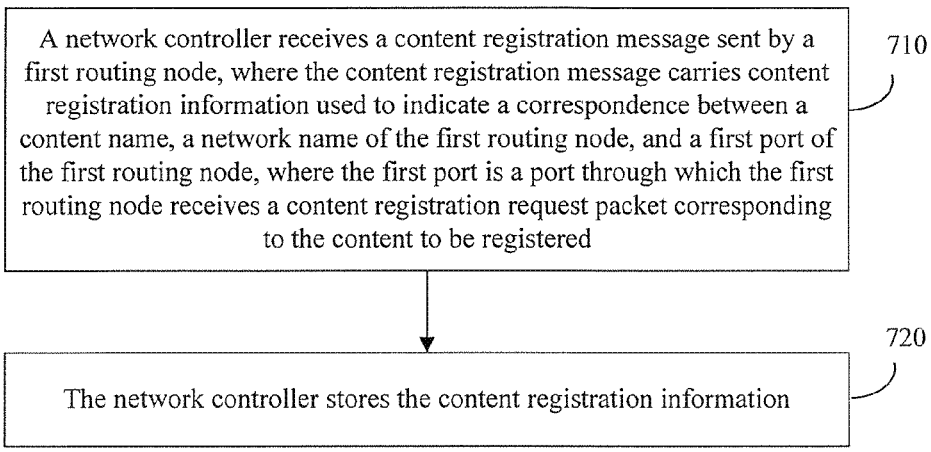
FIG. 7 is a schematic flowchart of a content registration method according to an embodiment of the present invention.

FIG. 7 is a schematic flowchart of a content registration method according to an embodiment of the present invention. The method in FIG. 7 is performed by a network controller. The method in FIG. 7 includes:

710. A network controller receives a content registration message sent by a first routing node.

The content registration message carries content registration information used to indicate a correspondence between a content name, a network name of the first routing node, and a first port of the first routing node, where the first port is a port through which the first routing node receives a content registration request packet corresponding to a content to be registered.

720. The network controller stores the content registration information.

In the embodiment of the present invention, the network controller stores the content registration information. Therefore, it is convenient to perform uniform management of registration information, and routing information that each routing node needs to store is reduced.

It should be noted that the embodiment of the present invention does not limit the specific form of the content registration information in step 710. For example, the content registration information may be a correspondence between a content name of the content to be registered, a network name of an edge router of a container to be registered, and a port that points to the content to be registered, on the edge router; or may be a correspondence between a content name of the content to be registered and a home container of the content to be registered. The content registration information may further include a correspondence between the home container of the content to be registered, a network name of an edge routing node of the home container, and a port of the edge routing node of the home container.

Specifically, the first routing node in step 710 may be an edge routing node of the content to be registered, the content registration information includes the content name of the content to be registered and the first port, and the first port is a port through which the first routing node receives the content registration request packet corresponding to the content to be registered.

The storing, by the network controller, the content registration information, may include: determining, by the network controller, whether any content that matches the content name of the content to be registered exists in registered content; when the matched content does not exist, storing, by the network controller, the content name of the content to be registered, and storing a correspondence between the content name of the content to be registered, the acquired network name of the first routing node, and the first port; and when the matched content exists, adding, by the network controller, a correspondence between the content name of the content to be registered, the network name of the first routing node, and the first port to registration information of the matched content.

Corresponding to the content registration manner, a content deregistration manner may include: receiving, by the network controller, a content deregistration message sent by a second routing node, where the content deregistration message carries a content name of content to be deregistered, a network name of the second routing node, and a second port, where the second routing node is an edge routing node of the content to be deregistered, and the second port is a port through which the second routing node receives a content deregistration request packet corresponding to the content to be deregistered; determining, by the network controller, first registered content, where the first registered content is content that is in the registered content and matches the content name of the content to be deregistered; and deleting, by the network controller, a correspondence between the content name of the content to be deregistered, the acquired network name of the second routing node, and the second port from registration information of the first registered content.

Optionally, as another embodiment, the content registration information includes the content name of the content to be registered and a container name of the home container of the content to be registered; and the storing, by the network controller, the content registration information, may include: determining, by the network controller, whether any content that matches the content name of the content to be registered exists in registered content; when the matched content exists, adding, by the network controller, a correspondence between the content name of the content to be registered and the container name of the home container of the content to be registered, to registration information of the matched content; and when the matched registered content does not exist, storing, by the network controller, the content name of the content to be registered, and storing the correspondence between the content name of the content to be registered and the container name of the home container of the content to be registered.

Corresponding to the content registration manner, a content deregistration manner may include: receiving, by the network controller, a content deregistration message sent by a third routing node, where the content deregistration message carries a content name of content to be deregistered and a container name of a home container of the content to be deregistered; determining, by the network controller, second registered content, where the second registered content is registered content that matches the content name of the content to be deregistered; and deleting, by the network controller, a correspondence between the content name of the content to be deregistered and the container name of the home container of the content to be deregistered from registration information of the second registered content.

Optionally, as an embodiment, the content deregistration message is carried by an interest packet.

When the content registration information indicates the correspondence between the content to be registered and the home container of the content to be registered, the method in FIG. 7 may further include: receiving, by the network controller, a container registration message sent by a fourth routing node, where the fourth routing node is an edge routing node of a container to be registered, and the container registration message carries a container name of the container to be registered and a fourth port, where the fourth port is a port through which the fourth routing node receives a container registration request packet corresponding to the container to be registered; determining, by the network controller, whether any container that matches the container name of the container to be registered exists in registered containers; when the matched container exists, adding, by the network controller, a correspondence between the container name of the container to be registered, a network name of the fourth routing node, and the fourth port to registration information of the matched container; and when the matched container does not exist, storing, by the network controller, the container name of the container to be registered, and storing the correspondence between the container name of the container to be registered, the network name of the fourth routing node, and the fourth port.

Corresponding to the container registration manner, the container deregistration manner may include: receiving, by the network controller, a container deregistration message sent by a fifth routing node, where the fifth routing node is an edge routing node of a container to be deregistered, and the container deregistration message carries a container name of the container to be deregistered and a sixth port, where the sixth port is a port through which a sixth routing node receives a container deregistration request packet corresponding to the container to be deregistered; determining, by the network controller, a third registered container, where a container name of the third registered container matches the container name of the container to be deregistered; and deleting, by the network controller, a correspondence between the container name of the container to be deregistered, an acquired network name of the fifth routing node, and the fifth port from registration information of the third registered container.

Optionally, as another embodiment, the content registration message is carried by an interest packet.

Optionally, the interest packet carrying the content registration message includes a first identifier for identifying that the routing request message is a control message, and a second identifier for identifying the content registration message.

Further, a content name entry of the interest packet carrying the content registration message includes the first identifier, and a selector entry of the interest packet includes the second identifier.

The first identifier is a CONTROL keyword, and the second identifier is a Register operator.

Optionally, as an embodiment, the content deregistration message is carried by an interest packet.

Optionally, the interest packet carrying the content deregistration message includes a first identifier for identifying that the content deregistration message is a control message, and a second identifier for identifying the content deregistration message.

Further, a content name entry of the interest packet carrying the content deregistration message includes the first identifier, and a selector entry of the interest packet includes the second identifier.

The first identifier is a CONTROL keyword, and the second identifier is an un-Register operator.

Optionally, as another embodiment, the container registration message is carried by an interest packet.

Optionally, the interest packet carrying the container registration message includes a first identifier for identifying that the container registration message is a control message, and a second identifier for identifying the container registration message.

Further, a content name entry of the interest packet carrying the container registration message includes the first identifier, and a selector entry of the interest packet includes the second identifier.

The first identifier is a CONTROL keyword, and the second identifier is an Enroll operator.

Optionally, as another embodiment, the container deregistration message is carried by an interest packet.

Optionally, the interest packet carrying the container deregistration message includes a first identifier for identifying that the container deregistration message is a control message, and a second identifier for identifying the container deregistration message.

Further, a content name entry of the interest packet carrying the container deregistration message includes the first identifier, and a selector entry of the interest packet includes the second identifier.

The first identifier is a CONTROL keyword, and the second identifier is an un-Enroll operator.

A content registration method according to an embodiment of the present invention has been described above in detail from a perspective of a network controller with reference to FIG. 7. A content registration method according to an embodiment of the present invention is hereinafter described from a perspective of a routing node with reference to FIG. 8.

It should be understood that interaction between the routing node and the network controller, related features, functions, and so on described on the network controller side correspond to those described on the routing node side. For brevity, repeated descriptions are properly omitted.

Figure 8:
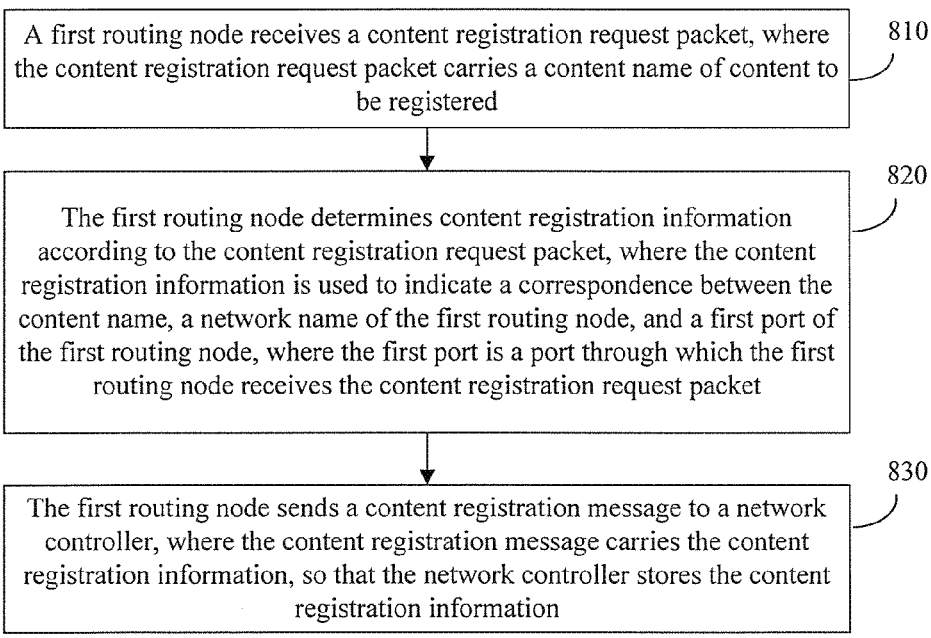
FIG. 8 is a schematic flowchart of a content registration method according to another embodiment of the present invention.

FIG. 8 is a schematic flowchart of a content registration method according to another embodiment of the present invention. The method in FIG. 8 is performed by a first routing node, where the first routing node is a routing node in a network controlled by the network controller in FIG. 7. The method in FIG. 8 includes:

810. A first routing node receives a content registration request packet. The content registration request packet carries a content name of content to be registered.

820. The first routing node determines content registration information according to the content registration request packet. The content registration information is used to indicate a correspondence between the content name, a network name of the first routing node, and a first port of the first routing node, where the first port is a port through which the first routing node receives the content registration request packet.

830. The first routing node sends a content registration message to a network controller, where the content registration message carries the content registration information, so that the network controller stores the content registration information.

In the embodiment of the present invention, the network controller stores the content registration information. Therefore, it is convenient to perform uniform management of registration information, and routing information that each routing node needs to store is reduced.

Optionally, as an embodiment, the content registration packet carries the content name of the content to be registered; and the determining, by the first routing node, content registration information according to the content registration request packet, includes: determining, by the first routing node, the content name of the content to be registered and the first port as the content registration information.

Optionally, as another embodiment, the method in FIG. 8 may further include: receiving, by the first routing node, a content deregistration request packet, where the content deregistration request packet carries a content name of content to be deregistered; determining, by the first routing node, content deregistration information, where the content deregistration information includes the content name of the content to be deregistered and a second port, where the second port is a port through which the first routing node receives the content deregistration request packet; and sending a content deregistration message to the network controller, where the content deregistration message carries the content deregistration information.

Optionally, as another embodiment, the content registration request packet further carries a container name of a home container of the content to be registered, and the content registration information includes a correspondence between the content name of the content to be registered and the container name of the home container of the content to be registered, and a correspondence between the container name of the home container of the content to be registered, the network name of the first routing node, and the first port of the first routing node, where the first routing node is an edge routing node of the home container of the content to be registered.

It should be noted that the content registration information may also be understood as two correspondences: One is the correspondence between the content name of the content to be registered and the container name of the home container of the content to be registered, and the other is the correspondence between the container name of the home container of the content to be registered, the network name of the first routing node, and the first port of the first routing node. The two correspondences may be both carried in a content registration request packet, or may be separately carried by packets of a same type or different types.

Optionally, as another embodiment, the method in FIG. 8 may further include: receiving, by the first routing node, a content deregistration request packet, where the content deregistration request packet carries a content name of content to be deregistered and a container name of a home container of the content to be deregistered; and sending a content deregistration message to the network controller, where the content deregistration message carries the content name of the content to be deregistered and the container name of the home container of the content to be deregistered.

Optionally, as another embodiment, the content deregistration request packet is an interest packet, and the content deregistration message is carried by an interest packet.

Optionally, as another embodiment, the method in FIG. 8 may further include: receiving, by the first routing node, a container registration request packet, where the container registration request packet carries a container name of a container to be registered; determining, by the first routing node, a fourth port, where the fourth port is a port through which the first routing node receives the container registration request packet; and sending, by the first routing node, a container registration message to the network controller, where the container registration message carries the container name of the container to be registered and the fourth port.

Optionally, as another embodiment, the container registration request packet is an interest packet, and the container registration message is carried by an interest packet.

Optionally, as another embodiment, the method in FIG. 8 may further include: receiving, by the first routing node, a container deregistration request packet, where the container deregistration request packet carries a container name of a container to be deregistered; determining, by the first routing node, a fifth port, where the fifth port is a port through which the first routing node receives the container deregistration request packet; and sending, by the first routing node, a container deregistration message to the network controller, where the container deregistration message carries the container name of the container to be deregistered and the fifth port.

An embodiment of the present invention further provides another content registration method. The method includes: receiving, by a network controller, a content registration message sent by a first routing node, where the content registration message carries content registration information used to indicate a storage position of content to be registered; and storing, by the network controller, the content registration information.

Specifically, the content registration information is used to indicate a correspondence between a content name, a network name of the first routing node, and a first port of the first routing node, where the first port is a port through which the first routing node receives a content registration request packet corresponding to a content to be registered.

In an implementation manner, the content registration information includes a content name of the content to be registered and the first port of the first routing node. With respect to the network name of the first routing node, the network name may be carried in the content registration message, or may be acquired by the network controller by querying according to the first port or other information.

In another implementation manner, the content registration information includes a correspondence between the content name of the content to be registered and a container name of a home container of the content to be registered, and a correspondence between the container name of the home container of the content to be registered, the network name of the first routing node, and the first port of the first routing node, where the first routing node is an edge routing node of the home container of the content to be registered.

Figure 9:
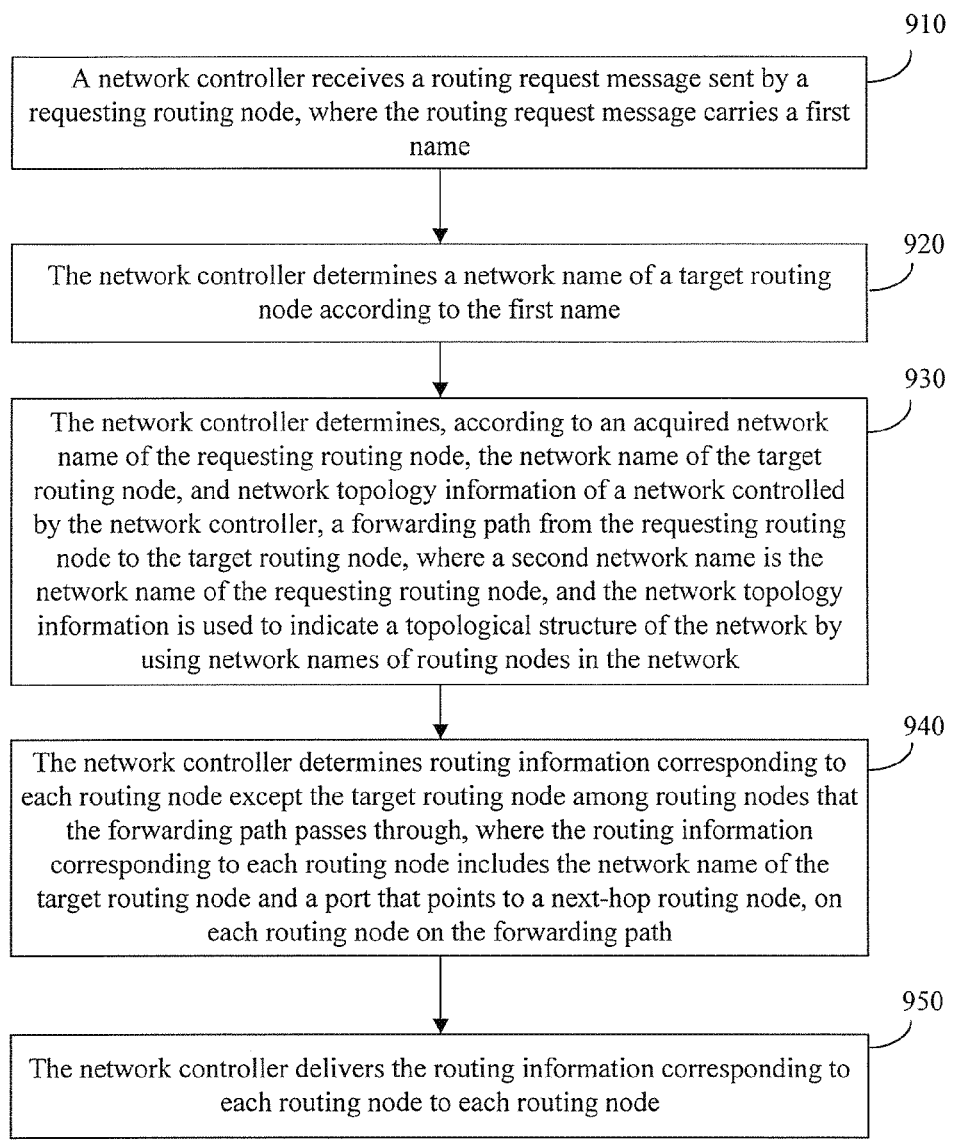
FIG. 9 is a schematic flowchart of a method for routing and forwarding according to another embodiment of the present invention.

FIG. 9 is a schematic flowchart of a method for routing and forwarding according to another embodiment of the present invention. The method in FIG. 9 may be performed by a network controller. The method in FIG. 9 includes:

910. A network controller receives a routing request message sent by a requesting routing node, where the routing request message carries a first name.

920. The network controller determines a network name of a target routing node according to the first name.

930. The network controller determines, according to an acquired network name of the requesting routing node, the network name of the target routing node, and network topology information of a network controlled by the network controller, a forwarding path from the requesting routing node to the target routing node, where a second network name is the network name of the requesting routing node, and the network topology information is used to indicate a topological structure of the network by using network names of routing nodes in the network.

940. The network controller determines routing information corresponding to each routing node except the target routing node among routing nodes that the forwarding path passes through, where the routing information corresponding to each routing node includes the network name of the target routing node and a port that points to a next-hop routing node, on each routing node on the forwarding path.

950. The network controller delivers the routing information corresponding to each routing node to each routing node.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

The embodiment of the present invention does not specifically limit the form of the first name, for example, the first name may be a network name of a routing node, or may be a content name.

Optionally, as an embodiment, for an ICN network (such as an ICN network having no PIT retrieval function) in which a content response packet also needs to be routed and forwarded by using a FIB, when the routing request message in step 910 is used to request a forwarding path of the content response packet, the first name is the network name of the target routing node, and the target routing node is a first one routing node that a content request packet corresponding to the content response packet passes through, where the content response packet is a data packet, and the content request packet is an interest packet.

For example, assuming that the forwarding path of the content request packet is R1-R2-R3, after R3 acquires requested content, R3 sends a first name to the network controller, where the first name is R1. Next, the network controller determines, according to R3, R1, and a network topology diagram, that the forwarding path of the content response packet is R3-R2-R1, where R1 is connected to R2 through port 1, and R2 is connected to R3 through port 2. In this case, the network controller delivers routing information R1, 1 to R1, and delivers routing information R1, 2 to R2. The content response packet can be routed to R3 by using the foregoing routing information, and R3 directly returns the content response packet to a requester.

Optionally, as another embodiment, the routing request message may be used to request a forwarding path of a content request packet, where the content request packet is an interest packet; the first name is a content name of requested content carried in the request packet; the network controller stores registration information of the requested content, where the registration information is used to indicate a correspondence between the content name and the network name of the target routing node; the target routing node is an edge routing node of the requested content; and the determining, by the network controller, a network name of a target routing node according to the first name, may include: acquiring, by the network controller, the network name of the target routing node from the registration information of the requested content according to the content name.

For example, if a routing request message sent by requesting routing node R1 carries content name A of requested content, the network controller knows, from registration information of the requested content, that an edge routing node of the requested content is R3 and that a port through which R3 is linked to the requested content is 3; the network controller determines, according to R1, R3, and the network topology diagram, that the forwarding path is R1-R2-R3, where R1 is connected to R2 through port 1, and that R2 is connected to R3 through port 2; and the network controller delivers routing information of R1, which is R3, 1, and routing information of R2, which is R3, 2.

Optionally, as another embodiment, the routing request message is carried by an interest packet; and the delivering, by the network controller, the routing information corresponding to each routing node to each routing node, includes: sending, by the network controller, a routing request response message carried by a data packet to the requesting routing node; and delivering an active routing message carried by an interest packet to a routing node except the requesting routing node and the target routing node among the routing nodes that the forwarding path passes through.

A method for routing and forwarding according to an embodiment of the present invention has been described above in detail from a perspective of a network controller with reference to FIG. 9. A method for routing and forwarding according to an embodiment of the present invention is hereinafter described in detail from a perspective of a routing node with reference to FIG. 10.

It should be understood that interaction between the routing node and the network controller, related features, functions, and so on described on the network controller side correspond to those described on the routing node side. For brevity, repeated descriptions are properly omitted.

Figure 10:
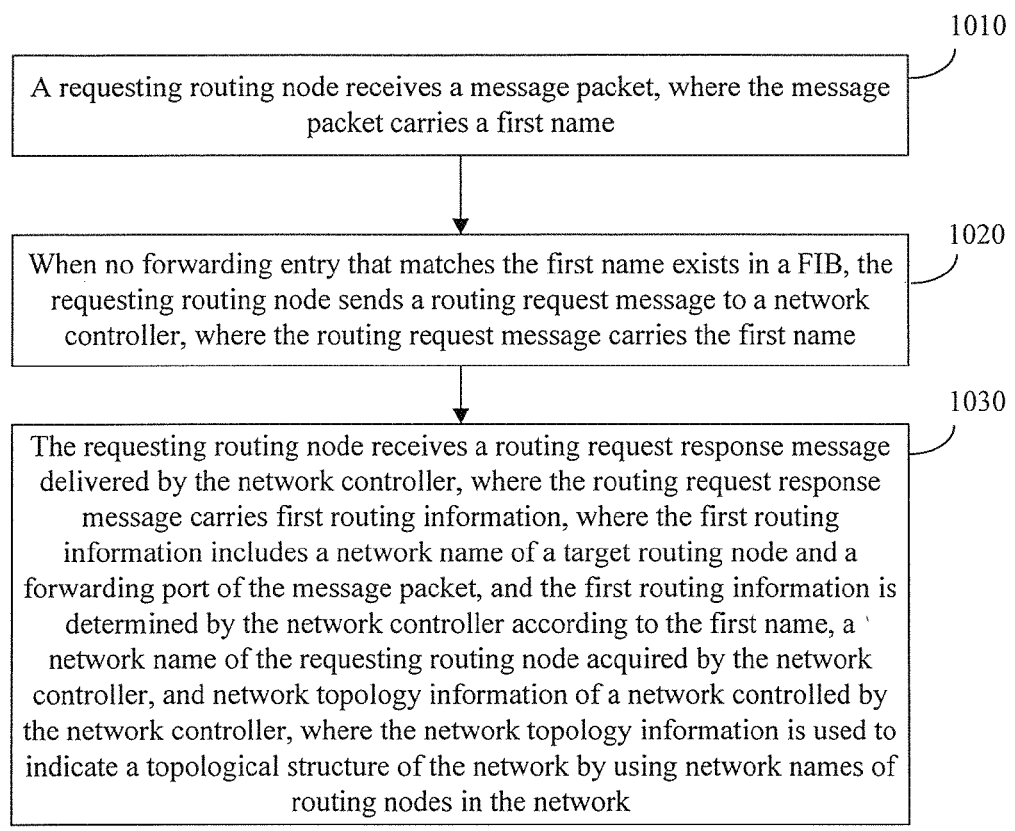
FIG. 10 is a schematic flowchart of a method for routing and forwarding according to another embodiment of the present invention.

FIG. 10 is a schematic flowchart of a method for routing and forwarding according to another embodiment of the present invention. The method in FIG. 10 may be performed by a requesting routing node, where the requesting routing node may be a router in a network controlled by the network controller in FIG. 9. The method in FIG. 10 includes:

1010. A requesting routing node receives a message packet, where the message packet carries a first name.

1020. When no forwarding entry that matches the first name exists in a FIB, the requesting routing node sends a routing request message to a network controller, where the routing request message carries the first name.

1030. The requesting routing node receives a routing request response message delivered by the network controller, where the routing request response message carries first routing information, where the first routing information includes a network name of a target routing node and a forwarding port of the message packet, and the first routing information is determined by the network controller according to the first name, an acquired network name of the requesting routing node, and network topology information of a network controlled by the network controller, where the network topology information is used to indicate a topological structure of the network by using network names of routing nodes in the network.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Optionally, as an embodiment, the message packet is a content response packet, the message packet is a data packet, the first name is the network name of the target routing node, the target routing node is a first one routing node that a content request packet corresponding to the content response packet passes through, and the content request packet is an interest packet.

Optionally, as another embodiment, before the sending, by the requesting routing node, a routing request message to a network controller when no forwarding entry that matches the first name exists in a forwarding information base FIB, the method may further include: determining, by the requesting routing node, whether any forwarding entry that matches the network name of the target routing node exists in the FIB; and when a forwarding entry that matches the network name of the target routing node exists in the FIB, sending, by the requesting routing node, the content response packet according to the matched forwarding entry.

Optionally, as another embodiment, the message packet is a content request packet, the content request packet is an interest packet, the first name is a content name of requested content carried in the content request packet, and the target routing node is an edge routing node of the requested content.

Optionally, as another embodiment, before the sending, by the requesting routing node, a routing request message to a network controller when no forwarding entry that matches the first name exists in a forwarding information base FIB, the method may further include: determining, by the requesting routing node, whether any content that matches the content name exists in a CS; when content that matches the content name exists in the CS, sending, by the requesting routing node, the matched content to a sender of the content request packet; when no content that matches the content name of the requested content exists in the CS, determining, by the requesting routing node, whether any forwarding entry that matches the content name of the requested content exists in the FIB; and when a forwarding entry that matches the content name exists in the FIB, sending, by the requesting routing node, the content request packet according to the matched forwarding entry.

Optionally, as another embodiment, the method in FIG. 10 may further include: receiving, by the requesting routing node, an active routing delivery message sent by the network controller, where the active routing delivery message carries another piece of routing information, where the another piece of routing information includes a network name of another target routing node and a forwarding port corresponding to the another target routing node; receiving, by the requesting routing node, another content request packet, where the another content request packet carries the network name of the another target routing node; and forwarding, by the requesting routing node, the another content request packet through the forwarding port in the another piece of routing information.

Optionally, as another embodiment, the active routing delivery message is carried by an interest packet.

Optionally, as another embodiment, the routing request message is carried by an interest packet, and the routing response message is carried by a data packet.

Embodiments of the present invention are hereinafter described in more detail with reference to specific examples. It should be noted that examples in FIG. 11 to FIG. 20 are only intended to help a person skilled in the art understand the embodiments of the present invention, instead of limiting the embodiments of the present invention to specific values or specific scenarios in the examples. Apparently, a person skilled in the art may make various equivalent modifications and variations to the examples in FIG. 11 to FIG. 20, and such modifications or variations also fall into the scope of the embodiments of the present invention.

Figure 11:
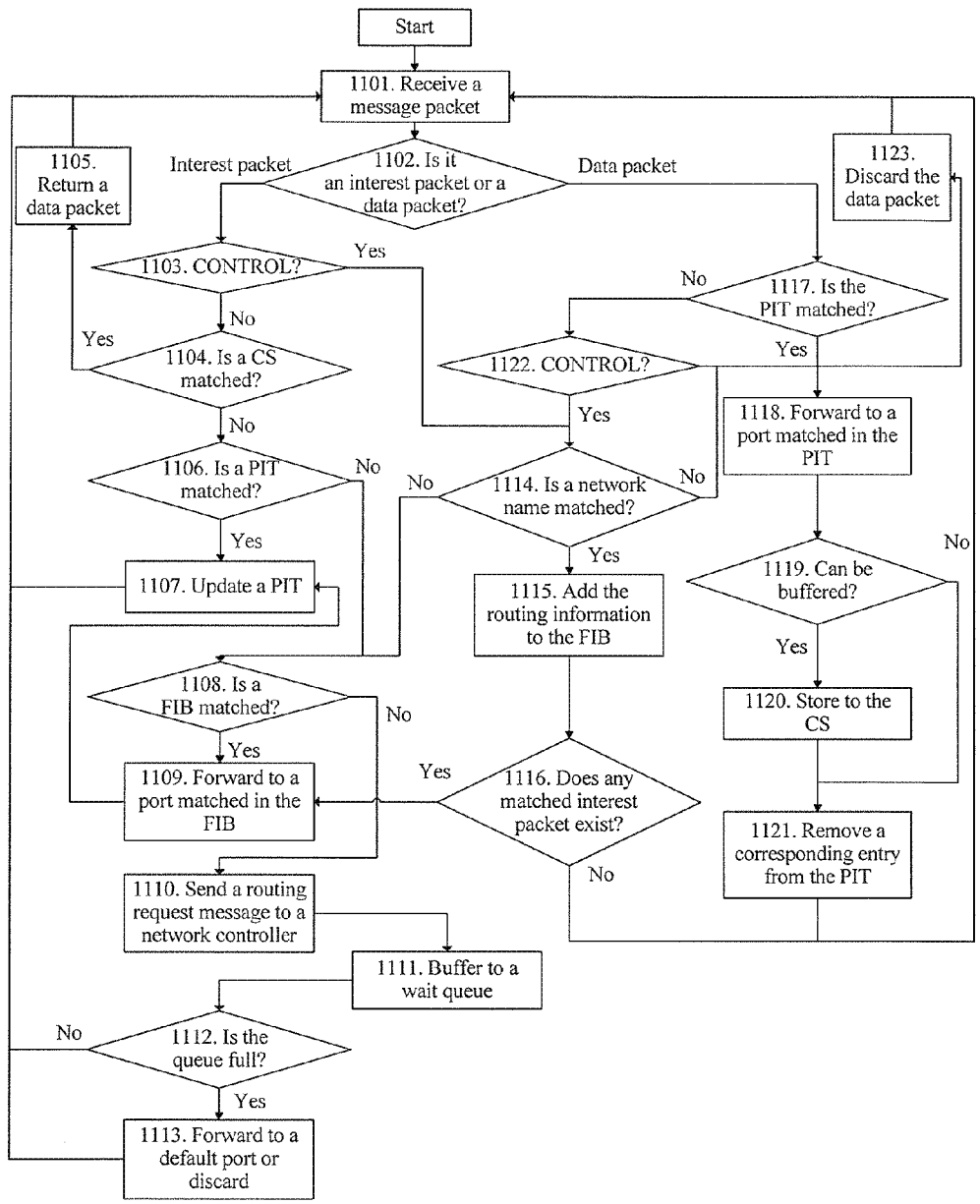
FIG. 11 is a schematic flowchart of a method for routing and forwarding according to an embodiment of the present invention.

FIG. 11 is a schematic flowchart of a method for routing and forwarding according to an embodiment of the present invention. The method in FIG. 11 is performed by a CCN node, for example, a routing node in a CCN network. In the method in FIG. 11, a message exchanged between the CCN node and a network controller is identified by a CONTROL keyword, which indicates that the message is a control-plane message. A message having no CONTROL keyword is a data-plane message. In addition, a routing request message is carried in an interest packet, a routing request response message is carried in a data packet, and an active routing delivery message is also carried in an interest packet. A content name entry (Content Name) of the routing request message is CONTROL/content name, but content name entries of the routing request response message and active routing delivery message are both CONTROL/network name of a routing node, where a network name of a router is used to indicate a routing node corresponding to routing information carried in the active routing delivery message. It should be noted that herein the form of the keyword and the format of the message are only examples but not intended to limit the embodiment of the present invention.

1101. Receive a message packet.

1102. Determine whether the message packet is an interest packet or a data packet: when the message packet is an interest packet (Interest Packet), perform step 1103 (where for distinguishing, the message packet is described as an interest packet 1); when the message packet is a data packet (Data Packet), perform step 1117.

1103. Determine whether the interest packet 1 includes any CONTROL keyword; and when the interest packet 1 includes no CONTROL keyword, perform step 1104; when the interest packet includes a CONTROL keyword, perform step 1114.

It should be understood that the CONTROL keyword distinguishes whether the message corresponding to the interest packet is a control-plane message or a data-plane message.

1104. Match a CS: when the CS is matched successfully, perform step 1105; when the CS is matched unsuccessfully, perform step 1106.

The CS matches a content name of the interest packet 1.

1105. Return a data packet corresponding to the interest packet 1, where the data packet includes successfully matched content.

1104. Match a PIT: when the PIT is matched successfully, perform step 1107; when the PIT is matched unsuccessfully, perform step 1108.

The PIT matches the content name of the interest packet 1.

1107. Update a PIT entry.

1108. Match a FIB: when the FIB is matched successfully, perform step 1109; when the FIB is matched unsuccessfully, perform step 1110.

The FIB matches the content name of the interest packet 1.

1109. Forward to a port matched in the FIB, and perform step 1107.

1110. Generate a routing request message, and send the routing request message to a network controller.

The routing request message is carried in an interest packet 2, where the interest packet 2 includes a CONTROL keyword.

1111. Buffer the interest packet 1 to a wait (Wait) queue, and record buffer time.

1112. Determine whether the wait queue is full: when the wait queue is full, perform step 1113.

1113. Forward an interest packet whose buffer time is longest to a default port or discard the interest packet.

1114. Determine whether a network name is matched: when the network name is matched, perform step 1115; when the network name is not matched, if it is an interest packet, perform step 1108, or if it is a data packet, perform step 1123.

It should be noted that after the ICN node receives the interest packet 1 including the CONTROL character, the ICN node may determine that the interest packet carries an active routing delivery message. If the network name is matched, it indicates that the active routing delivery message carries routing information of the CCN node; if the network name is not matched, it indicates that the active routing delivery message does not carry routing information of the CCN node.

1115. Add the routing information in the active routing delivery message to the FIB.

1116. Determine whether any matched interest packet exists in the wait queue: when a matched interest packet exists, perform step 1109.

1117. Match the PIT: when the PIT is matched successfully, perform step 1118; when the PIT is matched unsuccessfully, perform step 1122.

1118. Forward to a port matched in the PIT.

1119. Determine whether the data packet can be buffered: when the data packet can be buffered, perform step 1120; when the data packet cannot be buffered, perform step 1121.

Whether the data packet can be buffered may be indicated by aging time in the data packet. When the aging time is larger than 0, it indicates that the data packet can be buffered; when the aging time is 0, it indicates that the data packet cannot be buffered.

1120. Store the data packet to the CS.

1121. Remove a corresponding entry from the PIT.

1122. Determine whether the data packet includes any CONTROL keyword: when the data packet includes a CONTROL keyword, perform step 1114; when the data packet includes no CONTROL keyword, perform step 1123.

1123. Discard the data packet.

In the embodiment of the present invention, a network controller is introduced, and registration information and a network topology diagram are stored in the network controller, so that the network controller may be used to determine a forwarding path of a content request packet, which reduces blindness of routing and forwarding of the content request packet in an ICN network and improves efficiency of routing and forwarding.

Figure 12:
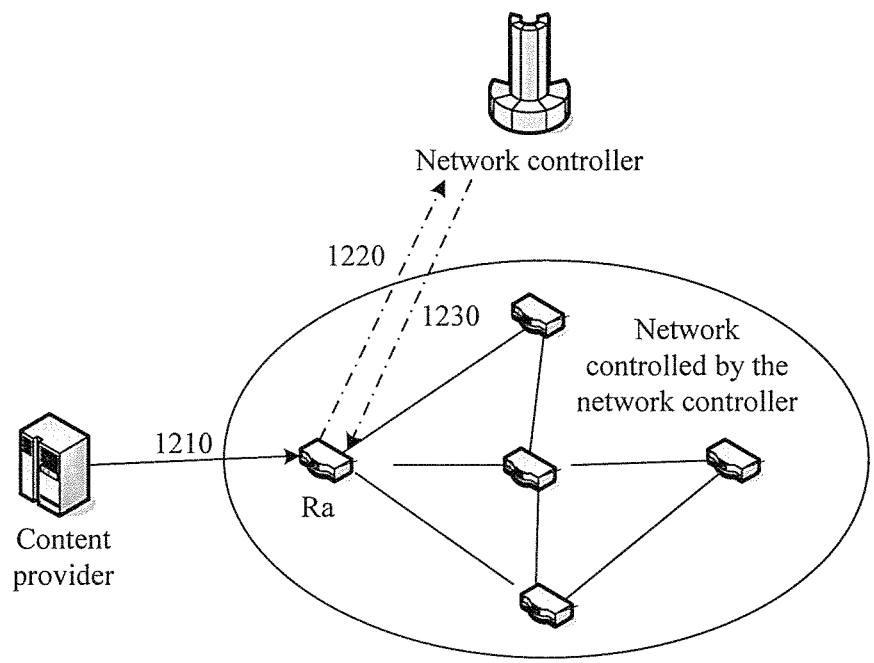
FIG. 12 is a flowchart of a content registration method according to an embodiment of the present invention.

FIG. 12 is a flowchart of a content registration method according to an embodiment of the present invention.

1210. Ra receives content to be registered: huawei/cona.jpg sent by a content provider.

Ra is an edge routing node of the content to be registered.

1220. The edge router sends a content registration message to a network controller.

The content registration message is sent by using an interest packet. A content name entry (Content Name) of the interest packet may be: CONTROL/huawei/cona.jpg, where the CONTROL keyword is used to identify that the content registration message is a control message. A selector entry (Selector) of the interest packet may include: Information={Register; huawei/cona.jpg; Ra-port 0}, where the Register operator indicates that the message is a content registration message, and port 0 indicates a port through which routing node Ra receives the content to be registered which is provided by the content provider.

The network controller stores the registered content to a content database. If the content database already stores a correspondence between huawei/cona.jpg and other routing nodes and port, a correspondence between huawei/cona.jpg, Ra, and port 0 is added; if huawei/cona.jpg does not exist in the content database, an entry is established to store the correspondence between huawei/cona.jpg, Ra, and port 0.

1230. Ra receives a content registration response message sent by the network controller.

The content registration response message is sent by using a data packet, where the data packet may include information identifying a registration success or a registration failure, and may further include a cause of the registration failure, for example, a cause that the registered content already exists.

When registration is successful, optionally, Ra records, in the FIB, routing information: huawei/cona.jpg, Ra, port 0 of the content to be registered.

In the embodiment of the present invention, the content database of the network controller uniformly stores and manages registered content, thereby reducing a storage amount of each routing node.

Figure 13:
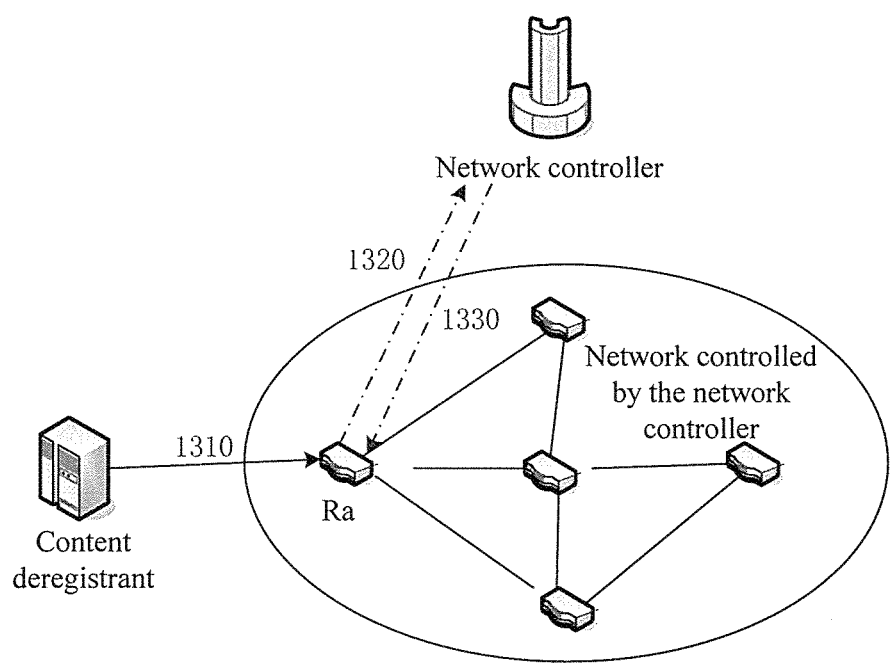
FIG. 13 is a flowchart of a content deregistration method according to an embodiment of the present invention.

FIG. 13 is a flowchart of a content deregistration method according to an embodiment of the present invention.

1310. Ra receives content to be deregistered: huawei/cona.jpg sent by a content deregistrant.

Ra is an edge routing node of the content to be deregistered.

1320. An edge router sends a content deregistration message to a network controller.

The content deregistration message is sent by using an interest packet. A content name entry (Content Name) of the interest packet may be: CONTROL/huawei/cona.jpg, where the CONTROL keyword is used to identify that the content deregistration message is a control message. A selector entry (Selector) of the interest packet may include: Information={un-Register; huawei/cona.jpg; Ra-port 0}, where the un-Register operator indicates that the message is a content deregistration message, and port 0 indicates a port through which routing node Ra receives the content to be deregistered which is provided by the content deregistrant.

The network controller deletes a correspondence between huawei/cona.jpg, Ra, and port 0. If no correspondence exists between huawei/cona.jpg and other routing nodes and ports after the correspondence is deleted, huawei/cona.jpg may be deleted completely.

1330. Ra receives a content deregistration response message sent by the network controller.

The content deregistration response message is sent by using a data packet, where the data packet may include information identifying a deregistration success or a deregistration failure, and may further include a cause of the deregistration failure, for example, a cause that the huawei/cona.jpg does not exist.

When deregistration is successful, optionally, Ra deletes, from the FIB, routing information: huawei/cona.jpg, Ra, port 0 of the content to be registered.

Figure 14:
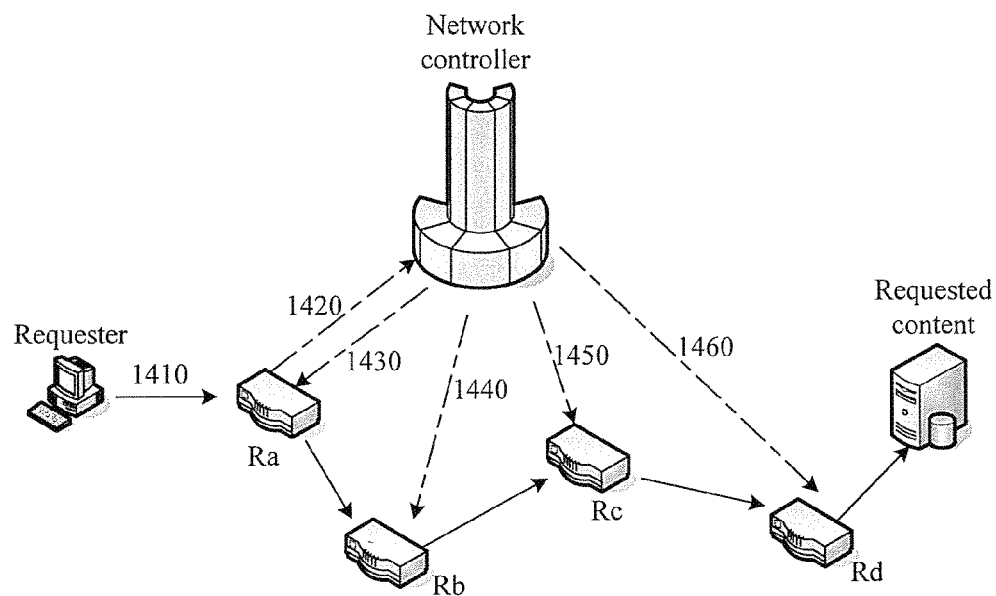
FIG. 14 is a flowchart of a method for routing and forwarding according to an embodiment of the present invention.

FIG. 14 is a flowchart of a method for routing and forwarding according to an embodiment of the present invention. FIG. 14 is a method for routing and routing based on a content name.

1410. A requester sends a content request packet to edge routing node Ra of the requester.

The content request packet carries a content name huawei/cona.jpg of requested content.

1420. Ra sends a routing request message to a network controller.

The routing request message is sent by using an interest packet, where a content name entry of the interest packet is CONTROL/huawei/cona.jpg. A selector entry includes Information={Inquiry; huawei/cona.jpg; Ra-port 0}, where the Inquiry operator indicates that the message is a routing request message, and port 0 indicates a port through which routing node Ra receives huawei/cona.jpg sent by the requester.

1430. The network controller sends a routing request response message to Ra.

The network controller determines, by using the method in FIG. 1, that a target routing node is Rd, where Rd is connected to the requested content through port 4. The network controller calculates a shortest path from Ra to Rd: Ra-Rb-Rc-Rd, where Ra is connected to Rb through port 1, Rb is connected to Rc through port 2, and Rc is connected to Rd through port 3. The routing request response message in step 1430 is delivered by using a data packet, where a content name entry of the data packet is CONTROL/huawei/cona.jpg, and a data entry (Data) is Inquiry; huawei/cona.jpg; Face 1, where Face 1 is a forwarding port corresponding to the content request packet.

1440-1460. The network controller sends active routing delivery messages to Rb, Rc, and Rd.

The active routing delivery messages may be sent by using interest packets. Content name entries of three interest packets are CONTROL/Rb, CONTROL/Rc, and CONTROL/Rd respectively. Selector entries of the three interest packets are: Information={Force; huawei/cona.jpg-Face 2}, Information={Force; huawei/cona.jpg-Face 3}, and Information={Force; huawei/cona.jpg-Face 4} in sequence, where Force is an operator corresponding to an active routing delivery message. Optionally, Rb, Rc, and Rd may send an active routing delivery response message to the network controller by using a data packet, where the data packet is used to indicate whether the active routing delivery message is received successfully or unsuccessfully, and a cause of a failure.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Figure 15:
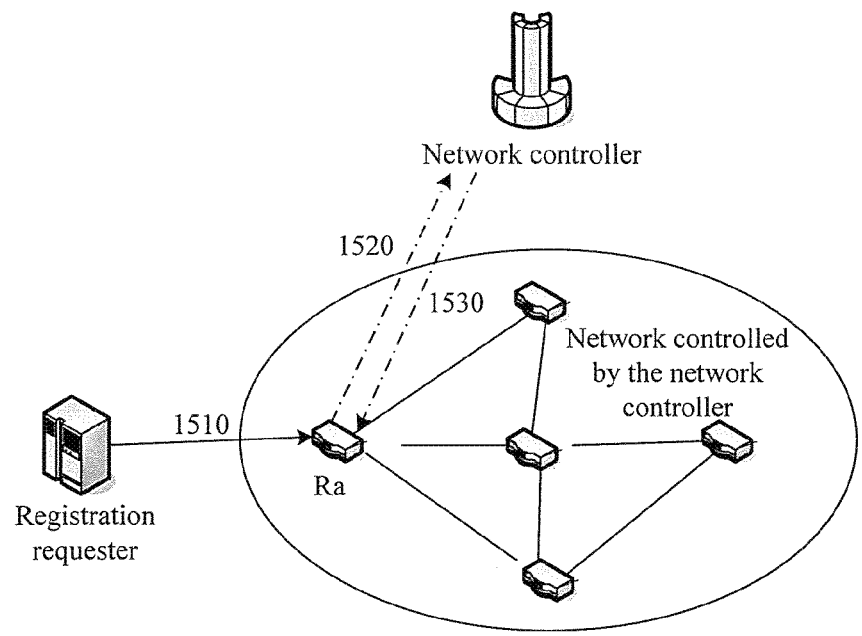
FIG. 15 is a flowchart of a content registration method according to another embodiment of the present invention.

FIG. 15 is a flowchart of a content registration method according to another embodiment of the present invention.

1510. Ra receives information to be registered: huawei/cona.jpg|huawei sent by a registration requester.

huawei/cona.jpg is content to be registered, and huawei is a home container of huawei/cona.jpg. Ra is an edge routing node of the content to be registered.

1520. An edge router sends a content registration message to a network controller.

The content registration message is sent by using an interest packet. A content name entry (Content Name) of the interest packet may be: CONTROL/huawei/cona.jpg, where the CONTROL keyword is used to identify that the content registration message is a control message. A selector entry (Selector) of the interest packet may carry: Information={Register; huawei/cona.jpg|huawei}, where the Register operator indicates that the message is a content registration message.

The network controller stores the registered content to a content database. If the content database already stores a correspondence between huawei/cona.jpg and another home container, a correspondence between huawei/cona.jpg and huawei is added; if huawei/cona.jpg does not exist in the content database, an entry is established to store the correspondence between huawei/cona.jpg and huawei.

1530. Ra receives a content registration response message sent by the network controller.

The content registration response message is sent by using a data packet, where the data packet may include information identifying a registration success or a registration failure, and may further include a cause of the registration failure, for example, a cause that the registered content already exists.

In the embodiment of the present invention, the content database of the network controller uniformly stores and manages registered content, thereby reducing a storage amount of each routing node.

It should be understood that a content deregistration method corresponding to the content registration method in FIG. 15 is similar to that described in FIG. 15, and a main difference lies in that the Register operator is changed to un-Register. The method is not described herein for avoiding repetition.

Figure 16:
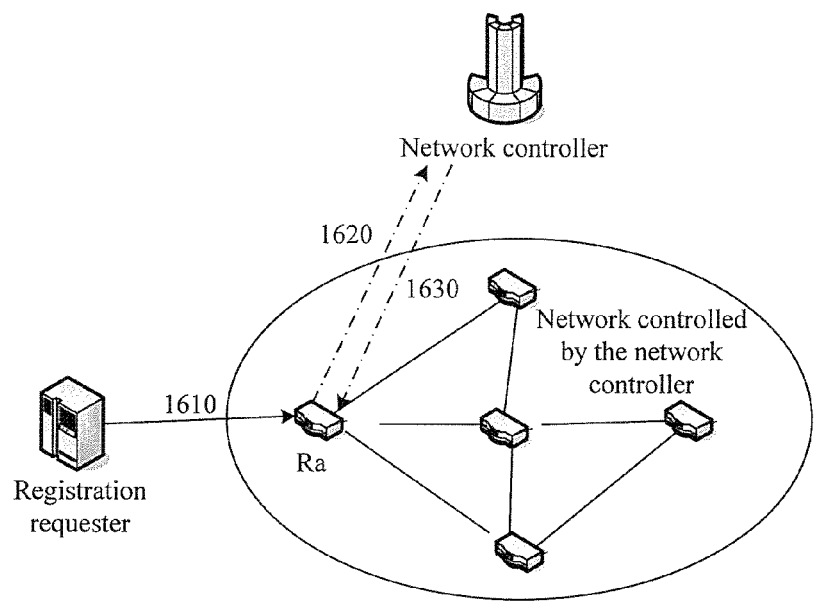
FIG. 16 is a flowchart of a container registration method according to another embodiment of the present invention.

FIG. 16 is a flowchart of a container registration method according to another embodiment of the present invention.

1610. Ra receives information of a container to be registered: huawei sent by a registration requester.

Ra is an edge routing node of the container to be registered.

1620. An edge router sends a container registration message to a network controller.

The container registration message is sent by using an interest packet. A content name entry (Content Name) of the interest packet may be: CONTROL/huawei, where the CONTROL keyword is used to identify that the container registration message is a control message. A selector entry (Selector) of the interest packet may carry: Information={Enroll; Ra-port 0}, where the Enroll operator indicates that the message is a container registration message, Ra indicates an edge routing node of huawei, port 0 is a port corresponding to Ra, and the container registration message can be routed to the interior of huawei through port 0 of Ra.

The network controller stores the registered container to a container database. If the container database already stores a correspondence between huawei and other edge routing nodes and ports, a correspondence between huawei and Ra-port 0 is added; if registration information of huawei does not exist in the container database, an entry is established to store the correspondence between huawei and Ra-port 0.

1630. Ra receives a container registration response message sent by the network controller.

The container registration response message is sent by using a data packet, where the data packet may include information identifying a registration success or a registration failure, and may further include a cause of the registration failure, for example, a cause that the container already exists.

It should be understood that a container deregistration method corresponding to the container registration method in FIG. 16 is similar to that described in FIG. 16, and a main difference lies in that the Enroll operator is changed to un-Enroll. The method is not described herein for avoiding repetition.

Figure 17:
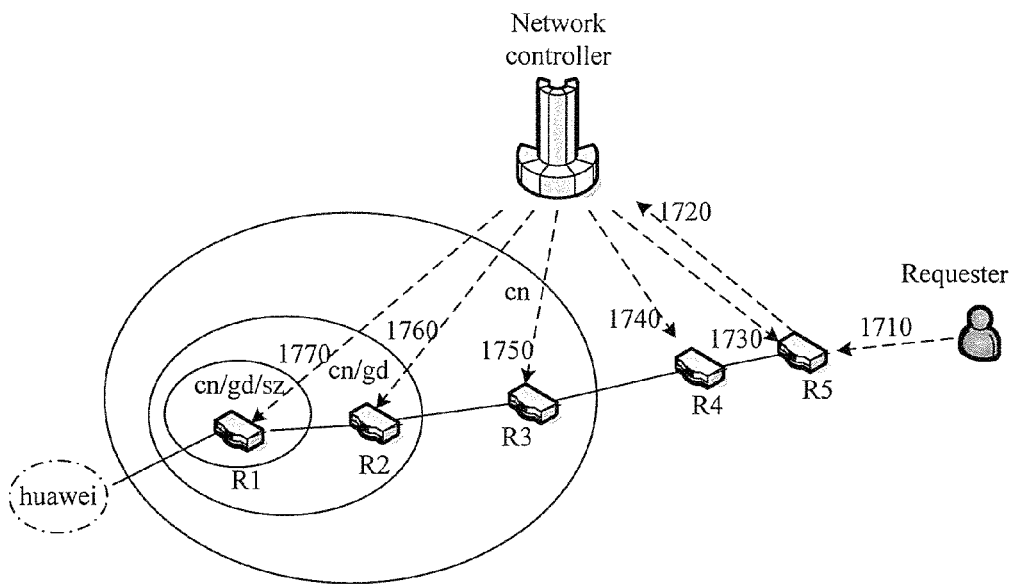
FIG. 17 is a flowchart of a method for routing and forwarding according to another embodiment of the present invention.

FIG. 17 is a flowchart of a method for routing and forwarding according to another embodiment of the present invention. FIG. 17 is a method for routing based on a container name.

1710. Routing node R5 receives a content request packet sent by a requester, where the content request packet includes the following information: huawei/cona.jpg huawei 1∥ cn/gd/sz∥∥cn/gd∥∥∥cn.

huawei/cona.jpg is a content name of requested content, and the content name is followed by container tree set information of the requested content. Specifically, huawei is a home container of huawei/cona.jpg, cn/gd/sz is an access container of huawei, cn/gd is an access container of cn/gd/sz, and cn is an access container of cn/gd. R5 is an edge routing node of the requester.

1720. R5 performs CS matching, PIT matching, and FIB matching, but no matching is successful, and therefore R5 sends a routing request message to a network controller, where the routing request message carries container tree set information huawei∥cn/gd/sz∥∥cn/gd∥∥∥cn of huawei/cona.jpg.

1730. The network controller acquires, according to registration information of container huawei, edge routing node R1 of huawei and port 1 connected to huawei; and then calculates a shortest path from R5 to R1, which is R5-R4-R3-R2-R1 shown in FIG. 17, and a port connected to each routing node, where R5 is connected to R4 through port 5, R4 is connected to R3 through port 4, R3 is connected to R2 through port 3, and R2 is connected to R1 through port 2. Concurrently, the network controller further determines an edge routing node of each container according to registration information of huawei, cn/gd/sz, cn/gd, and cn, and further determines a topological range of each container according to a network topology diagram stored by the network controller, as shown by a circle area in FIG. 17. Finally, the network controller determines routing information of each routing node on a forwarding path. Because R5 and R4 are both located outside cn, routing information of R5 is cn, 5, and routing information of R4 is cn, 4. Likewise, routing information of R3 is cn/gd, 3; routing information of R2 is cn/gd/sz, 2; and routing information of R1 is huawei, 1. The network controller delivers a routing request response message to R5, where the routing request response message carries routing information corresponding to R5.

1740-1770. The network controller sends active routing delivery messages to R4, R3, R2, and R1, where the active routing delivery messages respectively carry routing information corresponding to the routing nodes.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Further, when a requester requests different content of a same path, each routing node needs to store only one piece of routing information. Therefore, storage resources of routing nodes are saved.

Figure 18:
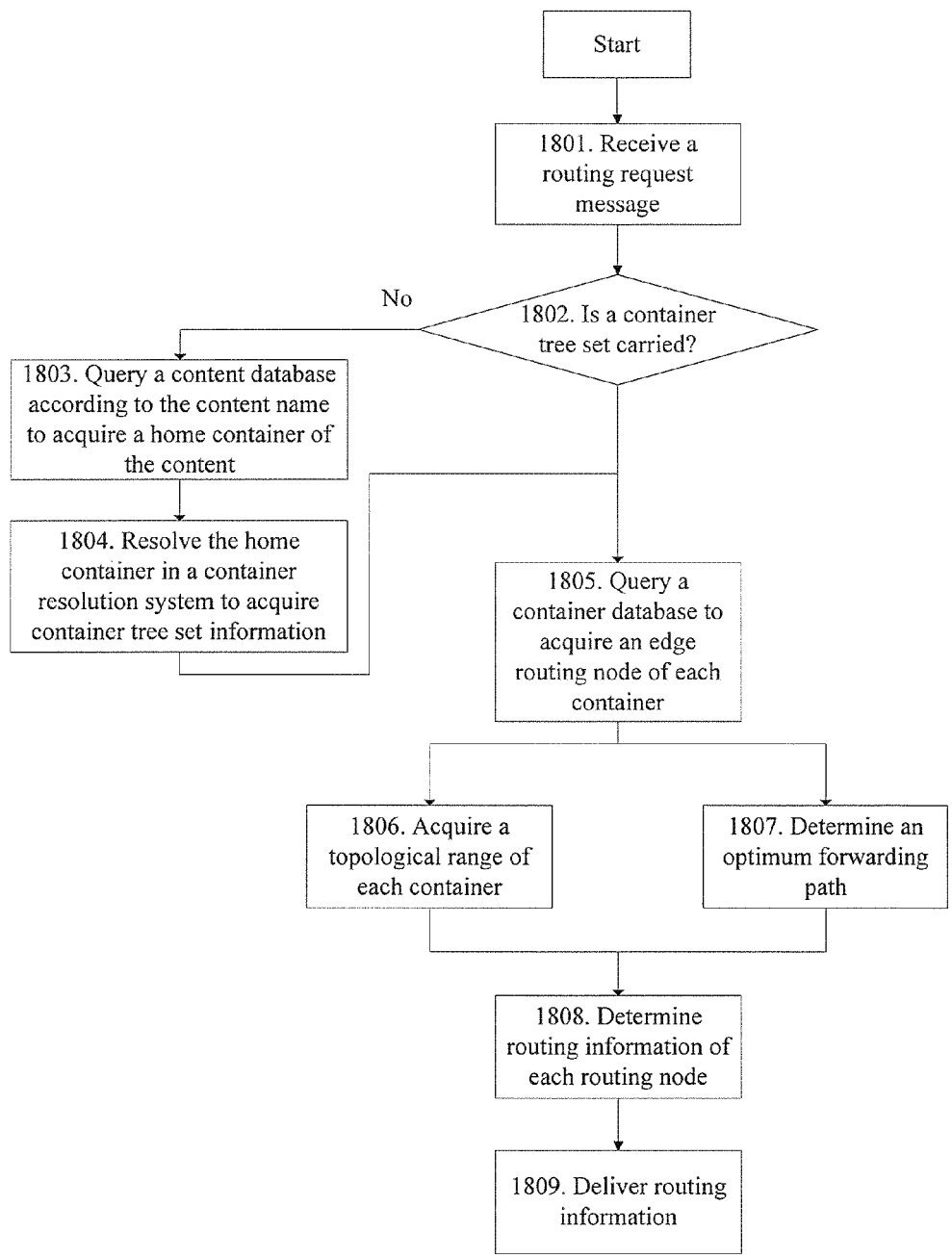
FIG. 18 is a schematic flowchart of a method for routing and forwarding according to another embodiment of the present invention.

FIG. 18 is a schematic flowchart of a method for routing and forwarding according to another embodiment of the present invention. FIG. 18 is a method for routing and forwarding based on a container. When requested content includes container tree set information, a network controller directly uses the container tree set information to determine routing information of each routing node. When requested content does not include container tree set information, the network controller determines a home container of the requested content according to a content name of the requested content, and then resolves the home container through a container resolution system to acquire container tree set information of the requested content. Then, the network controller uses the acquired container tree set information to determine routing information of each routing node.

1801. A network controller receives a routing request message.

1802. The network controller determines whether the content request packet carries container tree set information of requested content: when the content request packet does not include the container tree set information, performs step 1803; when the content request packet includes the container tree set information, performs step 1805.

1803. The network controller queries a content database to acquire a home container of the requested content.

The content database stores a correspondence between registered content in a network and a home container of the registered content.

1804. The network controller queries a container resolution system according to a container name of the home container, and acquires the container tree set information of the requested content by resolution from the container resolution system.

1805. The network controller queries a container database to acquire a edge routing node of each container included in the container tree set information.

1806. The network controller acquires a network topological range of each container according to the border routing node of each container and a network topology diagram of a network controlled by the network controller.

For example, the edge routing node of each container may be connected to form an enclosed topological range.

1807. The network controller determines, according to the edge routing node of the home container, a requesting routing node, and the network topology diagram, an optimum forwarding path from the requesting routing node to the edge routing node of the home container.

It should be noted that when there are a plurality of edge routing nodes of the home container, an optimum path may be selected after separate determining and comprehensive considerations. The optimum forwarding path may be a shortest path or may be a securest path, and so on. It should further be understood that step 1806 and step 1807 may be performed in sequence or concurrently, which is not specifically limited in the embodiment of the present invention.

1808. The network controller determines, according to the forwarding path and the network topological range of each container, routing information of each routing node that the forwarding path passes through.

For example, the manner of determining routing information in the method in FIG. 5 is used.

1809. Deliver the routing information to each routing node that the forwarding path passes through.

For the requesting routing node, routing information may be delivered by using a routing request response message; for other routing nodes except the requesting routing node on the forwarding path, routing information may be delivered by using an active routing delivery message.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Further, when a requester requests different content of a same path, each routing node needs to store only one piece of routing information. Therefore, storage resources of routing nodes are saved.

Figure 19:
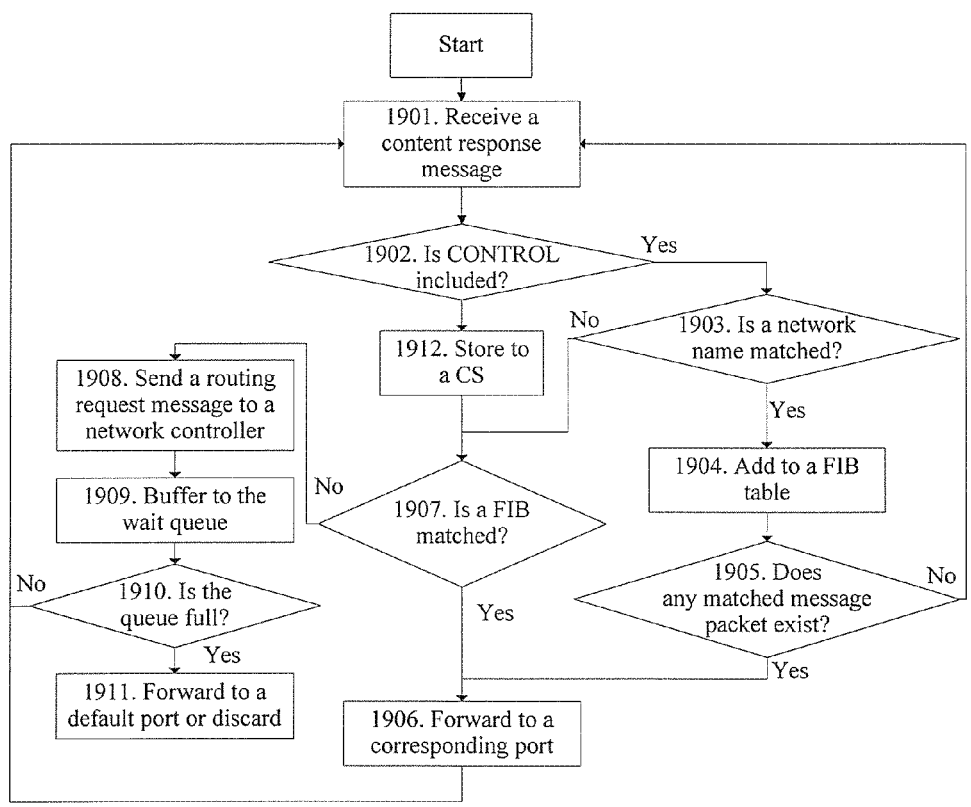
FIG. 19 is a schematic flowchart of a method for routing and forwarding according to another embodiment of the present invention.

FIG. 19 is a schematic flowchart of a method for routing and forwarding according to another embodiment of the present invention. FIG. 19 describes a method for routing and forwarding a routing request response packet. The method may be applied in an ICN network having no PIT retrieval capability, but is not limited thereto. The method for routing and forwarding is a method for routing and forwarding based on a network name, where the network name may be a network name of a routing node. The method is performed by an ICN node, for example, a router.

1901. Receive a content response message.

1902. Determine whether the content response message includes any CONTROL keyword: when the content response message includes a CONTROL keyword, perform step 1903; when the content response message includes no CONTROL keyword, perform step 1912.

It should be noted that: when the content response message includes a CONTROL keyword, the content response message is a control-plane message exchanged between a routing node and a network controller and the message includes routing information; when the content response message includes no CONTROL keyword, the content response message is a data-plane message.

1903. Determine whether a network name of the routing node is matched: when the network name is matched, perform step 1904; when the network name is not matched, perform step 1907.

If the network name is matched, it indicates that routing information carried in the content response message is sent to the current routing node; if the network name is not matched, it indicates that routing information carried in the content response message is sent to other routing nodes.

1904. Add routing information to a FIB.

1905. Determine whether any matched message packet exists in a wait queue: when a matched message packet exists, perform step 1906.

1906. Add to the FIB.

1907. Determine whether the FIB is matched: when the FIB is matched, perform step 1906; when the FIB is not matched, perform step 1908.

1908. Generate a routing request message and send it to the network controller.

1909. Buffer a message packet corresponding to the content response message to the wait queue, and record buffer time.

1910. Determine whether the wait queue is full: when the wait queue is full, perform step 1911.

1911. Forward a content message packet whose buffer time is longest to a default port or discard the content message packet.

1912. Store to a CS, and continue to perform step 1907.

Figure 20:
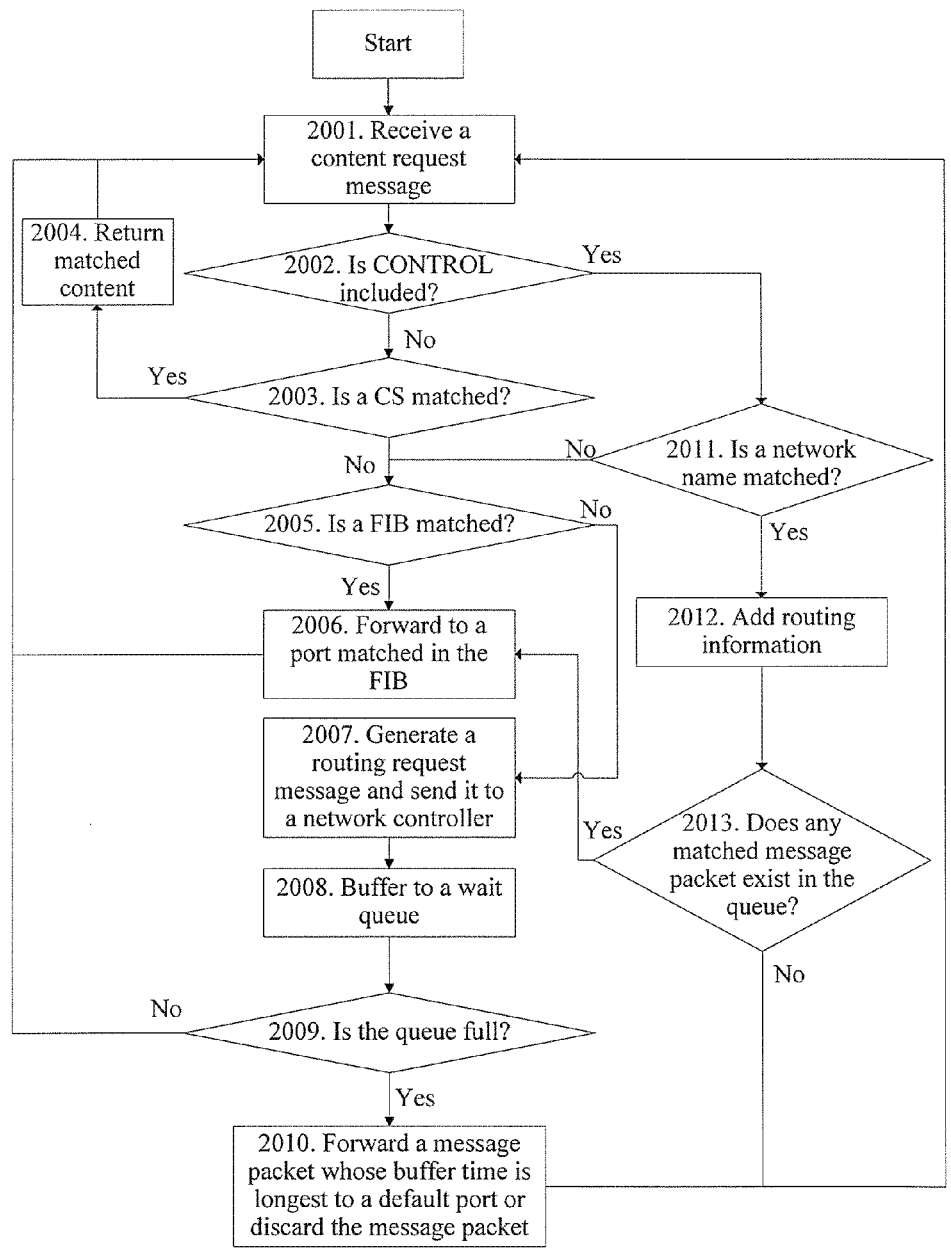
FIG. 20 is a schematic flowchart of a method for routing and forwarding according to another embodiment of the present invention.

FIG. 20 is a schematic flowchart of a method for routing and forwarding according to another embodiment of the present invention. FIG. 20 describes a manner of sending a content request message based on a network name. The method is performed by an ICN node, for example, a router.

2001. Receive a content request message.

2002. Determine whether the content request message includes any CONTROL character: when the content request message includes no CONTROL character, perform step 2003; when the content request message includes a CONTROL character, perform step 2011.

If the content request message includes a CONTROL character, it indicates that the content request message is a control-plane message, where the message includes routing information; if the content request message includes no CONTROL character, it indicates that the content request message is a data-plane message.

2003. Match a CS: when the CS is matched successfully, perform step 2004; when the CS is matched unsuccessfully, perform step 2005.

A content name in the CS is matched.

2004. Return matched content.

2005. Match a FIB with the content name: when the FIB is matched successfully, perform step 2006; when the FIB is matched unsuccessfully, perform step 2007.

2006. Forward to a port matched in the FIB.

2007. Generate a routing request message and send it to a network controller.

2008. Buffer a message packet corresponding to the content request message to a wait queue, and record buffer time.

2009. Determine whether the wait queue is full: when the wait queue is full, perform step 2010.

2010. Forward a message packet whose buffer time is longest to a default port or discard the message packet.

2011. Determine whether a network name of a router is matched: when the network name is not matched, perform step 2005; when the network name is matched, perform step 2012.

2012. Add routing information in the content request message to the FIB.

2013. Determine whether any matched message packet exists in the wait queue: when a matched message packet exists, perform step 2006.

The methods for routing and forwarding according to the embodiments of the present invention have been described above in detail with reference to FIG. 1 to FIG. 4. A network controller and a router according to the embodiments of the present invention are hereinafter described in detail with reference to FIG. 21 and FIG. 22.

Figure 21:
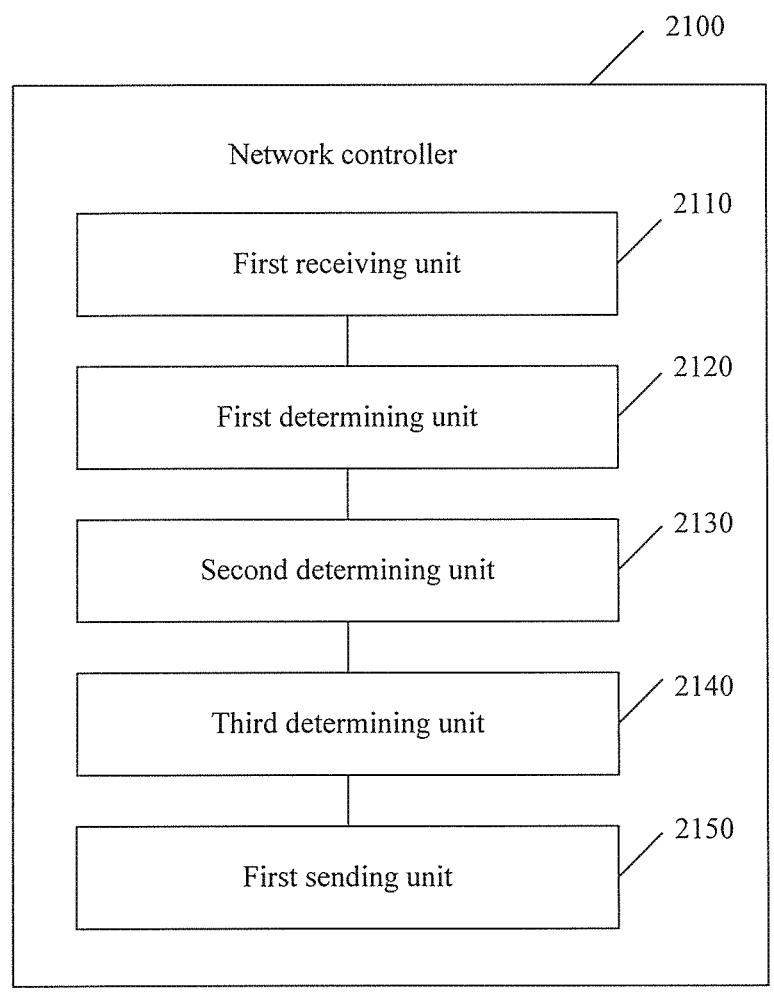
FIG. 21 is a schematic block diagram of a network controller according to an embodiment of the present invention.

FIG. 21 is a schematic block diagram of a network controller according to an embodiment of the present invention. A network controller 2100 in FIG. 21 can implement each step performed by the network controller in FIG. 1 to FIG. 3, which is not further described in detail for avoiding repetition.

The network controller 2100 includes a first receiving unit 2110, a first determining unit 2120, a second determining unit 2130, a third determining unit 2140, and a first sending unit 2150.

The first receiving unit 2110 is configured to receive a routing request message sent by a requesting routing node, where the routing request message carries a content name of requested content.

The first determining unit 2120 is configured to determine, according to the content name received by the first receiving unit 2110 and first registration information stored or acquired by the network controller 2100, a network name of a target routing node corresponding to the content name and a port of the target routing node, where a content request packet corresponding to the requested content can be routed to the requested content through the port of the target routing node, and the first registration information is used to indicate a correspondence between the content name, the network name of the target routing node, and the port of the target routing node.

The second determining unit 2130 is configured to determine, according to the network name of the target routing node determined by the first determining unit 2120 and a network name of the requesting routing node acquired by the network controller 2100, a forwarding path in network topology information of a network controlled by the network controller 2100, where the forwarding path starts from the requesting routing node and ends at the target routing node, and the network topology information is used to indicate a topological structure of the network by using network names of routing nodes in the network.

The third determining unit 2140 is configured to determine, according to the forwarding path determined by the second determining unit 2130, routing information corresponding to the requesting routing node, where the routing information is used to indicate a first port through which the requesting routing node forwards the content request packet, where the first port points to a next-hop routing node corresponding to the requesting routing node on the forwarding path.

The first sending unit 2150 is configured to send the routing information corresponding to the requesting routing node and determined by the third determining unit 2140 to the requesting routing node, so that the requesting routing node forwards the content request packet according to the routing information. Optionally, the network controller may further include: a sixth determining unit (not shown in the figure), configured to determine, according to the forwarding path determined by the second determining unit and the port of the target routing node, routing information corresponding to each routing node except the requesting routing node among routing nodes that the forwarding path passes through, where the routing information is used to indicate a port through which a routing node corresponding to the routing information forwards the content request packet; and a third sending unit (not shown in the figure), configured to deliver the routing information corresponding to each routing node and determined by the sixth determining unit, to each routing node except the requesting routing node among the routing nodes that the forwarding path passes through, so that each routing node forwards the content request packet according to the routing information corresponding to each routing node.

In the embodiment of the present invention, a network controller is introduced, and registration information and network topology information are stored in the network controller (or the registration information and network topology information are acquired through the network controller), so that the network controller may be used to determine a forwarding path of a content request packet, which reduces blindness of routing and forwarding of the content request packet in an ICN network and improves efficiency of routing and forwarding.

Optionally, as an embodiment, the first registration information is registration information of the requested content, where the registration information of the requested content includes the correspondence between the content name, the network name of the target routing node, and the port of the target routing node, and the target routing node is an edge routing node of the requested content; and the first determining unit 2120 is specifically configured to acquire the network name of the target routing node and the port of the target routing node from the registration information of the requested content.

Optionally, as another embodiment, the first registration information includes registration information of the requested content and registration information of a home container of the requested content, where the registration information of the requested content is used to indicate a correspondence between the content name and a container name of the home container, and the registration information of the home container is used to indicate a correspondence between the container name of the home container, the network name of the target routing node, and the port of the target routing node, and the target routing node is an edge routing node of the home container; and the first determining unit 2120 is specifically configured to acquire the container name of the home container from the registration information of the requested content according to the content name, and acquire the network name of the target routing node and the port of the target routing node from the registration information of the home container according to the container name of the home container.

Optionally, as another embodiment, the third determining unit 2140 is specifically configured to determine a next-hop routing node, on the forwarding path, of each routing node except the requesting routing node and the target routing node among the routing nodes that the forwarding path passes through; and use the content name and a port that points to the next-hop routing node, on each routing node, as the routing information corresponding to each routing node, and use the content name and the port of the target routing node as routing information corresponding to the target routing node.

Optionally, as another embodiment, the network controller further includes: a resolving unit, configured to resolve, through a container resolution system, the home container to acquire container tree set information of the requested content, where the container tree set information includes a container name of at least one container including the home container, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; a fourth determining unit, configured to determine, according to registration information of each container in the at least one container stored or acquired by the network controller 2100, an edge routing node of each container, where the registration information of each container is used to indicate a correspondence between a container name of each container and the edge routing node of each container; a fifth determining unit, configured to determine a topological range of each container according to the edge routing node of each container and the network topology information, where the topological range is used to indicate an inclusion relationship between containers and routing nodes; and a second sending unit, configured to deliver the container tree set information to the requesting routing node, so that the requesting routing node stores the container tree set information to the content request packet, so that the content request packet can be routed to the target routing node according to the container tree set information; where the third determining unit 2140 is specifically configured to determine a first topological range corresponding to the requesting routing node, in the topological range of the at least one container included in the container tree set information, where the first topological range is a maximum topological range in a remaining topological range after a topological range including the requesting routing node is excluded from the topological range of the at least one container; and the network controller determines container names of containers corresponding to the first topological range and a port that points to the next-hop routing node, on the requesting routing node, as the routing information corresponding to the requesting routing node.

Acquiring routing information of other routing nodes is similar to acquiring routing information of the requesting routing node, except that routing information of the target routing node is acquired more easily. Specifically, the third determining unit 2140 is specifically configured to determine a first topological range corresponding to each routing node except the target routing node among the routing nodes that the forwarding path passes through, in the topological range of the at least one container included in the container tree set information, and determine a next-hop routing node, on the forwarding path, of each routing node, where the first topological range is a maximum topological range in a remaining topological range after a topological range including each routing node is excluded from the topological range of the at least one container; and use container names of containers corresponding to the first topological range and a port that points to the next-hop routing node, on each routing node, as the routing information corresponding to each routing node, and use the container name of the home container and the port of the target routing node, as the routing information corresponding to the target routing node.

In some other implementation manners, the third determining unit 2140 may perform a corresponding operation of acquiring a routing information only when the other routing nodes except the requesting routing node and target routing node on the forwarding path sends a routing request.

Optionally, as another embodiment, the content request packet is an interest packet, and the routing request message is carried by an interest packet.

Optionally, the first sending unit 2150 is specifically configured to send a routing response message to the requesting routing node, where the routing response message includes the routing information corresponding to the requesting routing node and the routing response message is carried by a data packet.

Optionally, the third sending unit is specifically configured to send an active routing delivery message to each routing node except the requesting routing node among the routing nodes that the forwarding path passes through, where the active routing delivery message includes the routing information corresponding to each routing node, and the active routing delivery message is carried by an interest packet.

Figure 22:
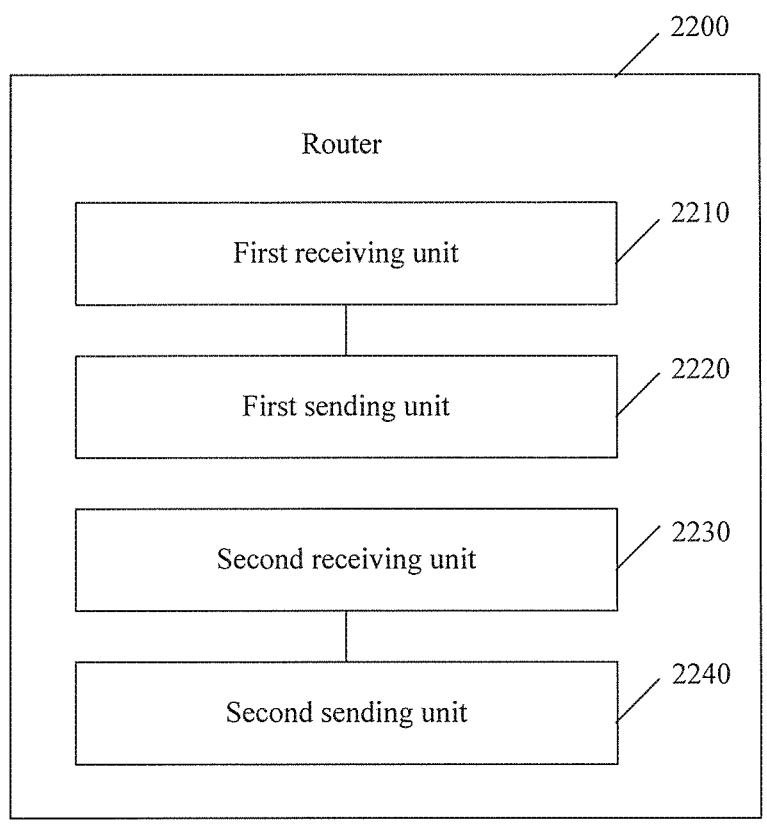
FIG. 22 is a schematic block diagram of a router according to an embodiment of the present invention.

FIG. 22 is a schematic block diagram of a router according to an embodiment of the present invention. A router 2200 in FIG. 22 can implement each step performed by the requesting routing node in FIG. 4, which is not further described in detail herein for avoiding repetition.

The router 2200 includes a first receiving unit 2210, a first sending unit 2220, a second receiving unit 2230, and a second sending unit 2240.

The first receiving unit 2210 is configured to receive a content request packet, where the content request packet carries a content name of requested content.

The first sending unit 2220 is configured to send a routing request message to a network controller when no forwarding entry that matches the content name received by the first receiving unit 2210 exists in a forwarding information base FIB, where the routing request message carries the content name.

The second receiving unit 2230 is configured to receive a routing request response message delivered by the network controller, where the routing response message carries first routing information, where the first routing information is used to indicate a forwarding port of the content request packet to the router 2200, and the first routing information is determined by the network controller according to an acquired network name of the router 2200, the content name, first registration information, and network topology information of a network controlled by the network controller, where the first registration information is used to indicate a correspondence between the content name, a network name of a target routing node, and a port of the target routing node, and the network topology information is used to indicate a topological structure of the network by using network names of routing nodes in the network.

The second sending unit 2240 is configured to forward the content request packet according to the first routing information received by the second receiving unit 2230.

In the embodiment of the present invention, a network controller is introduced, and registration information and network topology information are stored in the network controller (or the registration information and network topology information are acquired through the network controller), so that the network controller may be used to determine a forwarding path of a content request packet, which reduces blindness of routing and forwarding of the content request packet in an ICN network and improves efficiency of routing and forwarding.

Optionally, as an embodiment, the first registration information is registration information of the requested content, where the registration information of the requested content includes the correspondence between the content name, the network name of the target routing node, and the port of the target routing node, and the target routing node is an edge routing node of the requested content; or the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container.

The first routing information includes the content name and the forwarding port of the content request packet; and the second sending unit 2240 is specifically configured to match, according to the content name, the forwarding port in the first routing information, in routing information stored by the router 2200; and forward the content request packet through the forwarding port in the first routing information.

Optionally, as another embodiment, the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container; and the router 2200 further includes: a third receiving unit, configured to receive container tree set information of the requested content, which is sent by the network controller, where the container tree set information is acquired by the network controller by resolving the home container through a container resolution system, and the container tree set information includes a container name of at least one container including the home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; and a first adding unit, configured to add the container tree set information to the content request packet.

Optionally, as another embodiment, the first routing information includes a first container name and a first port corresponding to the first container name, where the first container name is one of container names included in the container tree set information; and the second sending unit 2240 is specifically configured to match, according to the first container name included in the container tree set information carried in the content request packet, the first routing information in routing information stored by the router 2200; and forward the content request packet through the first port.

Optionally, as another embodiment, the router further includes: a first determining unit, configured to determine whether any content that matches the content name exists in a content store CS; a third sending unit, configured to send, when content that matches the content name exists in the CS, the matched content to a sender of the content request packet; a second determining unit, configured to determine, when no content that matches the content name of the requested content exists in the CS, whether any PIT entry that matches the content name of the requested content exists in a pending information table PIT; a fourth receiving unit, configured to add, when a PIT entry that matches the content name exists in the PIT, a port receiving the content request packet to the matched PIT entry; a third determining unit, configured to determine, when no PIT entry that matches the content name exists in the PIT, whether any forwarding entry that matches the content name exists in the FIB; and a fourth sending unit, configured to send, when a forwarding entry that matches the content name exists in the FIB, the content request packet according to the matched forwarding entry.

Optionally, as another embodiment, the router further includes: a fifth receiving unit, configured to receive an active routing delivery message sent by the network controller, where the active routing delivery message carries another piece of routing information, where the another piece of routing information is used to indicate a forwarding port of another content request packet; a sixth receiving unit, configured to receive the another content request packet; and a fifth sending unit, configured to forward the another content request packet according to the another piece of routing information.

Optionally, as another embodiment, the active routing delivery message is carried by an interest packet.

Optionally, as another embodiment, the content request packet is an interest packet, the routing request message is carried by an interest packet, and the routing response message is carried by a data packet.

Figure 23:
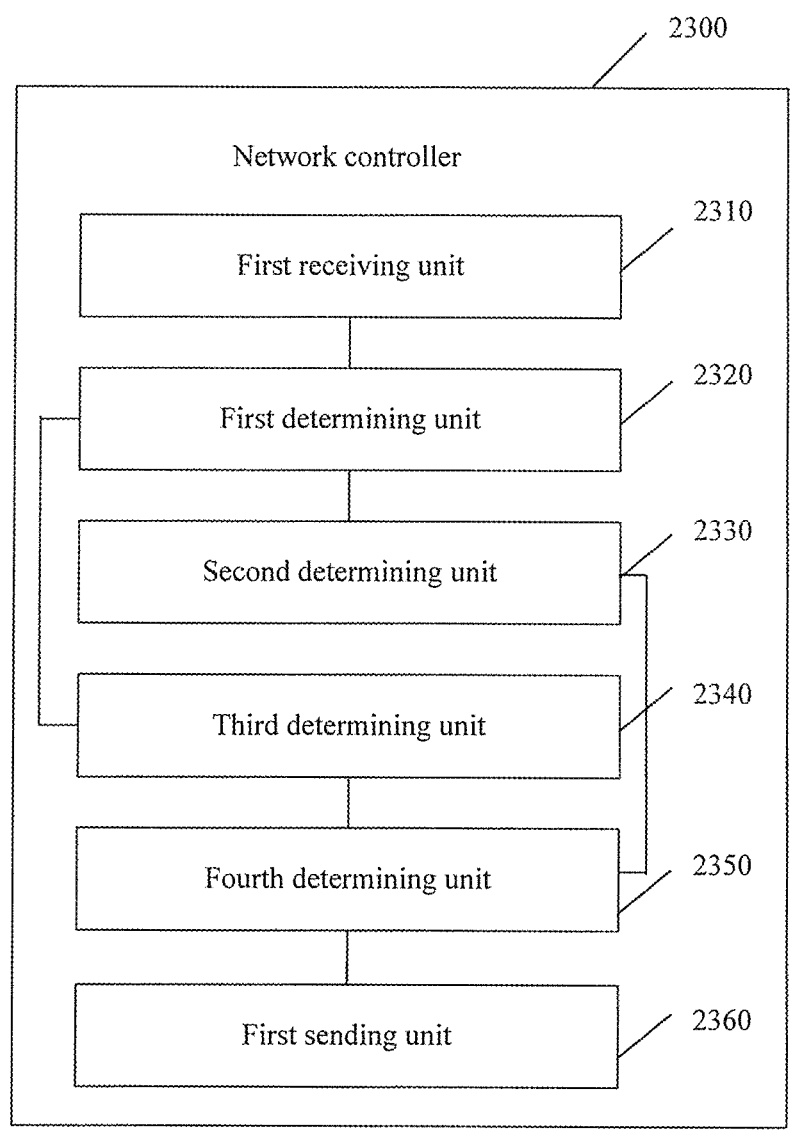
FIG. 23 is a schematic block diagram of a network controller according to an embodiment of the present invention.

FIG. 23 is a schematic block diagram of a network controller according to an embodiment of the present invention. A network controller 2300 in FIG. 23 can implement each step performed by the network controller in FIG. 5, which is not further described in detail for avoiding repetition.

The network controller 2300 includes a first receiving unit 2310, a first determining unit 2320, a second determining unit 2330, a third determining unit 2340, a fourth determining unit 2350, and a first sending unit 2360.

The first receiving unit 2310 is configured to receive a routing request message sent by a requesting routing node, where the routing request message carries container tree set information of requested content, where the container tree set information includes a container name of at least one container including a home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode.

The first determining unit 2320 is configured to determine, according to registration information of each container in the at least one container stored or acquired by the network controller 2300, an edge routing node of each container, where the registration information of each container is used to indicate a correspondence between a container name of each container and the edge routing node of each container.

The second determining unit 2330 is configured to determine a topological range of each container according to the edge routing node of each container determined by the first determining unit 2320 and network topology information of a network controlled by the network controller 2300, where the network topology information is used to indicate a topological structure of the network by using network names of routing nodes in the network, and the topological range is used to indicate an inclusion relationship between containers and routing nodes.

The third determining unit 2340 is configured to determine, according to a network name of an edge routing node, determined by the first determining unit 2320, of the home container, a network name of the requesting routing node acquired by the network controller 2300, and the network topology information, a forwarding path that starts from the requesting routing node and ends at the edge routing node of the home container.

The fourth determining unit 2350 is configured to determine, according to the topological range of the at least one container determined by the second determining unit 2330 and the forwarding path determined by the third determining unit 2340, routing information corresponding to the requesting routing node, where the routing information includes a container name and a port corresponding to the container name, where the container name is a container name of a container in the at least one container included in the container tree set information.

The first sending unit 2360 is configured to deliver the routing information corresponding to the requesting routing node and determined by the fourth determining unit 2350 to the requesting routing node, so that the requesting routing node forwards, according to the routing information, a content request packet corresponding to the requested content.

Optionally, the apparatus may further include: a fifth determining unit, configured to determine, according to the topological range of the at least one container determined by the second determining unit and the forwarding path determined by the third determining unit, routing information corresponding to each routing node except the requesting routing node among routing nodes that the forwarding path passes through, where the routing information includes a container name and a port corresponding to the container name, where the container name in the routing information corresponding to each routing node is a container name of a container in the at least one container included in the container tree set information; and a second sending unit, configured to deliver the routing information corresponding to each routing node to each routing node except the requesting routing node, so that each routing node forwards, according to the routing information corresponding to each routing node, the content request packet corresponding to the requested content.

It should be noted that information of other routing nodes except the requesting routing node and target routing node on the forwarding path may be actively delivered to the other routing nodes after being acquired according to the method for acquiring routing information of the requesting routing node, or may be acquired and delivered when the other routing nodes request routing information from the network controller.

In the embodiment of the present invention, a network controller is introduced, and registration information and a network topology diagram are stored in the network controller, or the registration information and the network topology diagram are acquired through the network controller, so that the network controller may be used to determine a forwarding path of a content request packet, which reduces blindness of routing and forwarding of the content request packet in an ICN network and improves efficiency of routing and forwarding.

Further, when a requester requests different content of a same path, each routing node needs to store only one piece of routing information. Therefore, storage resources of routing nodes are saved.

Optionally, as an embodiment, the fourth determining unit 2350 is specifically configured to determine a first topological range corresponding to each routing node, in the topological range of the at least one container, and determine a next-hop routing node, on the forwarding path, of each routing node, where the first topological range is a maximum topological range in a remaining topological range after a topological range including each routing node is excluded from the topological range of the at least one container; and use container names of containers corresponding to the first topological range and a port that points to the next-hop routing node, on each routing node, as the routing information corresponding to each routing node.

Optionally, as another embodiment, the content request packet is an interest packet, and the routing request message is carried by an interest packet.

Optionally, the first sending unit 2360 is specifically configured to send a routing response message to the requesting routing node, where the routing response message includes the routing information corresponding to the requesting routing node and the routing response message is carried by a data packet.

Optionally, the second sending unit is specifically configured to send an active routing delivery message to each routing node except the requesting routing node among the routing nodes that the forwarding path passes through, where the active routing delivery message includes the routing information corresponding to each routing node except the requesting routing node, and the active routing delivery message is carried by an interest packet.

Figure 24:
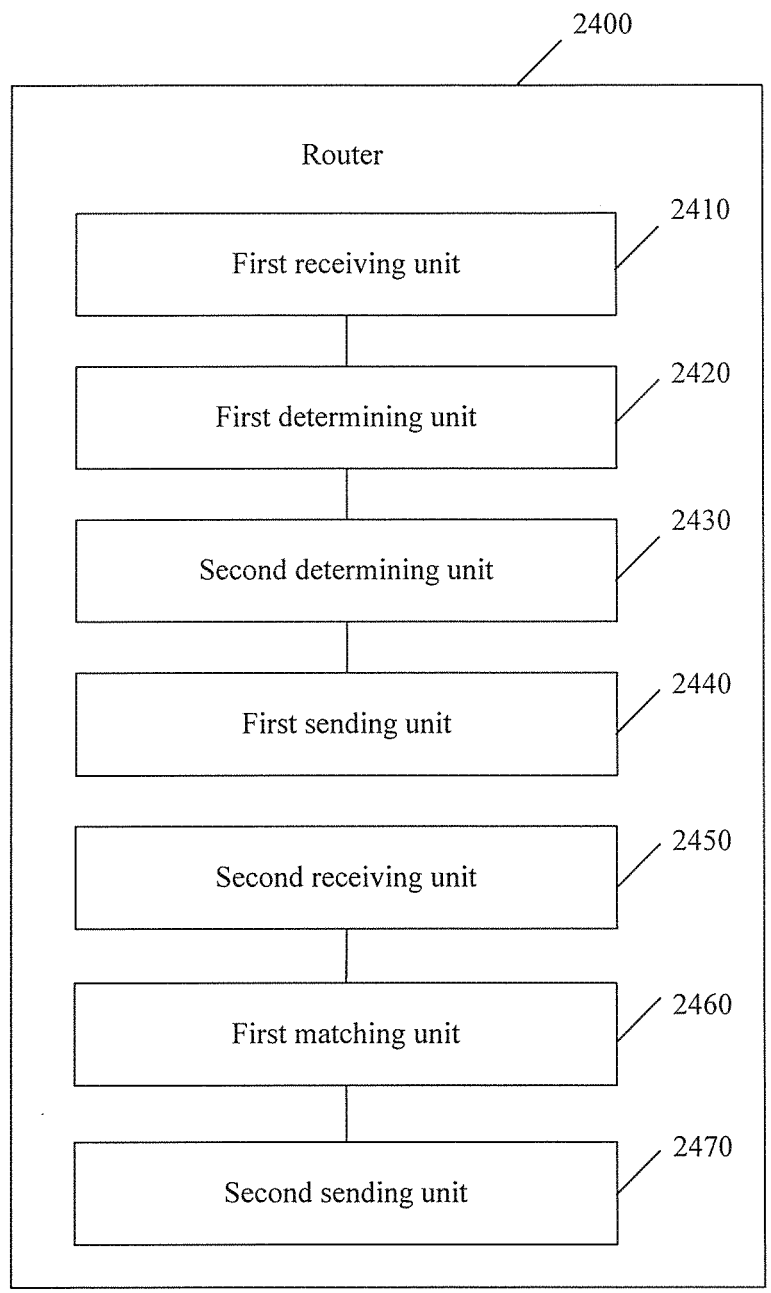
FIG. 24 is a schematic block diagram of a router according to another embodiment of the present invention.

FIG. 24 is a schematic block diagram of a router according to another embodiment of the present invention. It should be understood that a router 2400 in FIG. 24 can implement each step performed by the requesting routing node in the method in FIG. 6.

The router 2400 includes a first receiving unit 2410, a first determining unit 2420, a second determining unit 2430, a first sending unit 2440, a second receiving unit 2450, a first matching unit 2460, and a second sending unit 2470.

The first receiving unit 2410 is configured to receive a content request packet, where the content request packet carries a content name of requested content.

Optionally, the content request packet may further carry container tree set information of the requested content, where the container tree set information includes a container name of at least one container including a home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode.

The first determining unit 2420 is configured to determine whether any forwarding entry that matches the content name of the requested content received by the first receiving unit 2410 exists in a forwarding information base FIB.

The second determining unit 2430 is configured to determine, when the first determining unit 2420 determines that no forwarding entry that matches the content name of the requested content exists in the FIB, whether any forwarding entry that matches the container name of the at least one container exists in the FIB.

The first sending unit 2440 is configured to send a routing request message to a network controller when the second determining unit 2430 determines that no forwarding entry that matches the container name of the at least one container exists in the FIB, where the routing request message carries the container tree set information.

In some other embodiments, the router may not include the second determining unit 2430. In this case, the first sending unit 2440 is configured to send a routing request message to the network controller when the first determining unit determines that no forwarding entry that matches the content name of the requested content exists in the FIB.

The second receiving unit 2450 is configured to receive a routing request response message sent by the network controller, where the routing response message carries first routing information, where the first routing information includes a first container name and a port corresponding to the first container name, where the first container name is one of container names included in the container tree set information, and the first routing information is determined by the network controller according to an acquired network name of the router 2400, the container tree set information, registration information of each container in the at least one container included in the container tree set information, and network topology information of a network controlled by the network controller, where the registration information of each container is used to indicate a correspondence between a container name of each container and an edge routing node of each container, and the network topology information is used to indicate a topological structure of the network by using network names of routing nodes in the network.

The first matching unit 2460 is configured to match, according to the container name of the at least one container included in the container tree set information, the first routing information received by the second receiving unit 2450, in routing information stored by the router 2400.

The second sending unit 2470 is configured to forward the content request packet through the port corresponding to the first container name, in the first routing information matched by the first matching unit 2460.

In some other implementation manners, the container tree set information is stored on the router, and the router may perform query locally according to the content name to acquire container tree set information corresponding to the content name; or the router may query a container resolution system to acquire container tree set information corresponding to the content name. Herein the container resolution system may be integrated on the router or the network controller, or may be an independent third-party system, which is not limited in the embodiment of the present invention.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Further, when a requester requests different content of a same path, each routing node needs to store only one piece of routing information. Therefore, storage resources of routing nodes are saved.

Optionally, as an embodiment, the router further includes: a third receiving unit, configured to receive an active routing delivery message sent by the network controller, where the active routing delivery message carries another piece of routing information, where the another piece of routing information carries another container name and a port corresponding to the another container name; a fourth receiving unit, configured to receive another content request packet, where the another content request packet carries the another container name; a second matching unit, configured to match, according to the another container name, the another piece of routing information in the routing information stored by the router; and a third sending unit, configured to forward the another content request packet through the port corresponding to the another container name.

Optionally, as another embodiment, the active routing delivery message is carried by an interest packet.

Optionally, as another embodiment, the router further includes: a third determining unit, configured to determine whether any content that matches the content name exists in a content store CS; a fourth sending unit, configured to send, when content that matches the content name exists in the CS, the matched content to a sender of the content request packet; a fourth determining unit, configured to determine, when no content that matches the content name of the requested content exists in the CS, whether any PIT entry that matches the content name of the requested content exists in a pending information table PIT; a first adding unit, configured to add, when a PIT entry that matches the content name exists in the PIT, a port receiving the content request packet to the matched PIT entry; a fifth determining unit, configured to determine, when no PIT entry that matches the content name exists in the PIT, whether any forwarding entry that matches the content name exists in the FIB; and a fifth sending unit, configured to send, when a forwarding entry that matches the content name exists in the FIB, the content request packet according to the matched forwarding entry.

Optionally, as another embodiment, the content request packet is an interest packet, the routing request message is carried by an interest packet, and the routing response message is carried by a data packet.

Figure 25:
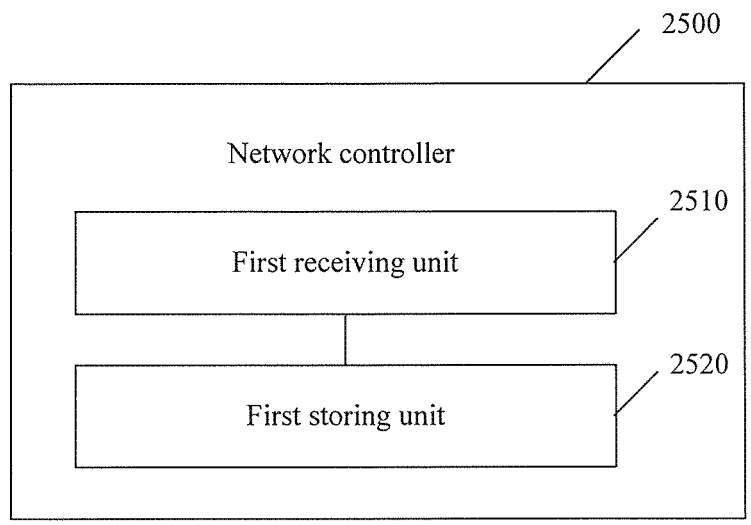
FIG. 25 is a schematic block diagram of a network controller according to another embodiment of the present invention.

FIG. 25 is a schematic block diagram of a network controller according to another embodiment of the present invention. A network controller 2500 in FIG. 25 can implement each step performed by the network controller in FIG. 7, which is not further described in detail for avoiding repetition.

The network controller 2500 includes a first receiving unit 2510 and a first storing unit 2520.

The first receiving unit 2510 is configured to receive a content registration message sent by a first routing node. The content registration message carries content registration information used to indicate a correspondence between a content name, a network name of the first routing node, and a first port of the first routing node, where the first port is a port through which the first routing node receives a content registration request packet corresponding to a content to be registered.

The first storing unit 2520 is configured to store the content registration information received by the first receiving unit 2510.

In the embodiment of the present invention, the network controller stores the content registration information. Therefore, it is convenient to perform uniform management of registration information, and routing information that each routing node needs to store is reduced.

Optionally, as an embodiment, the first routing node is an edge routing node of the content to be registered, the content registration information includes a content name of the content to be registered and the first port, and the first port is a port through which the first routing node receives the content registration request packet corresponding to the content to be registered.

The first storing unit 2520 is specifically configured to determine whether any content that matches the content name of the content to be registered exists in registered content; when the matched content does not exist, store the content name of the content to be registered, and store a correspondence between the content name of the content to be registered, the network name of the first routing node acquired by the network controller 2500, and the first port; and when the matched content exists, add the correspondence between the content name of the content to be registered, the network name of the first routing node, and the first port to registration information of the matched content.

Optionally, as another embodiment, the network controller further includes: a second receiving unit, configured to receive a content deregistration message sent by a second routing node, where the content deregistration message carries a content name of content to be deregistered and a second port, where the second routing node is an edge routing node of the content to be deregistered, and the second port is a port through which the second routing node receives a content deregistration request packet corresponding to the content to be deregistered; a first determining unit, configured to determine first registered content, where the first registered content is content that is in the registered content and matches the content name of the content to be deregistered; and a first deleting unit, configured to delete a correspondence between the content name of the content to be deregistered, a second network name acquired by the network controller 2500, and the second port from registration information of the first registered content.

Optionally, as another embodiment, the content registration information includes a correspondence between a content name of the content to be registered and a container name of a home container of the content to be registered, and a correspondence between the container name of the home container of the content to be registered, the network name of the first routing node, and the first port of the first routing node, where the first routing node is an edge routing node of the home container of the content to be registered.

The first storing unit 2520 is specifically configured to determine whether any content that matches the content name of the content to be registered exists in registered content; when the matched content exists, add the correspondence between the content name of the content to be registered and the container name of the home container of the content to be registered, to registration information of the matched content; and when the matched registered content does not exist, store the content name of the content to be registered, and store the correspondence between the content name of the content to be registered and the container name of the home container of the content to be registered.

Optionally, as another embodiment, the network controller further includes: a third receiving unit, configured to receive a content deregistration message sent by a third routing node, where the content deregistration message carries a content name of content to be deregistered and a container name of a home container of the content to be deregistered; a second determining unit, configured to determine second registered content, where the second registered content is registered content that matches the content name of the content to be deregistered; and a second deleting unit, configured to delete the correspondence between the content name of the content to be deregistered and the container name of the home container of the content to be deregistered from registration information of the second registered content.

Optionally, as another embodiment, the content deregistration message is carried by an interest packet.

Optionally, as another embodiment, the network controller further includes: a fourth receiving unit, configured to receive a container registration message sent by a fourth routing node, where the fourth routing node is an edge routing node of a container to be registered, and the container registration message carries a container name of the container to be registered and a fourth port, where the fourth port is a port through which the fourth routing node receives a container registration request packet corresponding to the container to be registered; a third determining unit, configured to determine whether any container that matches the container name of the container to be registered exists in registered containers; a first adding unit, configured to add, when the matched container exists, a correspondence between the container name of the container to be registered, a network name of the fourth routing node acquired by the network controller 2500, and the fourth port to registration information of the matched container; and a second storing unit, configured to: when the matched container does not exist, store the container name of the container to be registered, and store the correspondence between the container name of the container to be registered, the network name of the fourth routing node, and the fourth port.

Optionally, as another embodiment, the network controller further includes: a fifth receiving unit, configured to receive a container deregistration message sent by a fifth routing node, where the fifth routing node is an edge routing node of a container to be deregistered, and the container deregistration message carries a container name of the container to be deregistered and a fifth port, where the fifth port is a port through which the fifth routing node receives a container deregistration request packet corresponding to the container to be deregistered; a fourth determining unit, configured to determine a third registered container, where a container name of the third registered container matches the container name of the container to be deregistered; and a third deleting unit, configured to delete a correspondence between the container name of the container to be deregistered, a network name of the fifth routing node acquired by the network controller 2500, and the fifth port from registration information of the third registered container.

Optionally, as another embodiment, the container deregistration message is carried by an interest packet.

Optionally, as another embodiment, the content registration message is carried by an interest packet.

Figure 26:
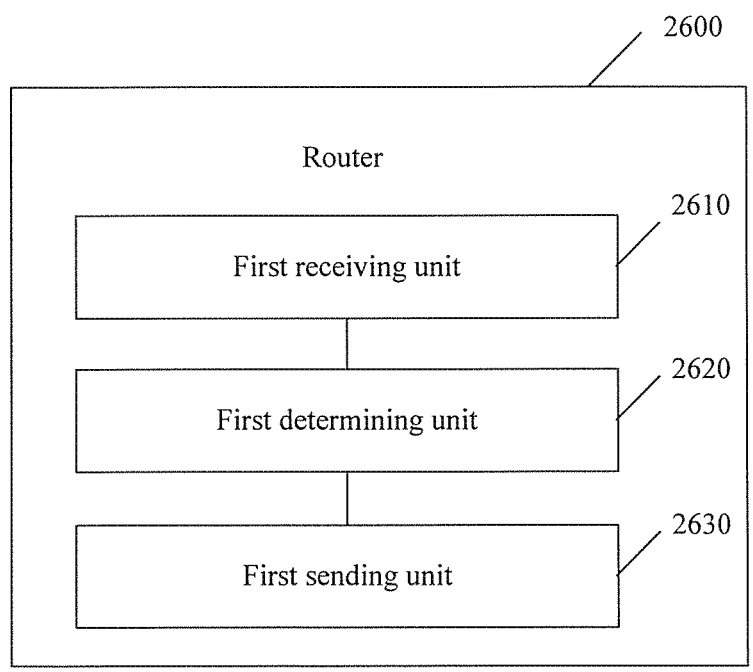
FIG. 26 is a schematic block diagram of a router according to another embodiment of the present invention.

FIG. 26 is a schematic block diagram of a router according to another embodiment of the present invention. It should be understood that a router 2600 in FIG. 26 can implement each step performed by the first routing node in the method in FIG. 8.

The router 2600 includes a first receiving unit 2610, a first determining unit 2620, and a first sending unit 2630.

The first receiving unit 2610 is configured to receive a content registration request packet. The content registration request packet carries a content name of content to be registered.

The first determining unit 2620 is configured to determine content registration information according to the content registration request packet received by the first receiving unit 2610. The content registration information is used to indicate a correspondence between the content name, a network name of the first routing node, and a first port of the first routing node, where the first port is a port through which the first routing node receives the content registration request packet.

The first sending unit 2630 is configured to send a content registration message to a network controller, where the content registration message carries the content registration information determined by the first determining unit 2620.

In the embodiment of the present invention, the network controller stores the content registration information. Therefore, it is convenient to perform uniform management of registration information, and routing information that each routing node needs to store is reduced.

Optionally, as an embodiment, the content registration request packet carries the content name of the content to be registered, and the first determining unit is specifically configured to determine the content name of the content to be registered and the first port as the content registration information, where the first port is a port through which the router receives the content registration packet.

Optionally, as another embodiment, the router further includes: a second receiving unit, configured to receive a content deregistration request packet, where the content deregistration request packet carries a content name of content to be deregistered; a second determining unit, configured to determine content deregistration information according to the content deregistration request packet, where the content deregistration information includes the content name of the content to be deregistered and a second port, where the second port is a port through which the router receives the content deregistration request packet; and a second sending unit, configured to send a content deregistration message to the network controller, where the content deregistration message carries the content deregistration information.

Optionally, as another embodiment, the content registration request packet further carries a container name of a home container of the content to be registered, and the content registration information includes a correspondence between the content name of the content to be registered and the container name of the home container of the content to be registered, and a correspondence between the container name of the home container of the content to be registered, the network name of the first routing node, and the first port of the first routing node, where the first routing node is an edge routing node of the home container of the content to be registered.

Optionally, as another embodiment, the router further includes: a third receiving unit, configured to receive a content deregistration request packet, where the content deregistration request packet carries a content name of content to be deregistered and a container name of a home container of the content to be deregistered; and a third sending unit, configured to send a content deregistration message to the network controller, where the content deregistration message carries the content name of the content to be deregistered and the container name of the home container of the content to be deregistered.

Optionally, as another embodiment, the content deregistration request packet is an interest packet, and the content deregistration request message is carried by an interest packet.

Optionally, as another embodiment, the router further includes: a fourth receiving unit, configured to receive a container registration request packet, where the container registration request packet carries a container name of a container to be registered; a third determining unit, configured to determine a fourth port, where the fourth port is a port through which the router receives the container registration request packet; and a fourth sending unit, configured to send a container registration request message to the network controller, where the container registration request message carries the container name of the container to be registered and the fourth port.

Optionally, as another embodiment, the container registration request packet is an interest packet, and the container registration request message is carried by an interest packet.

Optionally, as another embodiment, the router further includes: a fifth receiving unit, configured to receive a container deregistration request packet, where the container deregistration request packet carries a container name of a container to be deregistered; a fourth determining unit, configured to determine a fifth port, where the fifth port is a port through which the router receives the container deregistration request packet; and a fifth sending unit, configured to send a container deregistration request message to the network controller, where the container deregistration request message carries the container name of the container to be deregistered and the fifth port.

Optionally, as another embodiment, the content registration request packet is an interest packet, and the content registration request message is carried by an interest packet.

An embodiment of the present invention further provides a network controller, including: a receiving unit, configured to receive a content registration message sent by a first routing node, where the content registration message carries content registration information used to indicate a storage position of content to be registered; and a storing unit, configured to store the content registration information.

Specifically, the content registration information is used to indicate a correspondence between a content name, a network name of the first routing node, and a first port of the first routing node, where the first port is a port through which the first routing node receives a content registration request packet corresponding to a content to be registered.

In an implementation manner, the content registration information includes a content name of the content to be registered and the first port of the first routing node.

In another implementation manner, the content registration information includes a correspondence between a content name of the content to be registered and a container name of a home container of the content to be registered, and a correspondence between the container name of the home container of the content to be registered, the network name of the first routing node, and the first port of the first routing node, where the first routing node is an edge routing node of the home container of the content to be registered.

Figure 27:
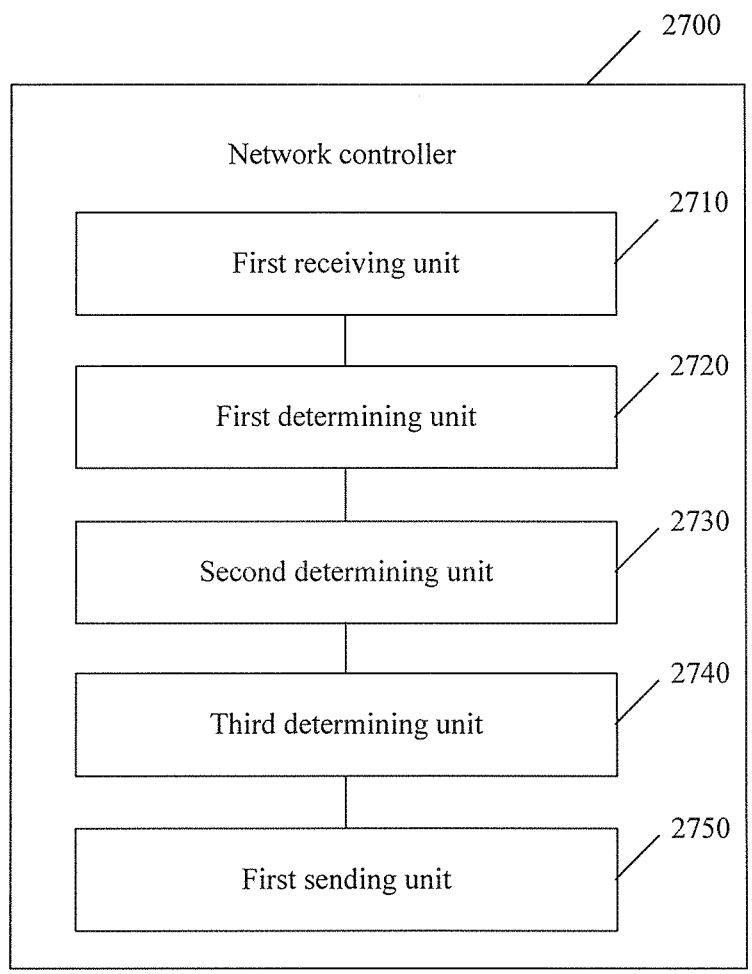
FIG. 27 is a schematic block diagram of a network controller according to another embodiment of the present invention.

FIG. 27 is a schematic block diagram of a network controller according to another embodiment of the present invention. A network controller 2700 in FIG. 27 can implement each step performed by the network controller in FIG. 9, which is not further described in detail herein for avoiding repetition.

The network controller 2700 includes a first receiving unit 2710, a first determining unit 2720, a second determining unit 2730, a third determining unit 2740, and a first sending unit 2750.

The first receiving unit 2710 is configured to receive a routing request message sent by a requesting routing node, where the routing request message carries a first name.

The first determining unit 2720 is configured to determine a network name of a target routing node according to the first name received by the first receiving unit 2710.

The second determining unit 2730 is configured to determine, according to a network name of the requesting routing node acquired by the network controller 2700, the network name of the target routing node determined by the first determining unit 2720, and network topology information of a network controlled by the network controller 2700, a forwarding path from the requesting routing node to the target routing node, where the network topology information is used to indicate a topological structure of the network by using network names of routing nodes in the network.

The third determining unit 2740 is configured to determine routing information corresponding to each routing node except the target routing node among routing nodes that the forwarding path determined by the second determining unit 2730 passes through, where the routing information corresponding to each routing node includes the network name of the target routing node and a port that points to a next-hop routing node, on each routing node on the forwarding path.

The first sending unit 2750 is configured to deliver the routing information corresponding to each routing node and determined by the third determining unit 2740 to each routing node.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Optionally, as an embodiment, the routing request message is used to request a forwarding path of a content response packet, the first name is the network name of the target routing node, the target routing node is a first one routing node that a content request packet corresponding to the content response packet passes through, the content response packet is a data packet, and the content request packet is an interest packet.

Optionally, as another embodiment, the routing request message is used to request a forwarding path of a content request packet, where the content request packet is an interest packet; the first name is a content name of requested content carried in the content request packet; the network controller stores registration information of the requested content, where the registration information of the requested content is used to indicate a correspondence between the content name of the requested content and the network name of the target routing node; the target routing node is an edge routing node of the requested content; and the first determining unit 2720 is specifically configured to acquire the network name of the target routing node from the registration information of the requested content according to the content name.

Optionally, as another embodiment, the routing request message is carried by an interest packet; and the first sending unit 2750 is specifically configured to send a routing response message to the requesting routing node, where the routing response message includes the routing information corresponding to the requesting routing node and the routing response message is carried by a data packet; and send an active routing delivery message to each routing node except the requesting routing node and the target routing node among the routing nodes that the forwarding path passes through, where the active routing delivery message includes the routing information corresponding to each routing node, and the active routing delivery message is carried by an interest packet.

Figure 28:
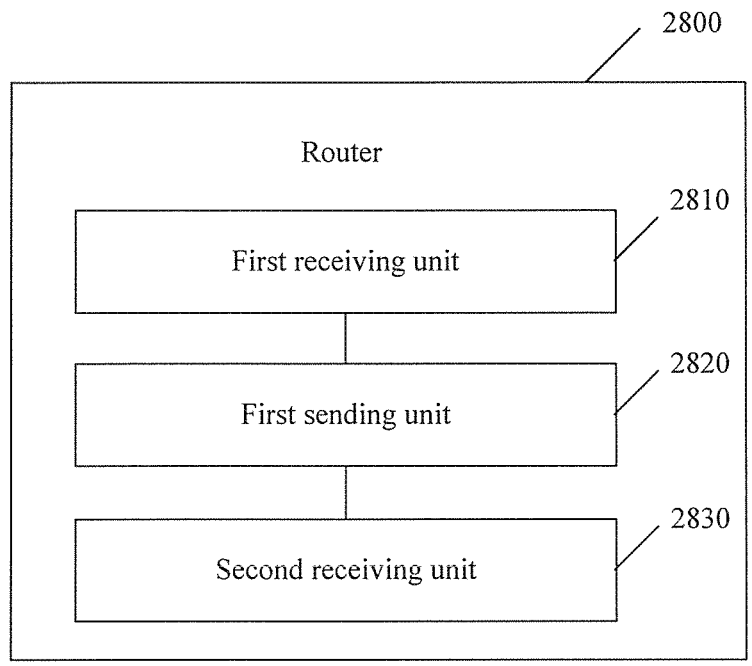
FIG. 28 is a schematic block diagram of a router according to another embodiment of the present invention.

FIG. 28 is a schematic block diagram of a router according to another embodiment of the present invention. It should be understood that a router 2800 in FIG. 28 can implement each step performed by the requesting routing node in FIG. 10, which is not further described in detail herein for avoiding repetition.

The router 2800 includes a first receiving unit 2810, a first sending unit 2820, and a second receiving unit 2830.

The first receiving unit 2810 is configured to receive a message packet, where the message packet carries a first name.

The first sending unit 2820 is configured to send a routing request message to a network controller when no forwarding entry that matches the first name received by the first receiving unit 2810 exists in a forwarding information base FIB, where the routing request message carries the first name.

The second receiving unit 2830 is configured to receive a routing response message delivered by the network controller, where the routing response message carries first routing information, where the first routing information includes a network name of a target routing node and a forwarding port of the message packet, and the first routing information is determined by the network controller according to the first name, an acquired network name of the router 2800, and network topology information of a network controlled by the network controller, where the network topology information is used to indicate a topological structure of the network by using network names of routing nodes in the network.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Optionally, as an embodiment, the message packet is a content response packet, the message packet is a data packet, the first name is the network name of the target routing node, the target routing node is a first one routing node that a content request packet corresponding to the content response packet passes through, and the content request packet is an interest packet.

Optionally, as another embodiment, the router further includes: a first determining unit, configured to determine whether any forwarding entry that matches the network name of the target routing node exists in the FIB; and a second sending unit, configured to send, when a forwarding entry that matches the network name of the target routing node exists in the FIB, the content response packet according to the matched forwarding entry.

Optionally, as another embodiment, the message packet is a content request packet, the content request packet is an interest packet, the first name is a content name of requested content carried in the content request packet, and the target routing node is an edge routing node of the requested content.

Optionally, as another embodiment, the router further includes: a second determining unit, configured to determine whether any content that matches the content name exists in a content store CS; a third sending unit, configured to send, when content that matches the content name exists in the CS, the matched content to a sender of the content request packet; a third determining unit, configured to determine, when no content that matches the content name of the requested content exists in the CS, whether any forwarding entry that matches the content name of the requested content exists in the FIB; and a fourth sending unit, configured to send, when a forwarding entry that matches the content name exists in the FIB, the content request packet according to the matched forwarding entry.

Optionally, as another embodiment, the router further includes: a third receiving unit, configured to receive an active routing delivery message sent by the network controller, where the active routing delivery message carries another piece of routing information, where the another piece of routing information includes a network name of another target routing node and a forwarding port corresponding to the another target routing node; a fourth receiving unit, configured to receive another content request packet, where the another content request packet includes the network name of the another target routing node; and a fifth sending unit, configured to forward the another content request packet through the forwarding port in the another piece of routing information.

Optionally, as another embodiment, the active routing delivery message is carried by an interest packet.

Optionally, as another embodiment, the routing request message is carried by an interest packet, and the routing response message is carried by a data packet.

Figure 29:
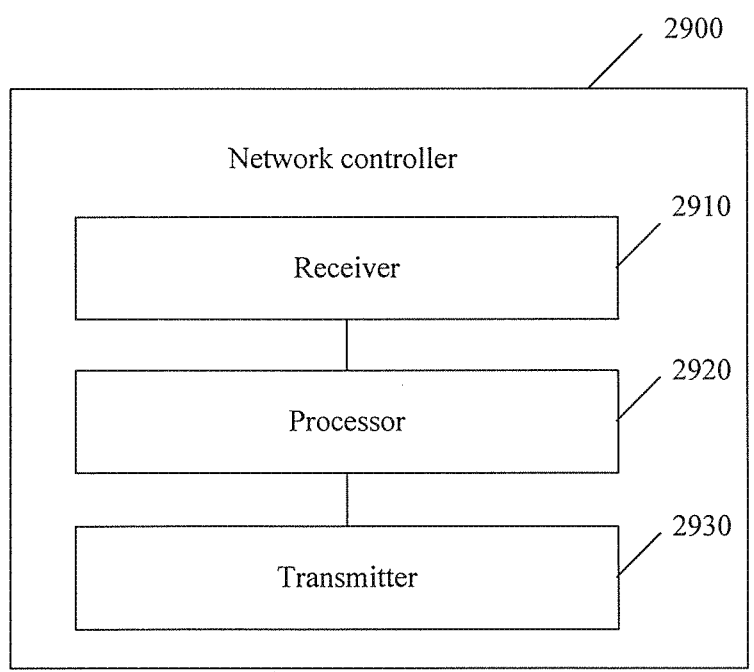
FIG. 29 is a schematic block diagram of a network controller according to an embodiment of the present invention.

FIG. 29 is a schematic block diagram of a network controller according to an embodiment of the present invention. A network controller 2900 in FIG. 29 can implement each step performed by the network controller in FIG. 1 to FIG. 4, which is not further described in detail for avoiding repetition.

The network controller 2900 includes a receiver 2910, a processor 2920, and a transmitter 2930.

The receiver 2910 is configured to receive a routing request message sent by a requesting routing node, where the routing request message carries a content name of requested content.

The processor 2920 is configured to determine, according to the content name received by the receiver 2910 and first registration information stored or acquired by the network controller 2900, a network name of a target routing node corresponding to the content name and a port of the target routing node, where a content request packet corresponding to the requested content can be routed to the requested content through the port of the target routing node, and the first registration information is used to indicate a correspondence between the content name, the network name of the target routing node, and the port of the target routing node; determine, according to the network name of the target routing node and a network name of the requesting routing node acquired by the network controller 2900, a forwarding path in network topology information of a network controlled by the network controller 2900, where the forwarding path starts from the requesting routing node and ends at the target routing node, and the network topology information is used to indicate a topological structure of the network by using network names of routing nodes in the network; and determine, according to the forwarding path, routing information corresponding to the requesting routing node, where the routing information is used to indicate a first port through which the requesting routing node forwards the content request packet, where the first port points to a next-hop routing node corresponding to the requesting routing node on the forwarding path.

The transmitter 2930 is configured to send the routing information corresponding to the requesting routing node to the requesting routing node, so that the requesting routing node forwards the content request packet according to the routing information.

As can be seen, in the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Optionally, as an embodiment, the processor 2920 may be further configured to determine, according to the forwarding path and the port of the target routing node, routing information corresponding to each routing node except the requesting routing node among routing nodes that the forwarding path passes through, where the routing information is used to indicate a port through which a routing node corresponding to the routing information forwards the content request packet; and the transmitter 2930 may be further configured to deliver the routing information corresponding to each routing node, to each routing node except the requesting routing node among the routing nodes that the forwarding path passes through, so that each routing node forwards the content request packet according to the routing information corresponding to each routing node.

Optionally, as an embodiment, the first registration information is registration information of the requested content, where the registration information of the requested content includes the correspondence between the content name, the network name of the target routing node, and the port of the target routing node, and the target routing node is an edge routing node of the requested content; and the processor 2920 is specifically configured to acquire the network name of the target routing node and the port of the target routing node from the registration information of the requested content.

Optionally, as another embodiment, the first registration information includes registration information of the requested content and registration information of a home container of the requested content, where the registration information of the requested content is used to indicate a correspondence between the content name and a container name of the home container, and the registration information of the home container is used to indicate a correspondence between the container name of the home container, the network name of the target routing node, and the port of the target routing node, and the target routing node is an edge routing node of the home container; and the processor 2920 is specifically configured to acquire the container name of the home container from the registration information of the requested content according to the content name, and acquire the network name of the target routing node and the port of the target routing node from the registration information of the home container according to the container name of the home container.

Optionally, as another embodiment, the processor 2920 is specifically configured to determine a next-hop routing node, on the forwarding path, of each routing node except the requesting routing node and the target routing node among the routing nodes that the forwarding path passes through; and use the content name and a port that points to the next-hop routing node, on each routing node, as the routing information corresponding to each routing node, and use the content name and the port of the target routing node as routing information corresponding to the target routing node.

Optionally, as another embodiment, the processor 2920 is further configured to resolve, through a container resolution system, the home container to acquire container tree set information of the requested content, where the container tree set information includes a container name of at least one container including the home container, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; determine, according to registration information of each container in the at least one container stored or acquired by the network controller 2900, an edge routing node of each container, where the registration information of each container is used to indicate a correspondence between a container name of each container and the edge routing node of each container; and determine a topological range of each container according to the edge routing node of each container and the network topology information, where the topological range is used to indicate an inclusion relationship between containers and routing nodes; the transmitter 2930 is further configured to deliver the container tree set information to the requesting routing node, so that the requesting routing node stores the container tree set information to the content request packet, so that the content request packet can be routed to the target routing node according to the container tree set information; the processor 2920 is specifically configured to determine a first topological range corresponding to the requesting routing node, in the topological range of the at least one container included in the container tree set information, where the first topological range is a maximum topological range in a remaining topological range after a topological range including the requesting routing node is excluded from the topological range of the at least one container; and configured to determine container names of containers corresponding to the first topological range and a port that points to the next-hop routing node, on the requesting routing node, as the routing information corresponding to the requesting routing node.

In some other implementation manners, the processor 2920 is specifically configured to determine a first topological range corresponding to each routing node except the target routing node among the routing nodes that the forwarding path passes through, in the topological range of the at least one container included in the container tree set information, and determine a next-hop routing node, on the forwarding path, of each routing node, where the first topological range is a maximum topological range in a remaining topological range after a topological range including each routing node is excluded from the topological range of the at least one container; and use container names of containers corresponding to the first topological range and a port that points to the next-hop routing node, on each routing node, as the routing information corresponding to each routing node, and use the container name of the home container and the port of the target routing node, as the routing information corresponding to the target routing node.

Optionally, as another embodiment, the content request packet is an interest packet, and the routing request message is carried by an interest packet.

Optionally, the transmitter 2930 is specifically configured to send a routing response message to the requesting routing node, where the routing response message includes the routing information corresponding to the requesting routing node and the routing response message is carried by a data packet.

Optionally, the transmitter 2930 sends an active routing delivery message to each routing node except the requesting routing node among the routing nodes that the forwarding path passes through, where the active routing delivery message includes the routing information corresponding to each routing node, and the active routing delivery message is carried by an interest packet.

Figure 30:
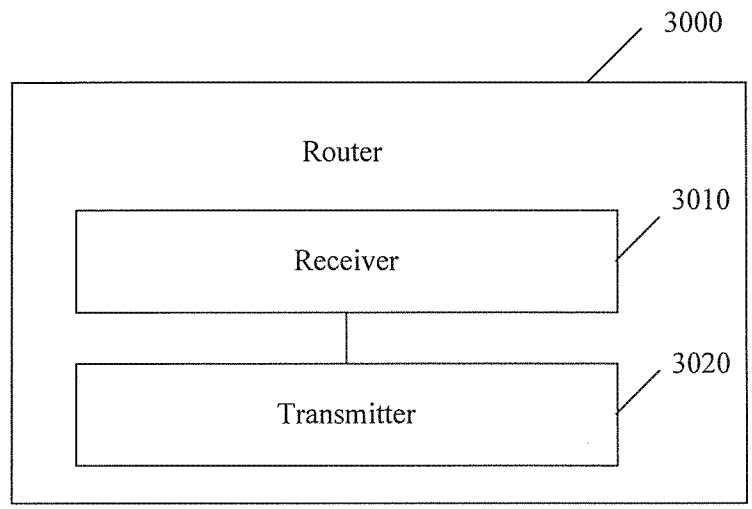
FIG. 30 is a schematic block diagram of a router according to an embodiment of the present invention.

FIG. 30 is a schematic block diagram of a router according to an embodiment of the present invention. A router 3000 in FIG. 30 can implement each step performed by the requesting routing node in FIG. 4, which is not further described in detail herein for avoiding repetition.

The router 3000 includes a receiver 3010 and a transmitter 3020.

The receiver 3010 is configured to receive a content request packet, where the content request packet carries a content name of requested content.

The transmitter 3020 is configured to send a routing request message to a network controller when no forwarding entry that matches the content name received by the receiver 3010 exists in a forwarding information base FIB, where the routing request message carries the content name.

The receiver 3010 is further configured to receive a routing response message delivered by the network controller, where the routing response message carries first routing information, where the first routing information is used to indicate a forwarding port of the content request packet to the router 3000, and the first routing information is determined by the network controller according to an acquired network name of the router 3000, the content name, first registration information, and network topology information of a network controlled by the network controller, where the first registration information is used to indicate a correspondence between the content name, a network name of a target routing node, and a port of the target routing node, and the network topology information is used to indicate a topological structure of the network by using network names of routing nodes in the network.

The transmitter 3020 is further configured to forward the content request packet according to the first routing information received by the receiver 3010.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Optionally, as an embodiment, the first registration information is registration information of the requested content, where the registration information of the requested content includes the correspondence between the content name, the network name of the target routing node, and the port of the target routing node, and the target routing node is an edge routing node of the requested content; or the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container.

The first routing information includes the content name and the forwarding port of the content request packet; and the transmitter 3020 is specifically configured to match, according to the content name, a forwarding port in the first routing information, in routing information stored by the router 3000; and forward the content request packet through the forwarding port in the first routing information.

Optionally, as another embodiment, the first registration information includes registration information of the requested content and registration information of a home container of the requested content, where the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container; the router 3000 further includes: the receiver 3010, further configured to receive container tree set information of the requested content, which is sent by the network controller, where the container tree set information is acquired by the network controller by resolving the home container through a container resolution system, and the container tree set information includes a container name of at least one container including the home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode; and the router 3000 further includes a processor, configured to add the container tree set information to the content request packet.

Optionally, as another embodiment, the first routing information includes a first container name and a first port corresponding to the first container name, where the first container name is one of container names included in the container tree set information; and the transmitter 3020 is specifically configured to match, according to the first container name included in the container tree set information carried in the content request packet, the first routing information in routing information stored by the router 3000; and forward the content request packet through the first port.

Optionally, as another embodiment, the processor is further configured to determine whether any content that matches the content name exists in a content store CS; the transmitter 3020 is further configured to send, when content that matches the content name exists in the CS, the matched content to a sender of the content request packet; the processor is further configured to determine, when no content that matches the content name of the requested content exists in the CS, whether any PIT entry that matches the content name of the requested content exists in a pending information table PIT; the receiver 3010 is configured to add, when a PIT entry that matches the content name exists in the PIT, a port receiving the content request packet to the matched PIT entry; the processor is further configured to determine, when no PIT entry that matches the content name exists in the PIT, whether any forwarding entry that matches the content name exists in the FIB; and the transmitter 3020 is further configured to send, when a forwarding entry that matches the content name exists in the FIB, the content request packet according to the matched forwarding entry.

Optionally, as another embodiment, the router further includes: the receiver 3010, further configured to receive an active routing delivery message sent by the network controller, where the active routing delivery message carries another piece of routing information, where the another piece of routing information is used to indicate a forwarding port of another content request packet; and receive the another content request packet; and a fifth sending unit, configured to forward the another content request packet according to the another piece of routing information.

Optionally, as another embodiment, the active routing delivery message is carried by an interest packet.

Optionally, as another embodiment, the content request packet is an interest packet, the routing request message is carried by an interest packet, and the routing response message is carried by a data packet.

Figure 31:
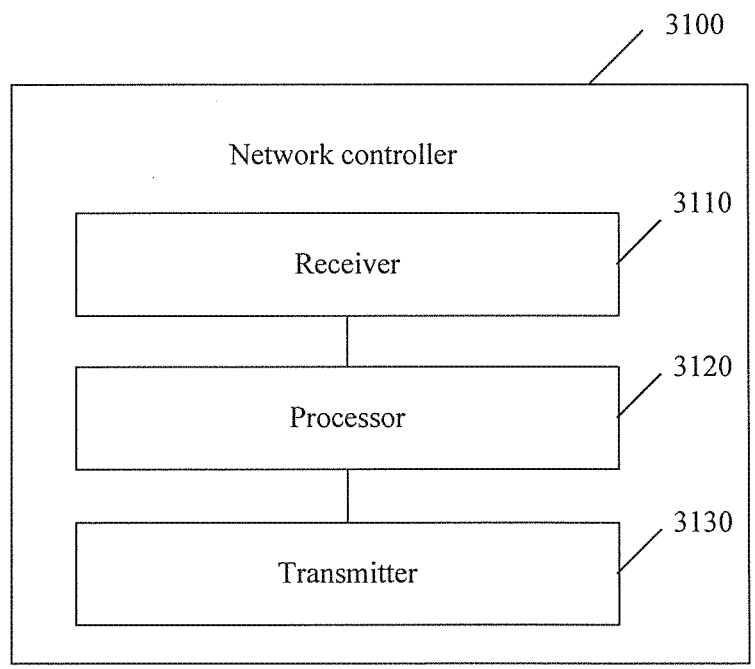
FIG. 31 is a schematic block diagram of a network controller according to an embodiment of the present invention.

FIG. 31 is a schematic block diagram of a network controller according to an embodiment of the present invention. A network controller 3100 in FIG. 31 can implement each step performed by the network controller in FIG. 5, which is not further described in detail for avoiding repetition.

The network controller 3100 includes a receiver 3110, a processor 3120, and a transmitter 3130.

The receiver 3110 is configured to receive a routing request message sent by a requesting routing node, where the routing request message carries container tree set information of requested content, where the container tree set information includes a container name of at least one container including a home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode.

The processor 3120 is configured to determine, according to registration information of each container in the at least one container stored or acquired by the network controller 3100, an edge routing node of each container, where the registration information of each container is used to indicate a correspondence between a container name of each container and the edge routing node of each container; determine a topological range of each container according to the edge routing node of each container and network topology information of a network controlled by the network controller 3100, where the network topology information is used to indicate a topological structure of the network by using network names of routing nodes in the network, and the topological range is used to indicate an inclusion relationship between containers and routing nodes; determine, according to a network name of an edge routing node of the home container, a network name of the requesting routing node acquired by the network controller 3100, and the network topology information, a forwarding path that starts from the requesting routing node and ends at the edge routing node of the home container; and determine, according to the topological range of the at least one container and the forwarding path, routing information corresponding to the requesting routing node, where the routing information includes a container name and a port corresponding to the container name, where the container name is a container name of a container in the at least one container included in the container tree set information.

The transmitter 3130 is configured to deliver the routing information corresponding to the requesting routing node to the requesting routing node, so that the requesting routing node forwards, according to the routing information corresponding to the requesting routing node, a content request packet corresponding to the requested content.

In the embodiment of the present invention, a network controller is introduced, and registration information and network topology information are stored in the network controller, or registration information and network topology information are acquired through the network controller, so that the network controller may be used to determine a forwarding path of a content request packet, which reduces a blindness of routing and forwarding of the content request packet in an ICN network and improves efficiency of routing and forwarding.

Further, when a requester requests different content of a same path, each routing node needs to store only one piece of routing information. Therefore, storage resources of routing nodes are saved.

Specifically, the processor 3120 is further configured to determine, according to the topological range of the at least one container and the forwarding path, routing information corresponding to each routing node except the requesting routing node among routing nodes that the forwarding path passes through, where the routing information includes a container name and a port corresponding to the container name, where the container name in the routing information corresponding to each routing node is a container name of a container in the at least one container included in the container tree set information; and the transmitter 3130 is further configured to deliver the routing information corresponding to each routing node to each routing node except the requesting routing node, so that each routing node forwards, according to the routing information corresponding to each routing node, the content request packet corresponding to the requested content.

Optionally, as an embodiment, the processor 3120 is specifically configured to determine a first topological range corresponding to the requesting routing node, in the topological range of the at least one container, and determine a next-hop routing node, on the forwarding path, of the requesting routing node, where the first topological range is a maximum topological range in a remaining topological range after a topological range including the requesting routing node is excluded from the topological range of the at least one container; and use container names of containers corresponding to the first topological range and a port that points to the next-hop routing node, on the requesting routing node, as the routing information corresponding to the requesting routing node.

Optionally, as another embodiment, the content request packet is an interest packet, and the routing request message is carried by an interest packet.

Optionally, the transmitter 3130 is specifically configured to send a routing response message to the requesting routing node, where the routing response message includes the routing information corresponding to the requesting routing node and the routing response message is carried by a data packet.

Optionally, the transmitter 3130 is specifically configured to send an active routing delivery message to each routing node except the requesting routing node among the routing nodes that the forwarding path passes through, where the active routing delivery message includes the routing information corresponding to each routing node, and the active routing delivery message is carried by an interest packet.

Figure 32:
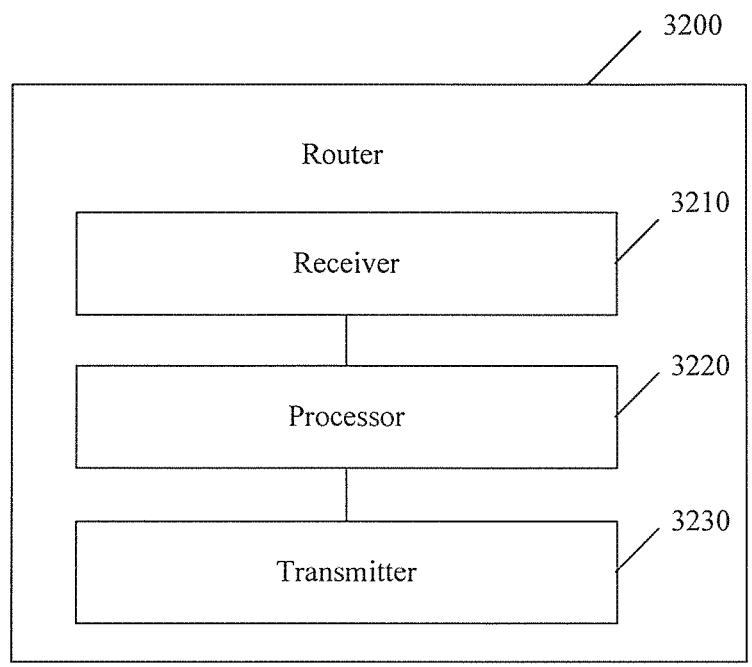
FIG. 32 is a schematic block diagram of a router according to another embodiment of the present invention.

FIG. 32 is a schematic block diagram of a router according to another embodiment of the present invention. It should be understood that a router 3200 in FIG. 32 can implement each step performed by the requesting routing node in FIG. 6.

The router 3200 includes a receiver 3210, a processor 3220, and a transmitter 3230.

The receiver 3210 is configured to receive a content request packet, where the content request packet carries a content name of requested content.

The processor 3220 is configured to determine whether any forwarding entry that matches the content name of the requested content received by the receiver 3210 exists in a forwarding information base FIB; and when the first determining unit 2420 determines that no forwarding entry that matches the content name of the requested content exists in the FIB, determine whether any forwarding entry that matches a container name of at least one container exists in the FIB.

The transmitter 3230 is configured to send a routing request message to a network controller when the processor 3220 determines that no forwarding entry that matches the container name of the at least one container exists in the FIB, where the routing request message carries container tree set information, where the container tree set information includes a container name of at least one container including a home container of the requested content, and the container tree set information is used to indicate an access relationship between the at least one container, where the home container is located at a root node of a container tree corresponding to a container tree set, and a container represented by a subnode of the container tree is an access container of a container represented by a parent node corresponding to the subnode.

The receiver 3210 is further configured to receive a routing response message sent by the network controller, where the routing response message carries first routing information, where the first routing information includes a first container name and a port corresponding to the first container name, where the first container name is one of container names included in the container tree set information, and the first routing information is determined by the network controller according to an acquired network name of the router 3200, the container tree set information, registration information of each container in the at least one container included in the container tree set information, and network topology information of a network controlled by the network controller, where the registration information of each container is used to indicate a correspondence between a container name of each container and an edge routing node of each container, and the network topology information is used to indicate a topological structure of the network by using network names of routing nodes in the network.

The processor 3220 is further configured to match, according to the container name of the at least one container included in the container tree set information, the first routing information received by the second receiving unit, in routing information stored by the router 3200.

The transmitter 3230 is further configured to forward the content request packet through the port corresponding to the first container name, in the first routing information matched by the processor 3220.

It should be noted that steps of the processor in the embodiment of the present invention may be simplified, without determining whether any forwarding entry that matches the container name exists in the FIB. For details, reference may be made to the foregoing embodiment, which are not further described herein.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Further, when a requester requests different content of a same path, each routing node needs to store only one piece of routing information. Therefore, storage resources of routing nodes are saved.

Optionally, as an embodiment, the router further includes: the receiver 3210, further configured to receive an active routing delivery message sent by the network controller, where the active routing delivery message carries another piece of routing information, where the another piece of routing information carries another container name and a port corresponding to the another container name; and receive another content request packet, where the another content request packet carries the another container name; the processor 3220 is further configured to match, according to the another container name, the another piece of routing information in routing information stored by the requesting routing node; and the transmitter 3230 is further configured to forward the another content request packet through the port corresponding to the another container name.

Optionally, as another embodiment, the active routing delivery message is carried by an interest packet.

Optionally, as another embodiment, the router further includes: the processor 3220, further configured to determine whether any content that matches the content name exists in a content store CS; the transmitter 3230, further configured to send, when content that matches the content name exists in the CS, the matched content to a sender of the content request packet; a fourth determining unit, configured to determine, when no content that matches the content name of the requested content exists in the CS, whether any PIT entry that matches the content name of the requested content exists in a pending information table PIT; a first adding unit, configured to add, when a PIT entry that matches the content name exists in the PIT, a port receiving the content request packet to the matched PIT entry; a fifth determining unit, configured to determine, when no PIT entry that matches the content name exists in the PIT, whether any forwarding entry that matches the content name exists in the FIB; and a fifth sending unit, configured to send, when a forwarding entry that matches the content name exists in the FIB, the content request packet according to the matched forwarding entry.

Optionally, as another embodiment, the content request packet is an interest packet, the routing request message is carried by an interest packet, and the routing response message is carried by a data packet.

Figure 33:
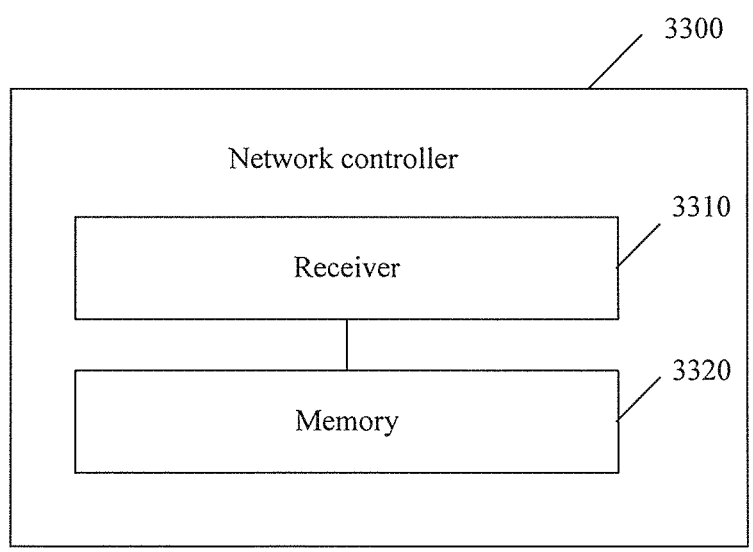
FIG. 33 is a schematic block diagram of a network controller according to another embodiment of the present invention.

FIG. 33 is a schematic block diagram of a network controller according to another embodiment of the present invention. A network controller 3300 in FIG. 33 can implement each step performed by the network controller in FIG. 7, which is not further described in detail for avoiding repetition.

The network controller 3300 includes a receiver 3310 and a memory 3320.

The receiver 3310 is configured to receive a content registration message sent by a first routing node, where the content registration message carries content registration information used to indicate a correspondence between a content name, a network name of the first routing node, and a first port of the first routing node, where the first port is a port through which the first routing node receives a content registration request packet corresponding to a content to be registered.

The memory 3320 is configured to store the content registration information received by the receiver 3310.

In the embodiment of the present invention, the network controller stores the content registration information. Therefore, it is convenient to perform uniform management of registration information, and routing information that each routing node needs to store is reduced.

Optionally, as an embodiment, the first routing node is an edge routing node of the content to be registered, and the content registration information includes a content name of the content to be registered and the first port.

The memory 3320 is specifically configured to determine whether any content that matches the content name of the content to be registered exists in registered content; when the matched content does not exist, store the content name of the content to be registered, and store a correspondence between the content name of the content to be registered, the network name of the first routing node acquired by the network controller 3300, and the first port; and when the matched content exists, add the correspondence between the content name of the content to be registered, the network name of the first routing node, and the first port to registration information of the matched content.

Optionally, as another embodiment, the network controller further includes: the receiver 3310, further configured to receive a content deregistration message sent by a second routing node, where the content deregistration message carries a content name of content to be deregistered and a second port, where the second routing node is an edge routing node of the content to be deregistered, and the second port is a port through which the second routing node receives a content deregistration request packet corresponding to the content to be deregistered; and the network controller 3300 further includes a processor, configured to determine first registered content, where the first registered content is content that is in the registered content and matches the content name of the content to be deregistered; and delete a correspondence between the content name of the content to be deregistered, a second network name acquired by the network controller 3300, and the second port from registration information of the first registered content.

Optionally, as another embodiment, the content registration information includes a correspondence between a content name of the content to be registered and a container name of a home container of the content to be registered, and a correspondence between the container name of the home container of the content to be registered, the network name of the first routing node, and the first port of the first routing node, where the first routing node is an edge routing node of the home container of the content to be registered.

The memory 3320 is specifically configured to determine whether any content that matches the content name of the content to be registered exists in registered content; when the matched content exists, add the correspondence between the content name of the content to be registered and the container name of the home container of the content to be registered, to registration information of the matched content; and when the matched registered content does not exist, store the content name of the content to be registered, and store the correspondence between the content name of the content to be registered and the container name of the home container of the content to be registered.

Optionally, as another embodiment, the network controller further includes: the receiver 3310, further configured to receive a content deregistration message sent by a third routing node, where the content deregistration message carries a content name of content to be deregistered and a container name of a home container of the content to be deregistered; and the processor, further configured to determine second registered content, where the second registered content is registered content that matches the content name of the content to be registered; and delete the correspondence between the content name of the content to be deregistered and the container name of the home container of the content to be deregistered from registration information of the second registered content.

Optionally, as another embodiment, the content deregistration message is carried by an interest packet.

Optionally, as another embodiment, the network controller further includes: the receiver 3310, further configured to receive a container registration message sent by a fourth routing node, where the fourth routing node is an edge routing node of a container to be registered, and the container registration message carries a container name of the container to be registered and a fourth port, where the fourth port is a port through which the fourth routing node receives a container registration request packet corresponding to the container to be registered; the processor, further configured to determine whether any container that matches the container name of the container to be registered exists in registered containers, and add, when the matched container exists, a correspondence between the container name of the container to be registered, a network name of the fourth routing node acquired by the network controller 3300, and the fourth port to registration information of the matched container; and the memory 3320, further configured to: when the matched container does not exist, store the container name of the container to be registered, and store the correspondence between the container name of the container to be registered, the network name of the fourth routing node, and the fourth port.

Optionally, as another embodiment, the network controller further includes: the receiver 3310, further configured to receive a container deregistration message sent by a fifth routing node, where the fifth routing node is an edge routing node of a container to be deregistered, and the container deregistration message carries a container name of the container to be deregistered and a fifth port, where the fifth port is a port through which the fifth routing node receives a container deregistration request packet corresponding to the container to be deregistered; the processor, further configured to determine a third registered container, where a container name of the third registered container matches the container name of the container to be deregistered; and a third deleting unit, configured to delete a correspondence between the container name of the container to be deregistered, a network name of the fifth routing node acquired by the network controller 3300, and the fifth port from registration information of the third registered container.

Optionally, as another embodiment, the container deregistration message is carried by an interest packet.

Optionally, as another embodiment, the content registration message is carried by an interest packet.

Figure 34:
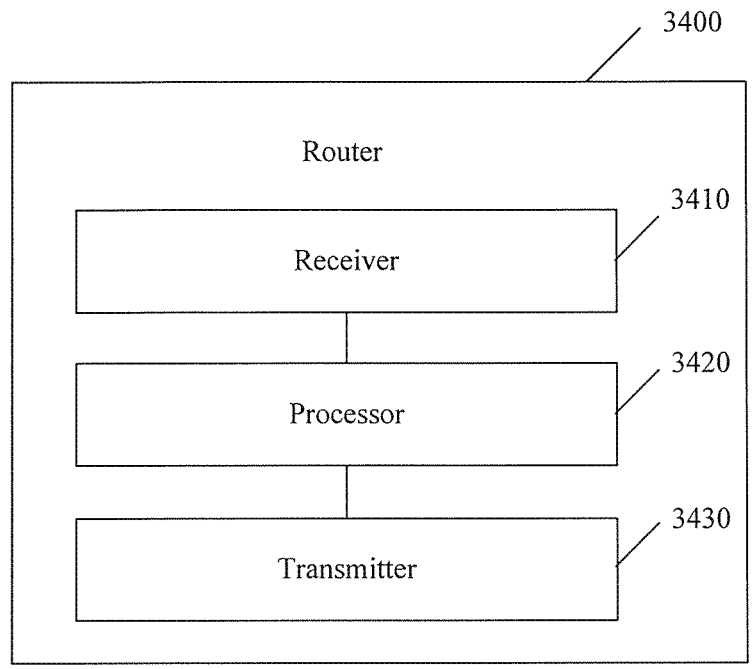
FIG. 34 is a schematic block diagram of a router according to another embodiment of the present invention.

FIG. 34 is a schematic block diagram of a router according to another embodiment of the present invention. It should be understood that a router 3400 in FIG. 34 can implement each step performed by the first routing node in the method in FIG. 8.

The router 3400 includes a receiver 3410, a processor 3420, and a transmitter 3430.

The receiver 3410 is configured to receive a content registration request packet, where the content registration request packet carries a content name of content to be registered.

The processor 3420 is configured to determine content registration information according to the content registration request packet received by the receiver 3410, where the content registration information is used to indicate a correspondence between the content name, a network name of the first routing node, and a first port of the first routing node, where the first port is a port through which the first routing node receives the content registration request packet.

The transmitter 3430 is configured to send a content registration message to a network controller, where the content registration message carries the content registration information determined by the processor 3420.

In the embodiment of the present invention, the network controller stores the content registration information. Therefore, it is convenient to perform uniform management of registration information, and routing information that each routing node needs to store is reduced.

Optionally, as an embodiment, the content registration packet carries the content name of the content to be registered, and the processor 3420 is specifically configured to determine the content name of the content to be registered and the first port as the content registration information, where the first port is a port through which the router receives the content registration packet.

Optionally, as another embodiment, the router further includes: the receiver 3410, further configured to receive a content deregistration request packet, where the content deregistration request packet carries a content name of content to be deregistered; the processor 3420, further configured to determine content deregistration information according to the content deregistration request packet, where the content deregistration information includes the content name of the content to be deregistered and a second port, where the second port is a port through which the router receives the content deregistration request packet; and the transmitter 3430, further configured to send a content deregistration message to the network controller, where the content deregistration message carries the content deregistration information.

Optionally, as another embodiment, the content registration request packet further carries a container name of a home container of the content to be registered, and the content registration information includes a correspondence between the content name of the content to be registered and the container name of the home container of the content to be registered, and a correspondence between the container name of the home container of the content to be registered, the network name of the first routing node, and the first port of the first routing node, where the first routing node is an edge routing node of the home container of the content to be registered.

Optionally, as another embodiment, the router further includes: the receiver 3410, further configured to receive a content deregistration request packet, where the content deregistration request packet carries a content name of content to be deregistered and a container name of a home container of the content to be deregistered; and the transmitter 3430, configured to send a content deregistration message to the network controller, where the content deregistration message carries the content name of the content to be deregistered and the container name of the home container of the content to be deregistered.

Optionally, as another embodiment, the content deregistration request packet is an interest packet, and the content deregistration request message is carried by an interest packet.

Optionally, as another embodiment, the router further includes: the receiver 3410, further configured to receive a container registration request packet, where the container registration request packet carries a container name of a container to be registered; the processor 3420, further configured to determine a fourth port, where the fourth port is a port through which the router receives the container registration request packet; and the transmitter 3430, further configured to send a container registration request message to the network controller, where the container registration request message carries the container name of the container to be registered and the fourth port.

Optionally, as another embodiment, the container registration request packet is an interest packet, and the container registration request message is carried by an interest packet.

Optionally, as another embodiment, the router further includes: the receiver 3410, further configured to receive a container deregistration request packet, where the container deregistration request packet carries a container name of a container to be deregistered; the processor 3420, further configured to determine a fifth port, where the fifth port is a port through which the router receives the container deregistration request packet; and the transmitter 3430, further configured to send a container deregistration request message to the network controller, where the container deregistration request message carries the container name of the container to be deregistered and the fifth port.

Optionally, as another embodiment, the content registration request packet is an interest packet, and the content registration request message is carried by an interest packet.

Figure 35:
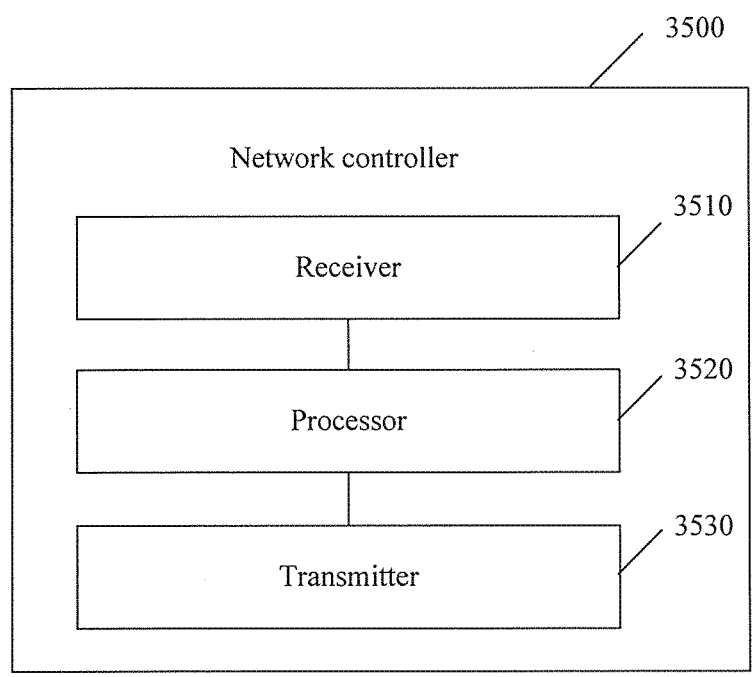
FIG. 35 is a schematic block diagram of a network controller according to another embodiment of the present invention.

FIG. 35 is a schematic block diagram of a network controller according to another embodiment of the present invention. A network controller 3500 in FIG. 35 can implement each step performed by the network controller in FIG. 9, which is not further described in detail herein for avoiding repetition.

The network controller 3500 includes a receiver 3510, a processor 3520, and a transmitter 3530.

The receiver 3510 is configured to receive a routing request message sent by a requesting routing node, where the routing request message carries a first name.

The processor 3520 is configured to determine a network name of a target routing node according to the first name received by the receiver 3510; determine, according to a network name of the requesting routing node acquired by the network controller 3500, the network name of the target routing node, and network topology information of a network controlled by the network controller 3500, a forwarding path from the requesting routing node to the target routing node, where the network topology information is used to indicate a topological structure of the network by using network names of routing nodes in the network; and determine routing information corresponding to each routing node except the target routing node among routing nodes that the forwarding path passes through, where the routing information corresponding to each routing node includes the network name of the target routing node and a port that points to a next-hop routing node, on each routing node on the forwarding path.

The transmitter 3530 is configured to deliver the routing information corresponding to each routing node and determined by the processor 3520 to each routing node.

In the embodiment of the present invention, a network controller is introduced, and registration information and a network topology diagram are stored in the network controller, so that the network controller may be used to determine a forwarding path of a content request packet, which reduces blindness of routing and forwarding of the content request packet in an ICN network and improves efficiency of routing and forwarding.

Optionally, as an embodiment, the routing request message is used to request a forwarding path of a content response packet, the first name is the network name of the target routing node, the target routing node is a first one routing node that a content request packet corresponding to the content response packet passes through, the content response packet is a data packet, and the content request packet is an interest packet.

Optionally, as another embodiment, the routing request message is used to request a forwarding path of a content request packet, where the content request packet is an interest packet; the first name is a content name of requested content carried in the content request packet; the network controller stores registration information of the requested content, where the registration information is used to indicate a correspondence between the content name of the requested content and the network name of the target routing node; the target routing node is an edge routing node of the requested content; and the processor 3520 is specifically configured to acquire the network name of the target routing node from the registration information of the requested content according to the content name.

Optionally, as another embodiment, the routing request message is carried by an interest packet; and the transmitter 3530 is specifically configured to send a routing response message to the requesting routing node, where the routing response message includes the routing information corresponding to the requesting routing node and the routing response message is carried by a data packet; and send an active routing delivery message to each routing node except the requesting routing node and the target routing node among the routing nodes that the forwarding path passes through, where the active routing delivery message includes the routing information corresponding to each routing node, and the active routing delivery message is carried by an interest packet.

Figure 36:
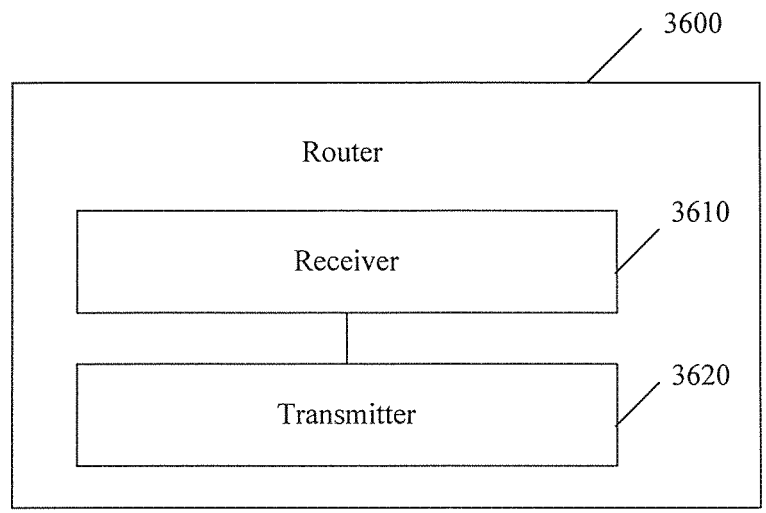
FIG. 36 is a schematic block diagram of a router according to another embodiment of the present invention.

FIG. 36 is a schematic block diagram of a router according to another embodiment of the present invention. It should be understood that a router 3600 in FIG. 36 can implement each step performed by the requesting routing node in FIG. 10, which is not further described in detail herein for avoiding repetition.

The router 3600 includes a receiver 3610 and a transmitter 3620.

The receiver 3610 is configured to receive a message packet, where the message packet carries a first name.

The transmitter 3620 is configured to send a routing request message to a network controller when no forwarding entry that matches the first name received by the receiver 3610 exists in a forwarding information base FIB, where the routing request message carries the first name.

The receiver 3610 is further configured to receive a routing response message delivered by the network controller, where the routing response message carries first routing information, where the first routing information includes a network name of a target routing node and a forwarding port of the message packet, and the first routing information is determined by the network controller according to the first name, an acquired network name of the router 3600, and network topology information of a network controlled by the network controller, where the network topology information is used to indicate a topological structure of the network by using network names of routing nodes in the network.

In the embodiment of the present invention, a network controller is introduced, and registration information and network topology information are stored in the network controller, or registration information and network topology information are acquired through the network controller, so that the network controller may be used to determine a forwarding path of a content request packet, which reduces blindness of routing and forwarding of the content request packet in an ICN network and improves efficiency of routing and forwarding.

Optionally, as an embodiment, the message packet is a content response packet, the message packet is a data packet, the first name is the network name of the target routing node, the target routing node is a first one routing node that a content request packet corresponding to the content response packet passes through, and the content request packet is an interest packet.

Optionally, as another embodiment, the router further includes: a processor, configured to determine whether any forwarding entry that matches the network name of the target routing node exists in the FIB; and the transmitter 3620 is further configured to send, when a forwarding entry that matches the network name of the target routing node exists in the FIB, the content response packet according to the matched forwarding entry.

Optionally, as another embodiment, the message packet is a content request packet, the content request packet is an interest packet, the first name is a content name of requested content carried in the content request packet, and the target routing node is an edge routing node of the requested content.

Optionally, as another embodiment, the processor is further configured to determine whether any content that matches the content name exists in a content store CS; the transmitter 3620 is further configured to send, when content that matches the content name exists in the CS, the matched content to a sender of the content request packet; the processor is further configured to determine, when no content that matches the content name of the requested content exists in the CS, whether any forwarding entry that matches the content name of the requested content exists in the FIB; and the transmitter 3620 is further configured to send, when a forwarding entry that matches the content name exists in the FIB, the content request packet according to the matched forwarding entry.

Optionally, as another embodiment, the router further includes: the receiver 3610, further configured to receive an active routing delivery message sent by the network controller, where the active routing delivery message carries another piece of routing information, where the another piece of routing information includes a network name of another target routing node and a forwarding port corresponding to the another target routing node, and receive another content request packet, where the another content request packet includes the network name of the another target routing node; and the transmitter 3620, further configured to forward the another content request packet through the forwarding port in the another piece of routing information.

Optionally, as another embodiment, the active routing delivery message is carried by an interest packet.

Optionally, as another embodiment, the routing request message is carried by an interest packet, and the routing response message is carried by a data packet.

Figure 37:
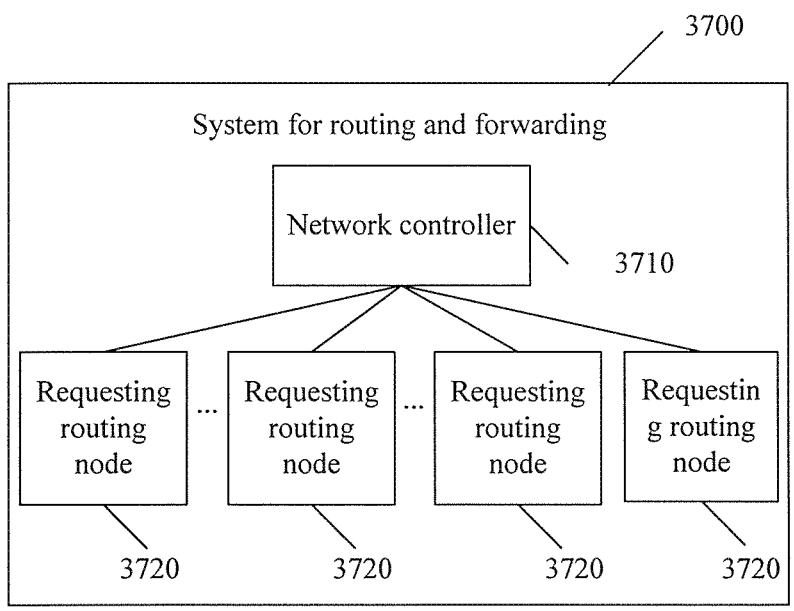
FIG. 37 is a schematic block diagram of a system for routing and forwarding according to an embodiment of the present invention.

FIG. 37 is a schematic block diagram of a system 3700 for routing and forwarding according to an embodiment of the present invention. The system 3700 for routing and forwarding includes at least one network controller 3710 and two or more than two routing nodes 3720 communicatively connected with the network controller 3710, where the routing nodes at least include a requesting routing node 3720 and a target routing node 3720.

The requesting routing node 3720 is configured to receive a content request packet, where the content request packet carries a content name of requested content; when no forwarding entry that matches the content name exists in a forwarding information base FIB, send a routing request message to the network controller 3710, where the routing request message carries the content name; receive routing information sent by the network controller 3710, where the routing information is used to indicate a forwarding port of the content request packet to the requesting routing node 3720; and forward the content request packet according to the routing information.

The network controller 3710 is configured to receive the routing request message sent by the requesting routing node 3720; determine, according to the content name carried in the routing request message and first registration information stored or acquired by the network controller, a network name of the target routing node 3720 corresponding to the content name and a port of the target routing node 3720, where the content request packet can be routed to the requested content through the port of the target routing node 3720, and the first registration information is used to indicate a correspondence between the content name, the network name of the target routing node 3720, and the port of the target routing node 3720; determine, according to the network name of the target routing node 3720 and an acquired network name of the requesting routing node 3720, a forwarding path in network topology information of a network controlled by the network controller, where the forwarding path starts from the requesting routing node 3720 and ends at the target routing node 3720, and the network topology information is used to indicate a topological structure of the network by using network names of routing nodes in the network; determine, according to the forwarding path, routing information corresponding to the requesting routing node 3720, where the routing information is used to indicate a first port through which the requesting routing node 3720 forwards the content request packet, where the first port points to a next-hop routing node corresponding to the requesting routing node 3720 on the forwarding path; and send the routing information corresponding to the requesting routing node 3720 to the requesting routing node 3720.

Optionally, the first registration information includes registration information of the requested content and registration information of a home container of the requested content, where the registration information of the requested content is used to indicate a correspondence between the content name and a container name of the home container, and the registration information of the home container is used to indicate a correspondence between the container name of the home container, the network name of the target routing node, and the port of the target routing node; and the network controller is specifically configured to acquire, according to the content name, the container name of the home container corresponding to the content name, from the registration information of the requested content; and acquire, according to the container name of the home container, the network name of the target routing node corresponding to the container name of the home container and the port of the target routing node, from the registration information of the home container, where the target routing node is an edge routing node of the home container.

Figure 38:
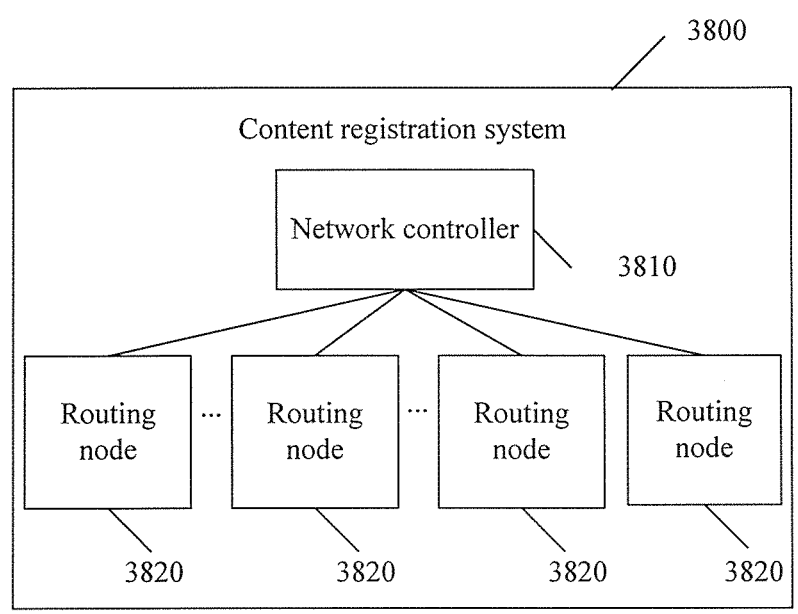
FIG. 38 is a schematic block diagram of a content registration system according to an embodiment of the present invention.

FIG. 38 is a schematic block diagram of a content registration system 3800 according to an embodiment of the present invention. The content registration system 3800 includes at least one network controller 3810 and at least one routing node 3820 connected to the network controller.

The routing node 3820 is configured to receive a content registration request packet, where the content registration request packet carries a content name of content to be registered; determine content registration information according to the content registration request packet, where the content registration information is used to indicate a correspondence between the content name, a network name of the routing node 3820, and a first port of the routing node, where the first port is a port through which the routing node 3820 receives the content registration request packet; and send a content registration message to the network controller 3810, where the content registration message carries the content registration information.

The network controller is configured to receive the content registration message sent by the routing node 3820, where the content registration message carries the content registration information; and store the content registration information.

Optionally, the content registration information includes a correspondence between the content name of the content to be registered and a container name of a home container of the content to be registered, and a correspondence between the container name of the home container of the content to be registered, the network name of the routing node 3820, and the first port of the routing node 3820, where the routing node 3820 is an edge routing node of the home container of the content to be registered.

It should be noted that, for implementation of the specific methods in the system for routing and forwarding and the content registration system according to the embodiments of the present invention, reference may be made to the foregoing method embodiments. For specific structures of the routing node and network controller included in the system, for example, division of functional modules, reference may be made to the foregoing apparatus embodiments. Detailed are not repeated herein.

As can be seen, by using the method for routing and forwarding, the content registration method, and the corresponding router, network controller, and system provided by the embodiments of the present invention, registration information and network topology information are stored in the network controller, or the registration information and network topology information are acquired through the network controller, so that the network controller may be used to determine a forwarding path of a content request packet, which reduces blindness of routing and forwarding of the content request packet in an ICN network and improves efficiency of routing and forwarding.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for routing and forwarding, the method comprising:

receiving, by a network controller, a routing request message sent by a requesting routing node, wherein the routing request message carries a content name of requested content;

determining, by the network controller according to the content name and first registration information stored or acquired by the network controller, a network name of a target routing node corresponding to the content name and a port of the target routing node, wherein a content request packet corresponding to the requested content can be routed to the requested content through the port of the target routing node, and the first registration information is used to indicate a correspondence between the content name, the network name of the target routing node, and the port of the target routing node;

determining, by the network controller according to the network name of the target routing node and an acquired network name of the requesting routing node, a forwarding path in network topology information of a network controlled by the network controller, wherein the forwarding path starts from the requesting routing node and ends at the target routing node, and the network topology information is used to indicate a topological structure of the network by using network names of routing nodes in the network;

determining, by the network controller according to the forwarding path, routing information corresponding to the requesting routing node, wherein the routing information is used to indicate a first port through which the requesting routing node forwards the content request packet, wherein the first port points to a next-hop routing node corresponding to the requesting routing node on the forwarding path; and sending, by the network controller, the routing information corresponding to the requesting routing node to the requesting routing node, so that the requesting routing node forwards the content request packet according to the routing information;

wherein the first registration information comprises registration information of the requested content and registration information of a home container of the requested content, wherein the registration information of the requested content is used to indicate a correspondence between the content name and a container name of the home container, and the registration information of the home container is used to indicate a correspondence between the container name of the home container, the network name of the target routing node, and the port of the target routing node; and determining, by the network controller according to the content name and first registration information stored or acquired by the network controller, a network name of a target routing node corresponding to the content name and a port of the target routing node, comprises:

acquiring, by the network controller according to the content name, the container name of the home container corresponding to the content name, from the registration information of the requested content, and acquiring, by the network controller according to the container name of the home container, the network name of the target routing node corresponding to the container name of the home container and the port of the target routing node, from the registration information of the home container, wherein the target routing node is an edge routing node of the home container.

2. The method according to claim 1, wherein after determining, by the network controller according to the network name of the target routing node and an acquired network name of the requesting routing node, a forwarding path in network topology information of a network controlled by the network controller, the method further comprises:

determining, by the network controller according to the forwarding path and the port of the target routing node, routing information corresponding to each routing node except the requesting routing node among routing nodes that the forwarding path passes through, wherein the routing information is used to indicate a port through which a routing node corresponding to the routing information forwards the content request packet; and delivering, by the network controller, the routing information corresponding to each routing node, to each routing node except the requesting routing node among the routing nodes that the forwarding path passes through, so that each routing node forwards the content request packet according to the routing information corresponding to each routing node.

3. The method according to claim 2, wherein determining, by the network controller according to the forwarding path and the port of the target routing node, routing information corresponding to each routing node except the requesting routing node among routing nodes that the forwarding path passes through, comprises:

determining, by the network controller, a next-hop routing node, on the forwarding path, of each routing node except the requesting routing node and the target routing node among the routing nodes that the forwarding path passes through; and determining, by the network controller, the content name and a port that points to the next-hop routing node, on each routing node, as the routing information corresponding to each routing node, and determining the content name and the port of the target routing node as routing information corresponding to the target routing node.

4. The method according to claim 2, wherein delivering, by the network controller, the routing information corresponding to each routing node, to each routing node except the requesting routing node among the routing nodes that the forwarding path passes through, comprises:

sending, by the network controller, an active routing delivery message to each routing node except the requesting routing node among the routing nodes that the forwarding path passes through, wherein the active routing delivery message comprises the routing information corresponding to each routing node except the requesting routing node, and the active routing delivery message is carried by an interest packet.

5. The method according to claim 1, wherein:

the first registration information is registration information of the requested content, wherein the registration information of the requested content comprises the correspondence between the content name, the network name of the target routing node, and the port of the target routing node, and the target routing node is an edge routing node of the requested content; and determining, by the network controller according to the content name and first registration information stored or acquired by the network controller, a network name of a target routing node corresponding to the content name and a port of the target routing node, comprises:
acquiring, by the network controller according to the content name, the network name of the target routing node corresponding to the content name and the port of the target routing node, from the registration information of the requested content.

6. The method according to claim 1, further comprising:
resolving, by the network controller through a container resolution system, the home container to acquire container tree set information of the requested content, wherein the container tree set information comprises a container name of at least one container comprising the home container, and the container tree set information is used to indicate an access relationship between the at least one container;
determining, by the network controller according to registration information of each container in the at least one container stored or acquired by the network controller, an edge routing node of each container, wherein the registration information of each container is used to indicate a correspondence between a container name of each container and the edge routing node of each container;
determining, by the network controller, a topological range of each container according to the edge routing node of each container and the network topology information, wherein the topological range is used to indicate an inclusion relationship between containers and routing nodes; and
delivering, by the network controller, the container tree set information to the requesting routing node, so that the requesting routing node stores the container tree set information to the content request packet, so that the content request packet can be routed to the target routing node according to the container tree set information; and
wherein determining, by the network controller according to the forwarding path, routing information corresponding to the requesting routing node, comprises:
determining, by the network controller, a first topological range corresponding to the requesting routing node, in the topological range of the at least one container comprised in the container tree set information, wherein the first topological range is a maximum topological range in a remaining topological range after a topological range comprising the requesting routing node is excluded from the topological range of the at least one container, and
determining, by the network controller, container names of containers corresponding to the first topological range and a port that points to the next-hop routing node, on the requesting routing node, as the routing information corresponding to the requesting routing node.

7. The method according to claim 1, wherein sending, by the network controller, the routing information corresponding to the requesting routing node to the requesting routing node, comprises:
sending, by the network controller, a routing response message to the requesting routing node, wherein the routing response message comprises the routing information corresponding to the requesting routing node and the routing response message is carried by a data packet.

8. The method according to claim 1, wherein the content request packet is an interest packet, and the routing request message is carried by an interest packet.

9. A method for routing and forwarding, the method comprising:
receiving, by a requesting routing node, a content request packet, wherein the content request packet carries a content name of requested content;
when no forwarding entry that matches the content name exists in a forwarding information base FIB, sending, by the requesting routing node, a routing request message to a network controller, wherein the routing request message carries the content name;
receiving, by the requesting routing node, a routing request response message delivered by the network controller, wherein the routing request response message carries first routing information, wherein the first routing information is used to indicate a forwarding port of the content request packet to the requesting routing node, and the first routing information is determined by the network controller according to an acquired network name of the requesting routing node, the content name, first registration information, and network topology information of a network controlled by the network controller, wherein the first registration information is used to indicate a correspondence between the content name, a network name of a target routing node, and a port of the target routing node, and the network topology information is used to indicate a topological structure of the network by using network names of routing nodes in the network; and
forwarding, by the requesting routing node, the content request packet according to the first routing information;
wherein the first registration information comprises registration information of the requested content and registration information of a home container of the requested content, wherein the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container; and
before the forwarding, by the requesting routing node, the content request packet according to the first routing information, the method further comprises:
receiving, by the requesting routing node, container tree set information of the requested content, which is sent by the network controller, wherein the container tree set information is acquired by the network controller by resolving the home container through a container resolution system, and the container tree set information comprises a container name of at least one container comprising the home container of the requested content, and the container tree set information is used to indicate an access relationship between the at least one container, wherein the home container is located at a root node of a container tree corresponding to a container tree set, and a container represented by a subnode of the container tree is an access container of a container represented by a parent node corresponding to the subnode, and adding, by the requesting routing node, the container tree set information to the content request packet.

10. The method according to claim 9, wherein:
the first registration information is registration information of the requested content, wherein the registration information of the requested content comprises the correspondence between the content name, the network name of the target routing node, and the port of the target routing node, and the target routing node is an edge routing node of the requested content; or
the first registration information comprises registration information of the requested content and registration information of a home container of the requested content, wherein the registration information of the requested content is used to indicate a correspondence between the content name of the requested content and a container name of the home container, the registration information of the home container is used to indicate a correspondence between the container name of the home container, the network name of the target routing node, and the port of the target routing node, and the target routing node is an edge routing node of the home container.

11. The method according to claim 9, wherein:
the first routing information comprises the content name and the forwarding port of the content request packet; and
forwarding, by the requesting routing node, the content request packet according to the first routing information, comprises:
  matching, by the requesting routing node according to the content name, the forwarding port in the first routing information, in routing information stored by the requesting routing node, and
  forwarding, by the requesting routing node, the content request packet through the forwarding port in the first routing information.

12. The method according to claim 9, wherein:
the first routing information comprises a first container name and a first port corresponding to the first container name, wherein the first container name is one of container names comprised in the container tree set information; and
forwarding, by the requesting routing node, the content request packet according to the first routing information, comprises:
  determining, by the requesting routing node according to the first container name comprised in the container tree set information carried in the content request packet, the first routing information that matches the first container name, in routing information stored by the requesting routing node, and
  forwarding, by the requesting routing node, the content request packet through the first port comprised in the first routing information.

13. The method according to claim 9, wherein before sending, by the requesting routing node, a routing request message to a network controller, the method further comprises:
  determining, by the requesting routing node, whether any content that matches the content name exists in a content store (CS);
  when content that matches the content name exists in the CS, sending, by the requesting routing node, the matched content to a sender of the content request packet;
  when no content that matches the content name of the requested content exists in the CS, determining, by the requesting routing node, whether any pending information table (PIT) entry that matches the content name of the requested content exists in a PIT;
  when a PIT entry that matches the content name exists in the PIT, adding, by the requesting routing node, a port receiving the content request packet to the matched PIT entry;
  when no PIT entry that matches the content name exists in the PIT, determining, by the requesting routing node, whether any forwarding entry that matches the content name exists in a forwarding information base (FIB); and
  when a forwarding entry that matches the content name exists in the FIB, sending, by the requesting routing node, the content request packet according to the matched forwarding entry.

14. The method according to claim 9, further comprising:
  receiving, by the requesting routing node, an active routing delivery message sent by the network controller, wherein the active routing delivery message carries another piece of routing information, wherein the another piece of routing information is used to indicate a forwarding port of another content request packet;
  receiving, by the requesting routing node, the another content request packet; and
  forwarding, by the requesting routing node, the another content request packet according to the another piece of routing information.

15. The method according to claim 14, wherein the active routing delivery message is carried by an interest packet.

16. The method according to claim 9, wherein the content request packet is an interest packet, the routing request message is carried by an interest packet, and the routing request response message is carried by a data packet.

17. A method for routing and forwarding, comprising:
  receiving, by a network controller, a routing request message sent by a requesting routing node, wherein the routing request message carries container tree set information of a requested content, wherein the container tree set information comprises a container name of at least one container comprising a home container of the requested content, and the container tree set information is used to indicate an access relationship between the at least one container;
  determining, by the network controller according to registration information of each container in the at least one container stored or acquired by the network controller, an edge routing node of each container, wherein the registration information of the container is used to indicate a correspondence between a container name of the container and the edge routing node of the container;
  determining, by the network controller, a topological range of each container according to the edge routing node of each container and network topology information of a network controlled by the network controller, wherein the network topology information is used to indicate a topological structure of the network by using network names of routing nodes in the network, and the topological range is used to indicate an inclusion relationship between containers and routing nodes;
  determining, by the network controller according to a network name of an edge routing node of the home container, an acquired network name of the requesting routing node, and the network topology information, a forwarding path that starts from the requesting routing node and ends at the edge routing node of the home container;

determining, by the network controller according to the topological range of the at least one container and the forwarding path, routing information corresponding to the requesting routing node, wherein the routing information comprises a container name and a port corresponding to the container name, wherein the container name is a container name of a container in the at least one container comprised in the container tree set information; and delivering, by the network controller, the routing information corresponding to the requesting routing node to the requesting routing node, so that the requesting routing node forwards, according to the routing information corresponding to the requesting routing node, a content request packet corresponding to the requested content;

wherein after determining, by the network controller according to a network name of an edge routing node of the home container, an acquired network name of the requesting routing node, and the network topology information, a forwarding path that starts from the requesting routing node and ends at the edge routing node of the home container, the method further comprises:

determining, by the network controller according to the topological range of the at least one container and the forwarding path, routing information corresponding to each routing node except the requesting routing node among routing nodes that the forwarding path passes through, wherein the routing information comprises a container name and a port corresponding to the container name, wherein the container name in the routing information corresponding to each routing node is a container name of a container in the at least one container comprised in the container tree set information; and delivering, by the network controller, the routing information corresponding to each routing node to each routing node except the requesting routing node, so that each routing node forwards, according to the routing information corresponding to each routing node, the content request packet corresponding to the requested content.

* * * * *